US012598354B2

(12) United States Patent
Ozaki et al.

(10) Patent No.: US 12,598,354 B2
(45) Date of Patent: Apr. 7, 2026

(54) INFORMATION PROCESSING SERVER, RECORD CREATION SYSTEM, DISPLAY CONTROL METHOD, AND NON-TRANSITORY RECORDING MEDIUM

(71) Applicants: Hiroki Ozaki, Tokyo (JP); Takahiro Kamekura, Tokyo (JP); Shigeyuki Ishii, Ibaraki (JP); Susumu Fujioka, Kanagawa (JP); Ayano Inoue, Kanagawa (JP)

(72) Inventors: Hiroki Ozaki, Tokyo (JP); Takahiro Kamekura, Tokyo (JP); Shigeyuki Ishii, Ibaraki (JP); Susumu Fujioka, Kanagawa (JP); Ayano Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 376 days.

(21) Appl. No.: 18/354,967

(22) Filed: Jul. 19, 2023

(65) Prior Publication Data

US 2024/0031653 A1     Jan. 25, 2024

(30) Foreign Application Priority Data

Jul. 20, 2022     (JP) ................................. 2022-115650
May 15, 2023     (JP) ................................. 2023-080044

(51) Int. Cl.
*H04N 21/472*     (2011.01)
*G06Q 10/101*     (2023.01)
*H04N 21/431*     (2011.01)

(52) U.S. Cl.
CPC ..... *H04N 21/47217* (2013.01); *G06Q 10/101* (2013.01); *H04N 21/4312* (2013.01)

(58) Field of Classification Search
CPC ......... H04N 21/47217; H04N 21/4312; H04N 7/155; G06Q 10/101
(Continued)

(56) References Cited

U.S. PATENT DOCUMENTS 11,061,372 B1 *   7/2021   Chen ................... G06F 3/04883
11,985,000 B2 *   5/2024   Faulkner ............. H04L 12/1822
(Continued)

FOREIGN PATENT DOCUMENTS

JP          H08-320940 A      12/1996
JP          2010-109478 A      5/2010
(Continued)

*Primary Examiner* — Duc Nguyen
*Assistant Examiner* — Carissa A Jones
(74) *Attorney, Agent, or Firm* — IPUSA, PLLC

(57)     ABSTRACT

An information processing server is communicably connected with a display apparatus and a terminal apparatus via a network. The server includes circuitry to cause the terminal apparatus to display an object based on object information including time information indicating a time at which the object was displayed by the display apparatus and a record including audio or video recorded by a device communicably connected with the terminal apparatus, generate screen information of a screen that presents, based on the time information, instruction information for playing back the object at the time indicated by the time information or the record including the audio or the video related to the object, and transmit the record, the object information, and the screen information representing the screen to the terminal apparatus.

17 Claims, 48 Drawing Sheets

(58) Field of Classification Search
USPC ......... 348/14.08, 14.01, 14.02, 14.03, 14.05,
348/14.07, 14.09, 14.12
See application file for complete search history.

(56) References Cited

U.S. PATENT DOCUMENTS

| | | | |
|---|---|---|---|
| 2012/0096348 A1 | 4/2012 | Nagamine et al. | |
| 2012/0117570 A1 | 5/2012 | Ozaki et al. | |
| 2012/0259879 A1 | 10/2012 | Ozaki et al. | |
| 2013/0060925 A1 | 3/2013 | Nagamine et al. | |
| 2013/0162663 A1 | 6/2013 | Mano et al. | |
| 2014/0118326 A1 | 5/2014 | Ozaki et al. | |
| 2014/0130028 A1 | 5/2014 | Maeda et al. | |
| 2014/0379751 A1 | 12/2014 | Nakamura et al. | |
| 2017/0168808 A1 | 6/2017 | Kakei et al. | |
| 2018/0052837 A1 | 2/2018 | Kunieda | |
| 2018/0160076 A1 | 6/2018 | Ozaki | |
| 2019/0033935 A1 | 1/2019 | Ozaki | |
| 2019/0036769 A1 | 1/2019 | Nakao et al. | |
| 2019/0335140 A1 | 10/2019 | Ozaki | |
| 2020/0293607 A1* | 9/2020 | Nelson .................... G06F 40/30 | |
| 2022/0122565 A1 | 4/2022 | Ozaki | |

FOREIGN PATENT DOCUMENTS

| | | | |
|---|---|---|---|
| JP | 2016-091215 A | 5/2016 | |
| JP | 2018-032912 A | 3/2018 | |

* cited by examiner

FIG. 1

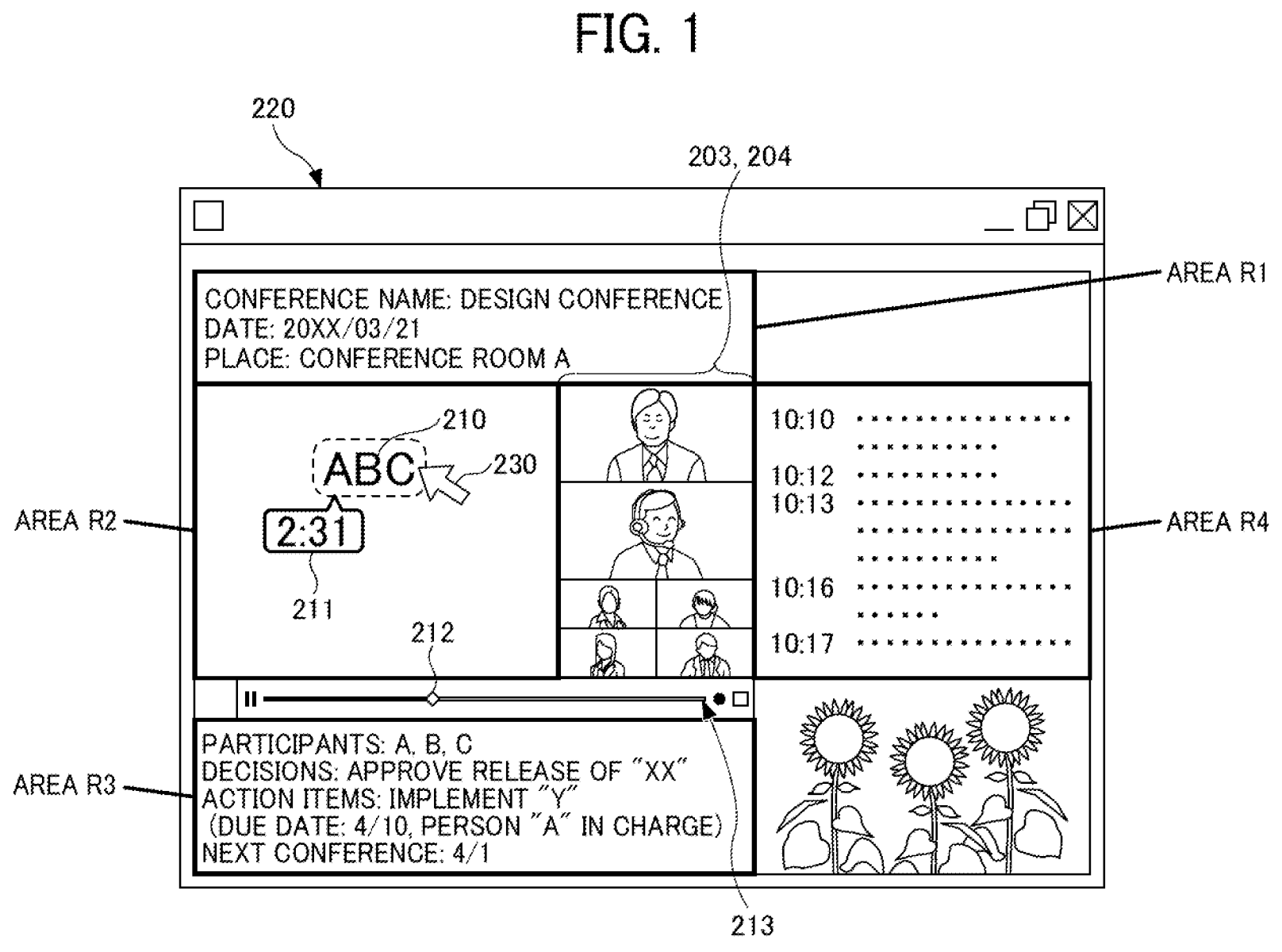

AREA R1

AREA R4

203, 204

220

AREA R2

AREA R3

CONFERENCE NAME: DESIGN CONFERENCE
DATE: 20XX/03/21
PLACE: CONFERENCE ROOM A 210
230
ABC
2:31
211

212

10:10
10:12
10:13
10:16
10:17

213

PARTICIPANTS: A, B, C
DECISIONS: APPROVE RELEASE OF "XX"
ACTION ITEMS: IMPLEMENT "Y"
(DUE DATE: 4/10, PERSON "A" IN CHARGE)
NEXT CONFERENCE: 4/1

CAPTURE IMAGE BY PREDETERMINED DEGREES
UP AND DOWN FROM HORIZONTAL 0 DEGREE
OF DEVICE (e.g., a = 60°, b = 10°)

HORIZONTAL
0 DEGREE POSITION a° b°

60

(b)

CAPTURE IMAGE BY 360 DEGREES
HORIZONTALLY

| CONFER- ENCE ID | RECORD- ING ID | UPDATE DATE AND TIME | TITLE | UPLOAD | STORAGE LOCATION |
|---|---|---|---|---|---|
| 091 | 151 | 20XX/1/25 10:30 | DESIGN CONFERENCE | – | |
| 091 | 152 | 20XX/1/25 10:50 | DESIGN CONFERENCE | – | |
| 109 | 198 | 20XX/1/27 14:30 | DEVELOPMENT CONFERENCE | UPLOADED | http://sample.com/file/ ... |
| 123 | 250 | 20XX/1/28 15:00 | PATENT CONFERENCE | UPLOADED | http://sample.com/file/ ... |
| ... | ... | ... | ... | ... | ... |

FIG. 11

| CON-FERENCE ID | PARTICI-PANTS | TITLE | START DATE AND TIME | END DATE AND TIME | PLACE | ELECTRONIC WHITEBOARD | MEETING DEVICE | VIEWING RIGHT | ELECTRONIC WHITEBOARD OPERATION DATA ID |
|---|---|---|---|---|---|---|---|---|---|
| 001 | U001 U002 | ABC CON-FERENCE | 20XX/1/5 13:28 | 20XX/1/5 15:00 | CONFER-ENCE ROOM A | WB001 | DEVICE001 | U001,U002 | 1 |
| 002 | U001 U003 | DEF CON-FERENCE | 20XX/1/5 9:00 | 20XX/1/5 10:00 | CONFER-ENCE ROOM B | WB002 | DEVICE001 | U001,U002, U003 | 2 |
| 003 | U001 U008 U009 | GHI CON-FERENCE | 20XX/1/6 14:00 | 20XX/1/6 15:00 | CONFER-ENCE ROOM A | WB001 | DEVICE003 | U001,U008, U009 | 3 |
| ... | ... | ... | ... | ... | ... | ... | ... | ... | ... |

FIG. 12

| CONFERENCE ID | DEVICE IDENTIFIER |
|---|---|
| 001 | WB001 DEVICE001 |

FIG. 13

| CON-FER-ENCE ID | RECORD | | OBJECT INFORMATION |
| --- | --- | --- | --- |
| | COMPOSITE IMAGE VIDEO (INCLUDING AUDIO) | TEXT DATA | |
| 001 | 001_20XX03041030.mpeg | 001_20XX03041030.text | 001_20XX03041030.data |
| ... | ... | ... | ... |

FIG. 14

| ID | TIME | RECOGNITION RESULT CHARACTER STRING | AUDIO DATA | SITE IDENTIFICATION INFORMATION | TALKER ID |
| --- | --- | --- | --- | --- | --- |
| 1 | 00:01:00 | It keyword it | 1.wav | 1 | U001 |
| : | : | : | : | : | : |
| 33 | 00:40:10 | Good idea | 33.wav | 1 | U001 |
| : | : | : | : | : | : |
| 89 | 01:12:10 | That keyword it | 89.wav | 2 | U002 |
| : | : | : | : | : | : |
| 101 | 02:20:50 | That is the result | 101.wav | 2 | U002 |
| : | : | : | : | : | : |
| 122 | 03:01:30 | This keyword it | 122.wav | 1 | U001 |
| : | : | : | : | : | : |

| DEVICE IDENTIFIER | WB001 |
|---|---|
| IP ADDRESS | 1. 1. 1. 1 |
| PASSWORD | **** |

FIG. 17

ELECTRONIC WHITEBOARD OPERATION ID: 1

| OPERATION ID | OPERATION TIME | OPERATION TYPE | OBJECT ID | OBJECT TYPE | OBJECT DETAILS |
|---|---|---|---|---|---|
| 1 | 13:30:00 | CREATION (DRAWING) | 1 | STROKE | PATH, GREEN |
| 2 | 13:31:10 | CREATION (DRAWING) | 2 | TEXT | "ABC" COORDINATES, BLACK |
| 3 | 13:32:05 | DELETION | 1 | STROKE | |
| 4 | 13:33:35 | UPDATE | 2 | TEXT | "AC" |

FIG. 18

OBJECT INFORMATION TRANSITION (a)

| OBJECT ID | OBJECT TYPE | OBJECT DETAILS (STROKE PATH AND COLOR) | INPUT START TIME | LAST UPDATE TIME |
|---|---|---|---|---|
| 1 | STROKE | PATH, GREEN | 13:30:00 | 13:30:00 |

(b)

| OBJECT ID | OBJECT TYPE | OBJECT DETAILS (STROKE PATH AND COLOR) | INPUT START TIME | LAST UPDATE TIME |
|---|---|---|---|---|
| 1 | STROKE | PATH, GREEN | 13:30:00 | 13:30:00 |
| 2 | TEXT | "ABC" COORDINATES, BLACK | 13:31:10 | 13:31:10 |

(c)

| OBJECT ID | OBJECT TYPE | OBJECT DETAILS (STROKE PATH AND COLOR) | INPUT START TIME | LAST UPDATE TIME |
|---|---|---|---|---|
| 2 | TEXT | "ABC" COORDINATES, BLACK | 13:31:10 | 13:31:10 |

(d)

| OBJECT ID | OBJECT TYPE | OBJECT DETAILS (STROKE PATH AND COLOR) | INPUT START TIME | LAST UPDATE TIME |
|---|---|---|---|---|
| 2 | TEXT | "AC" COORDINATES, BLACK | 13:31:10 | 13:33:35 |

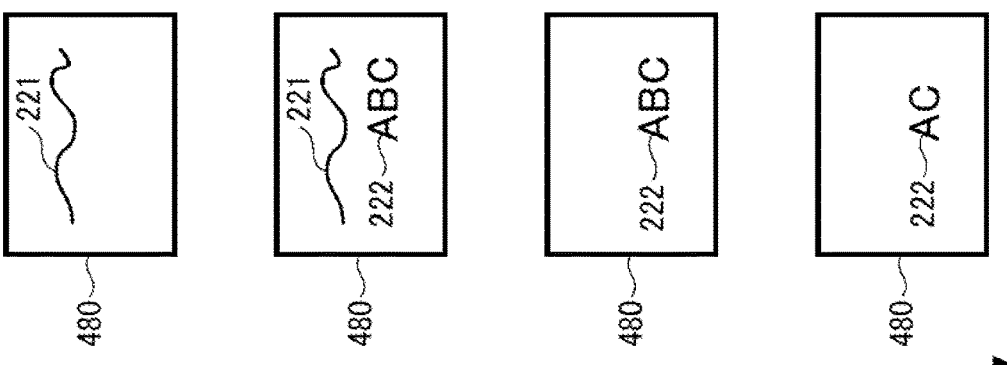

MINUTES DATA

| CON-FER-ENCE ID | PARTIC-IPANTS | TITLE | START DATE AND TIME | END DATE AND TIME | PLACE | ELEC-TRONIC WHITE-BOARD | MEETING DEVICE | VIEWING RIGHT | ELECTRONIC WHITEBOARD OPERATION DATA ID |
|---|---|---|---|---|---|---|---|---|---|
| 001 | U001 U002 | ABC CONFERENCE | 20XX/1/5 13:28 | 20XX/1/5 15:00 | CONFERENCE ROOM A | WB001 | DEVICE001 | U001,U002 | 1 |
| 002 | U001 U003 | DEF CONFERENCE | 20XX/1/5 9:00 | 20XX/1/5 10:00 | CONFERENCE ROOM B | WB002 | DEVICE001 | U001, U002, U003 | 2 |
| 003 | U001 U008 U009 | GHI CONFERENCE | 20XX/1/6 14:00 | 20XX/1/6 15:00 | CONFERENCE ROOM A | WB001 | DEVICE003 | U001, U008, U009 | 3 |
| ... | ... | ... | ... | ... | ... | ... | ... | ... | ... |

FIG. 20B

ELECTRONIC WHITEBOARD OPERATION DATA (ID: 1)

| OPERATION ID | OPERATION TIME | POST-CONVERSION OPERATION TIME | OPERATION TYPE | OBJECT ID | OBJECT TYPE | OBJECT DETAILS |
|---|---|---|---|---|---|---|
| 1 | 13:30:00 | 2:00 | CREATION (DRAWING) | 1 | STROKE | PATH, GREEN |
| 2 | 13:31:10 | 3:10 | CREATION (DRAWING) | 2 | TEXT | "ABC", COORDINATES, BLACK |
| 3 | 13:32:05 | 4:05 | DELETION | 1 | STROKE | |
| 4 | 13:33:35 | 5:35 | UPDATE | 2 | TEXT | "AC" |

Figure 22:
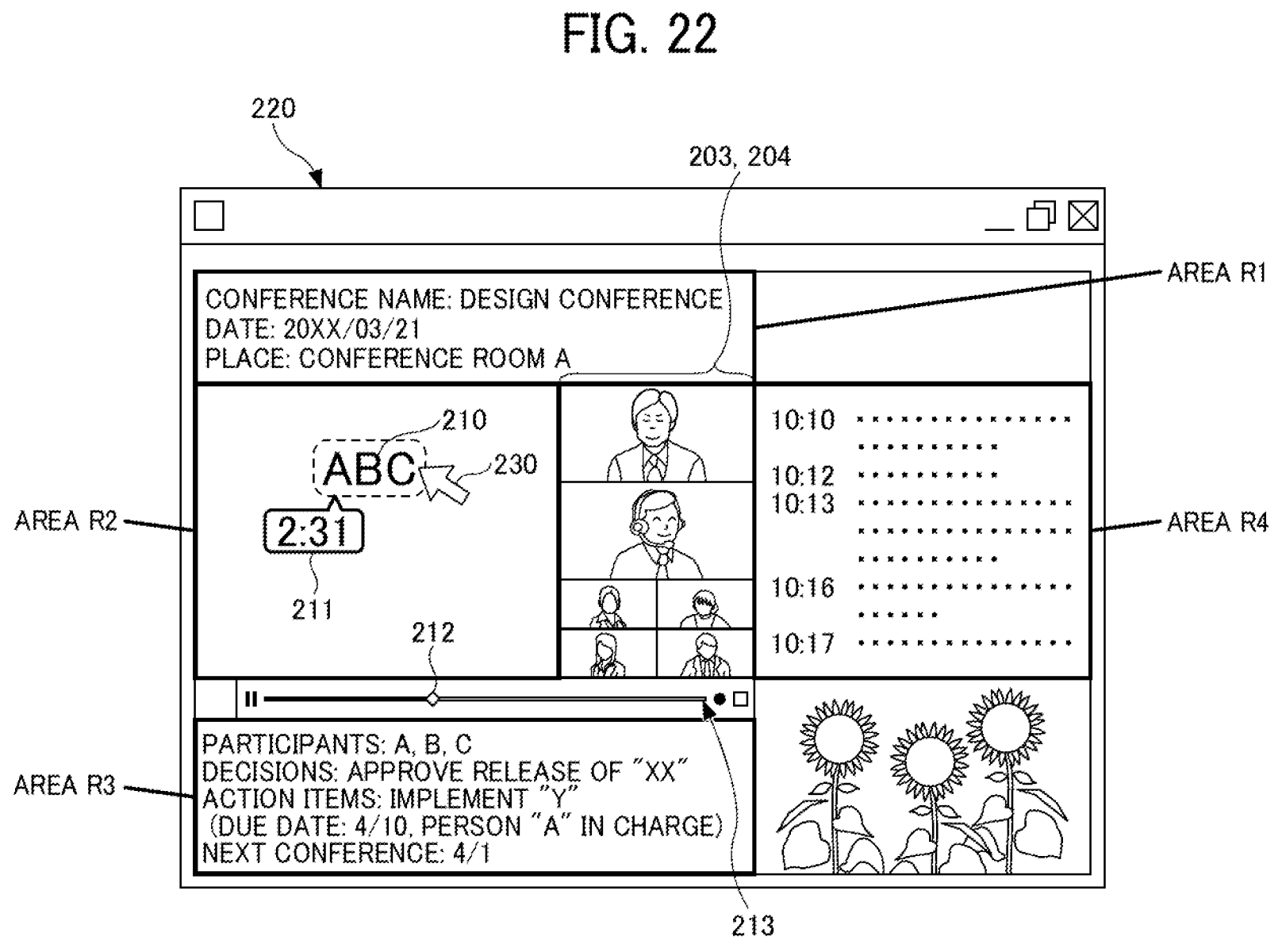

AREA R1

AREA R4

AREA R2

AREA R3

CONFERENCE NAME: DESIGN CONFERENCE
DATE: 20XX/03/21
PLACE: CONFERENCE ROOM A 210
230
ABC
2:31
211
212

PARTICIPANTS: A, B, C
DECISIONS: APPROVE RELEASE OF "XX"
ACTION ITEMS: IMPLEMENT "Y"
(DUE DATE: 4/10, PERSON "A" IN CHARGE)
NEXT CONFERENCE: 4/1

Figure 23:
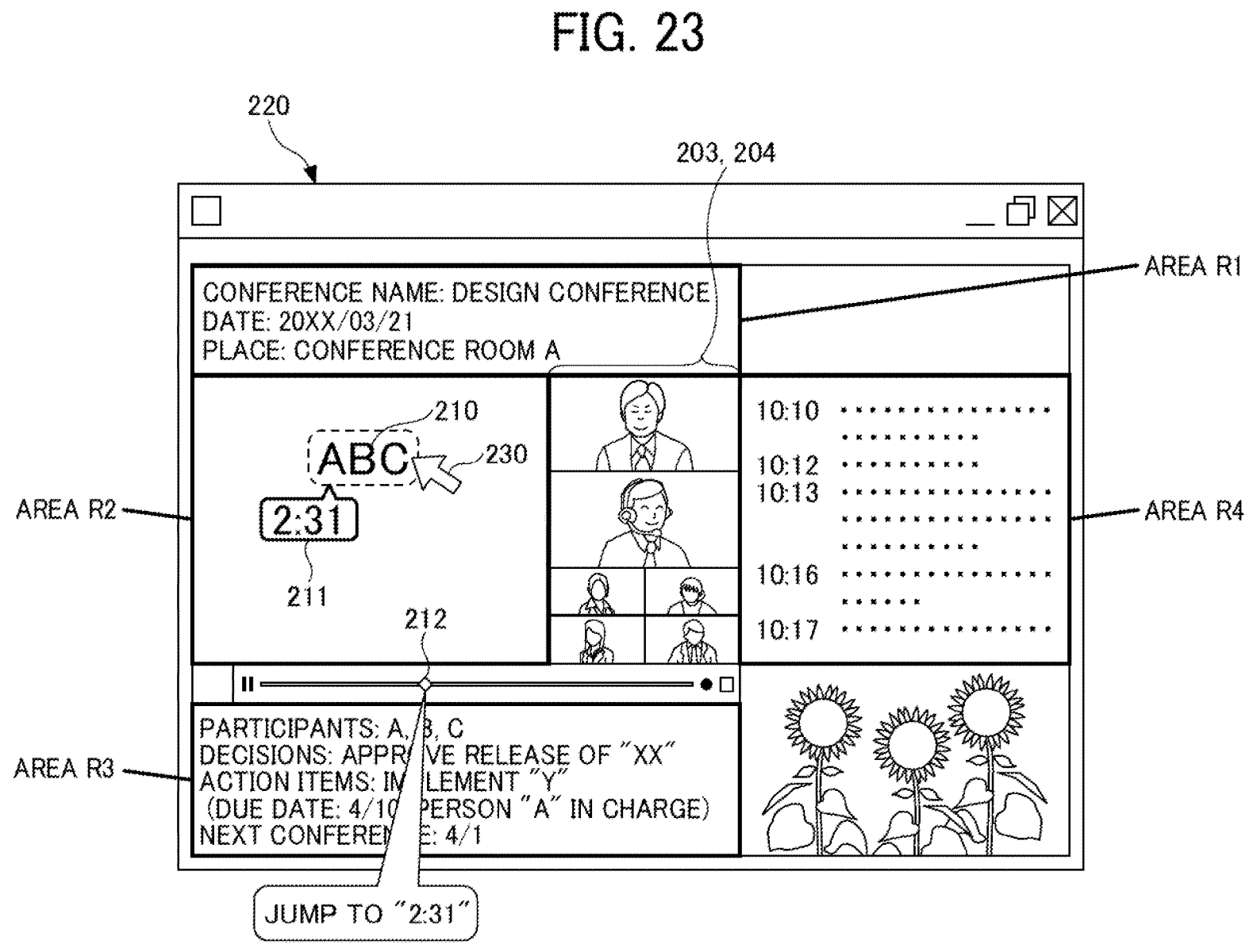

AREA R1

AREA R4

203, 204

220

CONFERENCE NAME: DESIGN CONFERENCE
DATE: 20XX/03/21
PLACE: CONFERENCE ROOM A

210

230

ABC

2:31

211

212

10:10
10:12
10:13
10:16
10:17

PARTICIPANTS: A, B, C
DECISIONS: APPROVE RELEASE OF "XX"
ACTION ITEMS: IMPLEMENT "Y"
(DUE DATE: 4/10, PERSON "A" IN CHARGE)
NEXT CONFERENCE: 4/1

JUMP TO "2:31"

AREA R2

AREA R3

FIG. 24

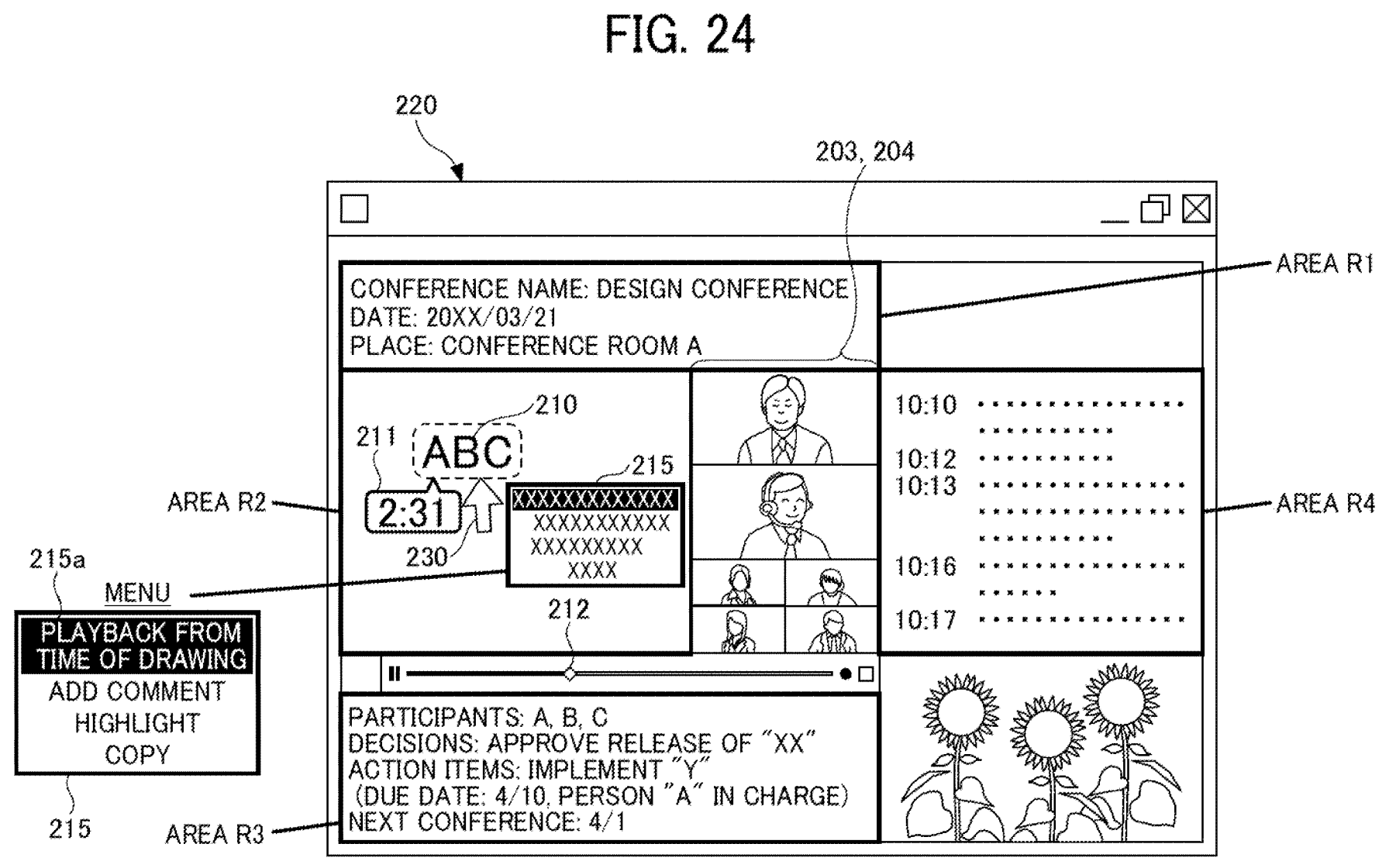

AREA R1

AREA R4

AREA R2

AREA R3

220

203, 204

CONFERENCE NAME: DESIGN CONFERENCE
DATE: 20XX/03/21
PLACE: CONFERENCE ROOM A

210

211

ABC

2:31

230

215

XXXXXXXXXXXX
XXXXXXXX
XXXX

212

10:10
10:12
10:13
10:16
10:17

PARTICIPANTS: A, B, C
DECISIONS: APPROVE RELEASE OF "XX"
ACTION ITEMS: IMPLEMENT "Y"
(DUE DATE: 4/10, PERSON "A" IN CHARGE)
NEXT CONFERENCE: 4/1

MENU

PLAYBACK FROM
TIME OF DRAWING
ADD COMMENT
HIGHLIGHT
COPY

215a

215

(a)

(b)

| OBJECT ID | OBJECT TYPE | OBJECT DETAILS (STROKE PATH AND COLOR) | INPUT START TIME | LAST UPDATE TIME |
|---|---|---|---|---|
| 1 | TEXT | "ABC", COORDINATES, BLACK | 2:31 | 3:25 |
| 2 | TEXT | "DE", COORDINATES, BLACK | 4:30 | 4:30 |

(a)

(b)

| OBJECT ID | OBJECT TYPE | OBJECT DETAILS (STROKE PATH AND COLOR) | INPUT START TIME | LAST UPDATE TIME |
|---|---|---|---|---|
| 1 | TEXT | "ABC", COORDINATES, BLACK | 2:31 | 3:25 |
| 2 | TEXT | "DE", COORDINATES, BLACK | 4:30 | 4:30 |

(a)

(b)

| OBJECT ID | OBJECT TYPE | OBJECT DETAILS (STROKE PATH AND COLOR) | INPUT START TIME | LAST UPDATE TIME |
|---|---|---|---|---|
| 1 | TEXT | "ABC", COORDINATES, BLACK | 2:31 | 3:25 |
| 2 | TEXT | "DE", COORDINATES, BLACK | 4:30 | 4:30 |

Figure 28:
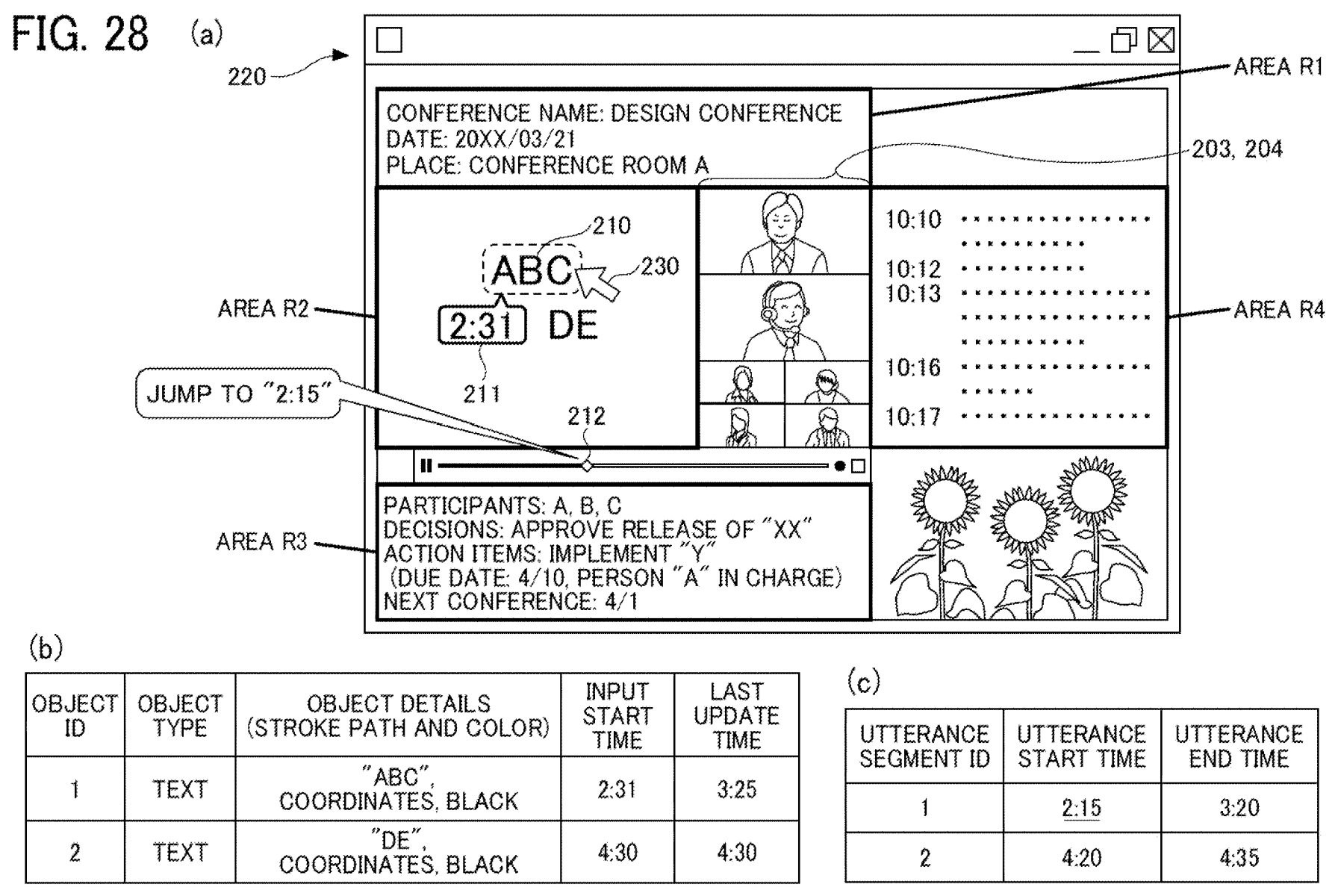

AREA R1

203, 204

AREA R4

220

AREA R2

JUMP TO "2:15"

AREA R3

CONFERENCE NAME: DESIGN CONFERENCE
DATE: 20XX/03/21
PLACE: CONFERENCE ROOM A

10:10
10:12
10:13
10:16
10:17

210

230

2:31

211

ABC

DE

212

PARTICIPANTS: A, B, C
DECISIONS: APPROVE RELEASE OF "XX"
ACTION ITEMS: IMPLEMENT "Y"
(DUE DATE: 4/10, PERSON "A" IN CHARGE)
NEXT CONFERENCE: 4/1

(b)

| OBJECT ID | OBJECT TYPE | OBJECT DETAILS (STROKE PATH AND COLOR) | INPUT START TIME | LAST UPDATE TIME |
|---|---|---|---|---|
| 1 | TEXT | "ABC", COORDINATES, BLACK | 2:31 | 3:25 |
| 2 | TEXT | "DE", COORDINATES, BLACK | 4:30 | 4:30 |

(c)

| UTTERANCE SEGMENT ID | UTTERANCE START TIME | UTTERANCE END TIME |
|---|---|---|
| 1 | 2:15 | 3:20 |
| 2 | 4:20 | 4:35 |

Figure 30:
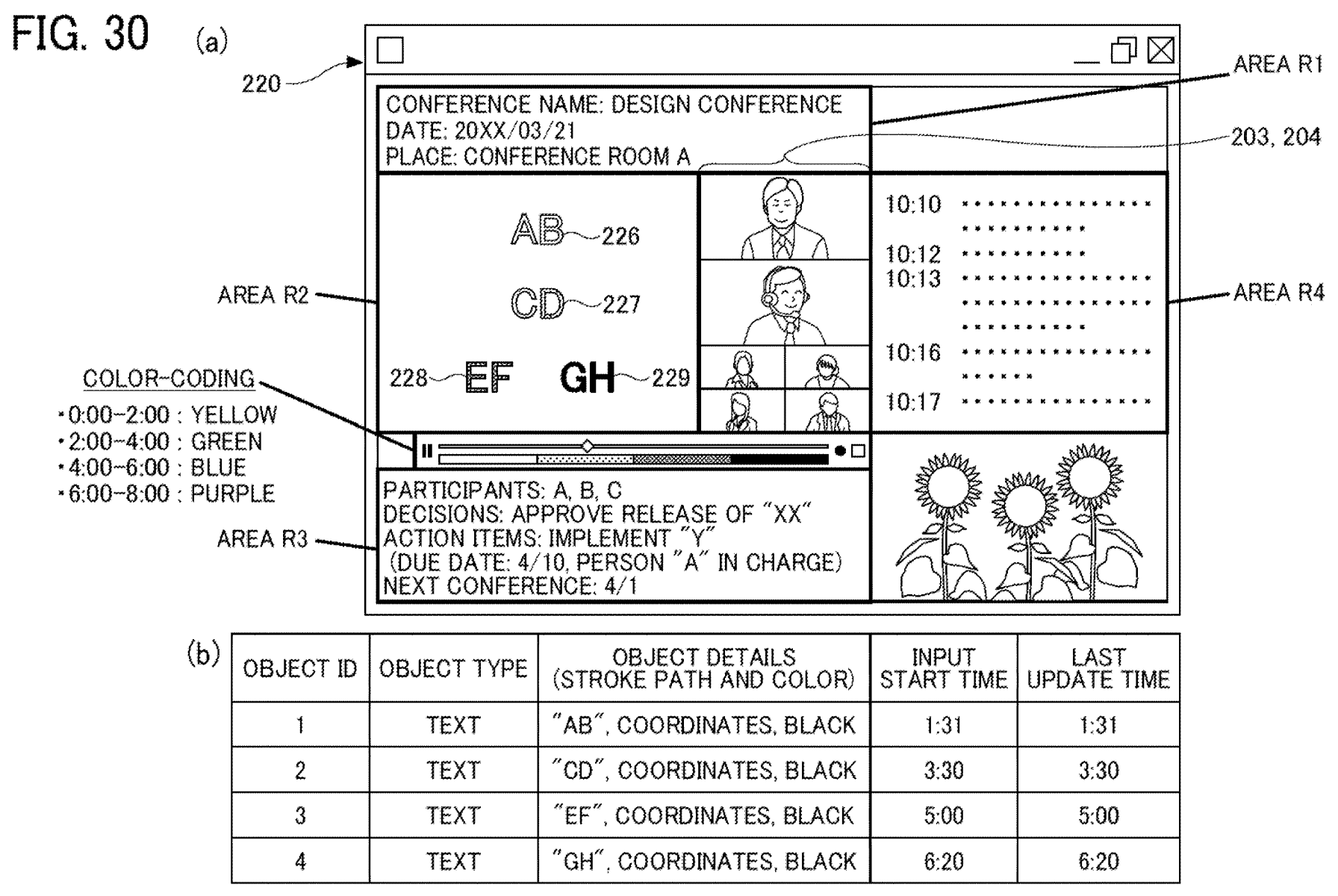

AREA R1

203, 204

AREA R4

220

CONFERENCE NAME: DESIGN CONFERENCE
DATE: 20XX/03/21
PLACE: CONFERENCE ROOM A

10:10
10:12
10:13
10:16
10:17

AB ~226
CD ~227
228~ EF  GH ~229

AREA R2

COLOR-CODING
· 0:00~2:00 : YELLOW
· 2:00~4:00 : GREEN
· 4:00~6:00 : BLUE
· 6:00~8:00 : PURPLE

PARTICIPANTS: A, B, C
DECISIONS: APPROVE RELEASE OF "XX"
ACTION ITEMS: IMPLEMENT "Y"
(DUE DATE: 4/10, PERSON "A" IN CHARGE)
NEXT CONFERENCE: 4/1

AREA R3

(b)

| OBJECT ID | OBJECT TYPE | OBJECT DETAILS (STROKE PATH AND COLOR) | INPUT START TIME | LAST UPDATE TIME |
|---|---|---|---|---|
| 1 | TEXT | "AB", COORDINATES, BLACK | 1:31 | 1:31 |
| 2 | TEXT | "CD", COORDINATES, BLACK | 3:30 | 3:30 |
| 3 | TEXT | "EF", COORDINATES, BLACK | 5:00 | 5:00 |
| 4 | TEXT | "GH", COORDINATES, BLACK | 6:20 | 6:20 |

FIG. 31

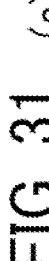

(a)

220

AREA R1

203, 204

AREA R4

CONFERENCE NAME: DESIGN CONFERENCE
DATE: 20XX/03/21
PLACE: CONFERENCE ROOM A

AB 226
CD 227
228 EF GH 229

212
3:30

10:10
10:12
10:13
10:16
10:17

AREA R2

PARTICIPANTS: A, B, C
DECISIONS: APPROVE RELEASE OF "XX"
ACTION ITEMS: IMPLEMENT "Y"
(DUE DATE: 4/10, PERSON "A" IN CHARGE)
NEXT CONFERENCE: 4/1

AREA R3

(b)

| OBJECT ID | OBJECT TYPE | OBJECT DETAILS (STROKE PATH AND COLOR) | INPUT START TIME | LAST UPDATE TIME |
|---|---|---|---|---|
| 1 | TEXT | "AB", COORDINATES, BLACK | 1:31 | 1:31 |
| 2 | TEXT | "CD", COORDINATES, BLACK | 3:30 | 3:30 |
| 3 | TEXT | "EF", COORDINATES, BLACK | 5:00 | 5:00 |
| 4 | TEXT | "GH", COORDINATES, BLACK | 6:20 | 6:20 |

FIG. 34

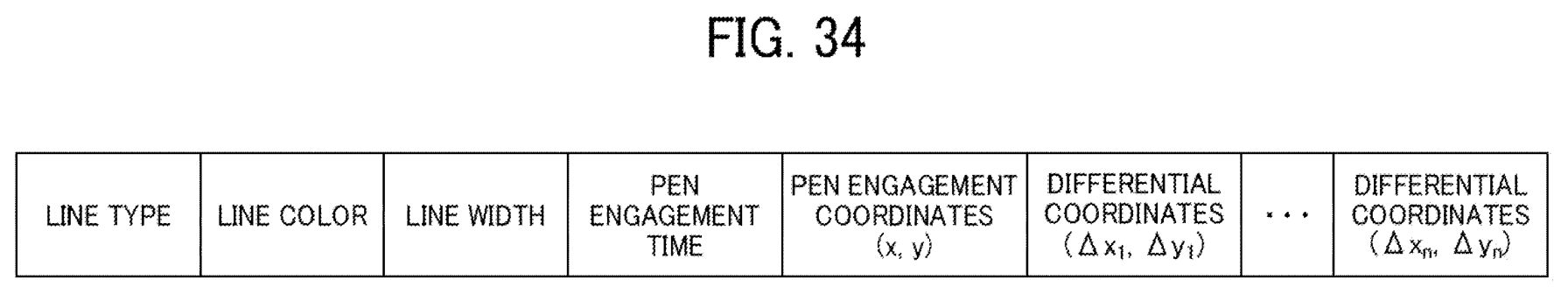

| LINE TYPE | LINE COLOR | LINE WIDTH | PEN ENGAGEMENT TIME | PEN ENGAGEMENT COORDINATES $(x, y)$ | DIFFERENTIAL COORDINATES $(\Delta x_1, \Delta y_1)$ | $\cdots$ | DIFFERENTIAL COORDINATES $(\Delta x_n, \Delta y_n)$ |
|---|---|---|---|---|---|---|---|

FIG. 46

| EVENT TYPE | EVENT TIME | VIDEO FILE NAME |
|---|---|---|
| | | |

FIG. 48

| GRAPHIC TYPE | COLOR | LINE COLOR | LINE WIDTH | DRAWING TIME | CIRCUMSCRIBED RECTANGLE START POINT COORDINATES $(x_s, y_s)$ | CIRCUMSCRIBED RECTANGLE END POINT COORDINATES $(x_e, y_e)$ |
|---|---|---|---|---|---|---|
| | | | | | | |

INFORMATION PROCESSING SERVER, RECORD CREATION SYSTEM, DISPLAY CONTROL METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application Nos. 2022-115650, filed on Jul. 20, 2022 and 2023-080044, filed on May 15, 2023, in the Japan Patent Office, the entire disclosure of which is hereby incorporated by reference herein.

BACKGROUND

Technical Field

The present disclosure relates to an information processing server, a record creation system, a display control method, and a non-transitory recording medium.

Related Art

Some display apparatuses, such as electronic whiteboards, are equipped with a touch panel display that displays an object formed of strokes drawn by a user with a dedicated electronic pen or a finger. Unlike a conventional whiteboard, such display apparatuses can store an object as electronic data and display an image of a material being displayed by an external device, such as a personal computer (PC), connected to the display apparatuses.

Some technologies have been proposed that a display apparatus displays an object displayed in the past. For example, there is an electronic whiteboard system that displays a snapshot of an object on a timeline, and allows a user to select the snapshot for viewing the object in the past retroactively.

SUMMARY

In one aspect, an information processing server is communicably connected with a display apparatus and a terminal apparatus via a network. The server includes circuitry to cause the terminal apparatus to display an object based on object information including time information indicating a time at which the object was displayed by the display apparatus and a record including audio or video recorded by a device communicably connected with the terminal apparatus, generate screen information of a screen that presents, based on the time information, instruction information for playing back the object at the time indicated by the time information or the record including the audio or the video related to the object, and transmit the record, the object information, and the screen information representing the screen to the terminal apparatus.

In another aspect, a record creation system includes a terminal apparatus communicably connected with a device, and an information processing server including first circuitry to transmit, to the terminal apparatus, a record including audio or video recorded by the device and object information including time information indicating a time at which an object was displayed by a display apparatus. The terminal apparatus includes second circuitry to receive the record and the object information, play back the record, display the object, and display, based on the time information, instruction information for playing back the object at the time indicated by the time information or the record including the audio or the video related to the object.

In another aspect, a display control method performed by an information processing server, the method includes transmitting, to a terminal apparatus, a record including audio or video recorded by a device communicably connected with the terminal apparatus, and object information including time information indicating a time at which an object was displayed by a display apparatus, generating screen information of a screen that presents, based on the time information, instruction information for playing back the object at the time indicated by the time information or the record including the audio or the video related to the object, and transmitting the record, the object information, and the screen information representing the screen to the terminal apparatus to cause the terminal apparatus.

In another aspect, a non-transitory recording medium storing a plurality of program codes which, when executed by one or more processors on a terminal apparatus, causes the processors to perform a display method, the method includes receiving, from an information processing server, a record including audio or video recorded by a device communicably connected with the terminal apparatus, and object information including time information indicating a time at which an object was displayed by a display apparatus. The method further includes playing back the record, displaying the object, and displaying, based on the time information, instruction information for playing back the object at the time indicated by the time information or the record including the audio or the video related to the object.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein:

FIG. 1 is a diagram illustrating a video playback screen displayed by a terminal apparatus according to embodiments of the present disclosure;

FIG. 10 is a diagram illustrating a data structure of information on a recorded video stored in an information storage area according to embodiments of the present disclosure;

FIG. 11 is a diagram illustrating a data structure of conference information stored in a conference information storage area according to embodiments of the present disclosure;

FIG. 12 is a diagram illustrating a data structure of association information associating device identifiers of the electronic whiteboard and the meeting device with conference identification information (ID) according to embodiments of the present disclosure;

FIG. 13 is a diagram illustrating a data structure of a record and object information stored in a record storage unit according to embodiments of the present disclosure;

FIG. 14 is a diagram illustrating a data structure of text data which is a part of the record according to embodiments of the present disclosure;

FIG. 17 is a diagram illustrating a data structure of electronic whiteboard operation data stored in an object information storage area according to embodiments of the present disclosure;

FIG. 18 is a diagram illustrating a data structure of object information stored in the object information storage area according to embodiments of the present disclosure;

FIG. 19 is a diagram illustrating a method of dividing handwritten data according to embodiments of the present disclosure;

FIGS. 20A and 20B are diagrams illustrating processing of converting an operation time into an elapsed time from a recording start time according to embodiments of the present disclosure;

FIG. 22 is a diagram illustrating a video playback screen on which a post-conversion operation time is displayed according to embodiments of the present disclosure;

FIG. 23 is a diagram illustrating a video playback screen on which a composite image video is to be played back from a post-conversion operation time in a case that an object is pressed according to embodiments of the present disclosure;

FIG. 24 is a diagram illustrating a menu displayed on the video playback screen after the object is pressed according to embodiments of the present disclosure;

FIG. 28 is a diagram illustrating the video playback screen on which a composite image video is to be played back from the beginning of an utterance segment, and a data structure of the object information related to objects displayed in the area of the video playback screen according to embodiments of the present disclosure;

FIG. 30 is a diagram illustrating the video playback screen on which objects are displayed in colors according to colors of a time indicator, and a data structure of the object information related to the objects displayed in the area of the video playback screen according to embodiments of the present disclosure;

FIG. 31 is a diagram illustrating the video playback screen on which objects are displayed in gradation according to a difference between an operation time of each object and a playback time, and a data structure of the object information related to the objects displayed in the area of the video playback screen according to embodiments of the present disclosure;

FIG. 34 is a diagram illustrating a data structure of stroke data according to embodiments of the present disclosure;

FIG. 46 is a diagram illustrating a data structure of video input event data according to embodiments of the present disclosure;

FIG. 48 is a diagram illustrating a data structure of graphic data according to embodiments of the present disclosure;

Figure 2:
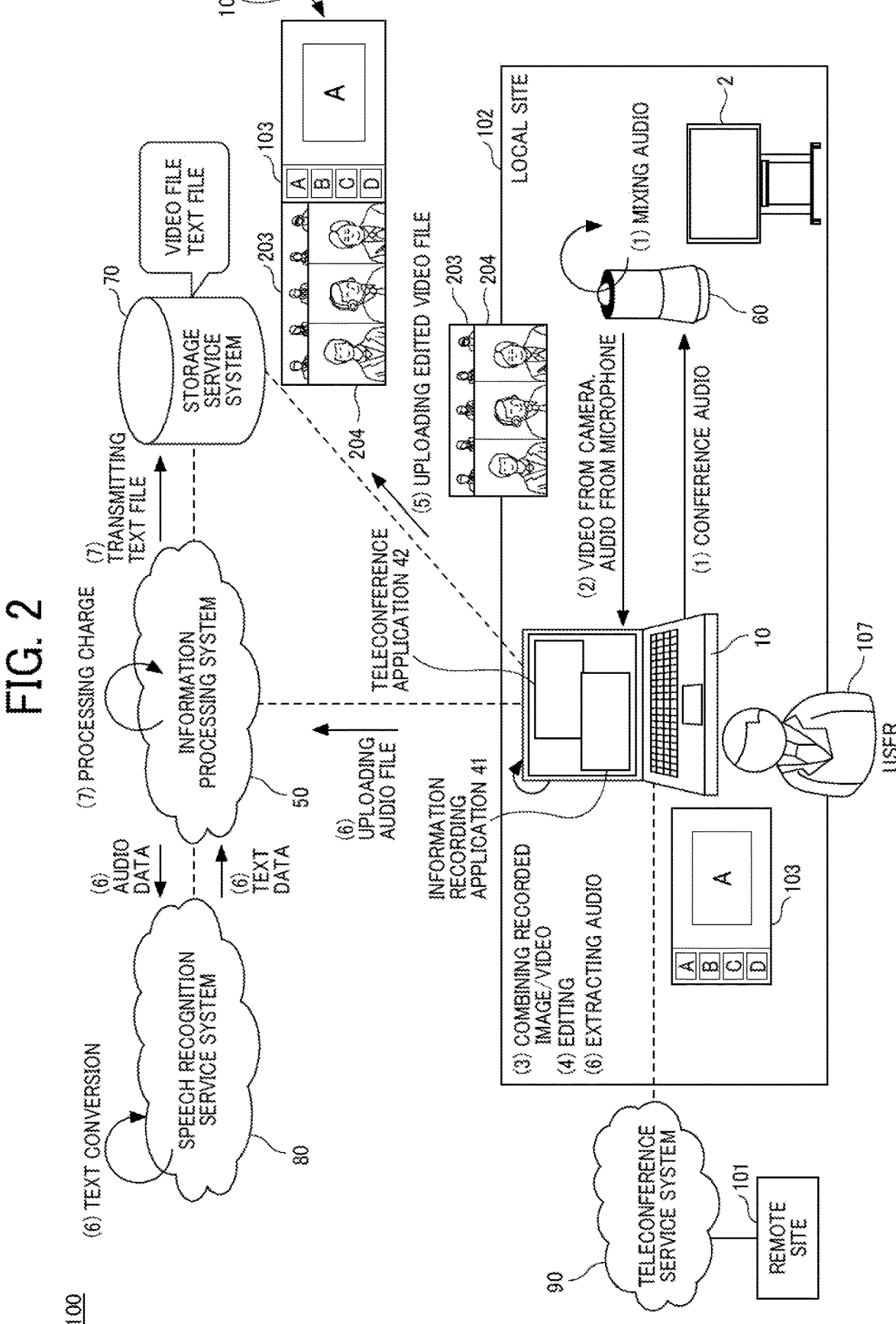
FIG. 2 is a schematic diagram illustrating an overview of creating a record in which an application screen of an application executed in a teleconference is stored together with a panoramic image of surroundings according to embodiments of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, descriptions are given of a record creation system and a display control method performed by the record creation system as exemplary embodiments of the present disclosure.

First Embodiment

Overview of Synchronous Playback of Record and Object Information

FIG. 1 is a diagram illustrating a video playback screen 220 displayed by a terminal apparatus. Details of the video playback screen 220 will be described later. In the example of FIG. 1, in a case that a viewer presses any object selected with a cursor 230 of a pointing device 512 such as a mouse, the time at which the object is displayed (e.g., an input start time, a last update time, etc.) is displayed on the video playback screen 220. In FIG. 1, an object 210 of "ABC" is selected by the viewer. Then, the time information (a post-conversion operation time 211 to be described later) of "2:31" indicating an input start time at which "ABC" is input is displayed. Accordingly, it is understood that the viewer can check, by designating "2:31" on a time indicator 213, the state of the conference at the time at which the object 210 of "ABC" is input.

As described above, the record creation system according to the present embodiment can display the time at which a discussion on an object is conducted in a conference in association with the object.

Terminology

The term "instruction information" refers to information used for playing back a record in which audio and video related to an object are recorded. The instruction information includes a part of the time period in which the object is displayed. The instruction information may include a position on the time indicator in place of the time itself as long as an approximate time at which the object is displayed is known in the record.

The term "conference" refers to gathering together and discussing. The conference may also be referred to as a convention, an assembly, a get-together, a meeting, a deliberation, a recital, a presentation, a gathering, a consultation, a talk, a council, a discussion, or a seminar.

The term "device" refers to any device that records audio and video in a conference. Alternatively, the device may record only the audio. In the present embodiment, the device is described with the term "meeting device."

The term "record" refers to, for example, audio recorded in a conference. The record may also include video. The audio may or may not be converted into text data.

The term "stroke" refers to a series of user operations including engaging a writing mode, recording movement of an input device or a portion of a user, and then disengaging the writing mode. The stroke includes tracking movement of the input device or the portion of the user without contacting the display or screen. In this case, the writing mode of an electronic whiteboard may be engaged or turned on by a gesture of the user, pressing a button by a hand or a foot of the user, or otherwise turning on the writing mode, for example, using a mouse or any other pointing device. Further, disengaging the writing mode can be accomplished by the same or different gesture used to engage the writing mode, releasing the button, or otherwise turning off the writing mode, for example, using the mouse or any other pointing device.

The term "stroke data" refers to information that is displayed on a display based on a trajectory of coordinates input with the input means such as the input device. The stroke data may be interpolated appropriately. The term "handwritten data" refers to data having one or more pieces of stroke data. The handwritten data may alternatively be referred to as hand-drafted data, as the handwritten data may represent not only writing but also drawing. The term "handwritten input" refers to inputting the handwritten data performed by a user by handwriting, drawing, and other forms of input. The handwritten input may be performed via a touch interface, with a tactile object such as a pen or stylus or with the user's body. The handwritten input may also be performed via other types of input, such as gesture-based input, hand motion tracking input, or other touch-free input by a user. Some embodiments of the present disclosure described below relate to handwritten input and handwritten input data, but other forms of handwritten input may be utilized and are within the scope of the present disclosure. For the descriptive purposes, in this disclosure, stroke data, which is data of stroke(s), and stroke(s) input by the user may be used interchangeably.

The term "object" refers to an item displayed on a display based on stroke data. The object in this specification also represents an object to be displayed. An object obtained by handwriting recognition and conversion of stroke data may include, in addition to text, a stamp displayed as a given character or mark such as "complete," a shape such as a circle or a star, or a line. The term "text" refers to a character string (character code) primarily including one or more characters and may also include numerals and symbols. The text may be referred to as a character string.

Example of Method of Creating Minutes of Teleconference

With reference to FIG. 2, an overview of a method of creating minutes using a panoramic image and an application screen is described. FIG. 2 is a schematic diagram illustrating an overview of creating a record in which an application screen of an application executed in a teleconference is stored together with a panoramic image of surroundings. As illustrated in FIG. 2, a user at a local site 102 uses a teleconference service system 90 to hold a teleconference with other users at a remote site 101.

A record creation system 100 according to the present embodiment includes a terminal apparatus 10, and a meeting device 60 that includes an imaging device, a microphone, and a speaker. The record creation system 100 creates a record (minutes) using a screen generated by an application executed by the terminal apparatus 10 and a horizontal panoramic image (hereinafter referred to as a panoramic image) captured by the meeting device 60. The record creation system 100 synthesizes audio data received by a teleconference application 42 operating on the terminal apparatus 10 and audio data obtained by the meeting device 60 together, and includes the resultant synthesized audio data in the record. The overview is described below.

(1) On the terminal apparatus 10, an information recording application 41 to be described later and the teleconference application 42 are operating. In addition, another application such as a document display application may also be operating on the terminal apparatus 10. The information recording application 41 transmits audio data output from the terminal apparatus 10 (including audio data received by the teleconference application 42 from the remote site 101) to the meeting device 60. The meeting device 60 mixes (synthesizes) the audio data obtained by the meeting device 60 and the audio data received by the teleconference application 42.

(2) The meeting device 60 executes processing of cutting out an image of a talker from a panoramic image based on a direction from which audio is collected by the microphone included in the meeting device 60 and generates talker images. The meeting device 60 transmits both the panoramic image and the talker images to the terminal apparatus 10.

(3) The information recording application 41 operating on the terminal apparatus 10 displays a panoramic image 203 and talker images 204. The information recording application 41 combines the panoramic image 203 and the talker images 204 with any application screen (e.g., an application screen 103 of the teleconference application 42) selected by the user. For example, the information recording application 41 combines the panoramic image 203 and the talker images 204 with the application screen 103 of the teleconference application 42 to generate a composite image 105 such that the panoramic image 203 and the talker images 204 are arranged on the left side and the application screen 103 is arranged on the right side. Since the processing (3) is repeatedly executed, the resultant composite images 105 form a video (hereinafter referred to as a composite image video). Further, the information recording application 41 attaches the synthesized audio data to the composite image video to generate a video with audio.

In the present embodiment, an example of combining the panoramic image 203 and the talker images 204 with the application screen 103 is described. Alternatively, the information recording application 41 may store these images separately and arrange these images on a screen at the time of playback.

(4) The information recording application 41 receives an editing operation (performed by the user to cut off portions not to be used), and completes the composite image video. The composite image video forms a part of the record.

(5) The information recording application 41 transmits the generated composite image video (with audio) to a storage service system 70 for storage.

(6) The information recording application 41 extracts only the audio data from the composite image video (or may use the audio data before being combined) and transmits the extracted audio data to an information processing system 50. The information processing system 50 receives the audio data and transmits the audio data to a speech recognition service system 80 that converts audio data into text data. The speech recognition service system 80 converts the audio data into text data. The text data includes data indicating an elapsed time, from a start of recording, at which the audio data is generated. In other words, the text data includes data indicating how many minutes have elapsed from a start of recording until utterance.

In a case that the text conversion is performed in real time, the meeting device 60 transmits the audio data directly to the information processing system 50. The information processing system 50 transmits the text data obtained by speech recognition to the information recording application 41 in real time.

(7) The information processing system 50 transmits the text data to the storage service system 70 for storage in addition to the composite image video. The text data forms a part of the record.

The information processing system 50 has a function to execute processing of charging the user according to the service used by the user. For example, a charging fee is calculated based on an amount of the text data, a file size of the composite image video, or processing time.

As described above, in the composite image video, the panoramic image of surroundings including the user and the talker images are displayed. Further, in the composite image video, an application screen of an application such as the teleconference application 42 displayed in the teleconference is displayed. In a case that a participant of the teleconference or a person who has not participated in the teleconference views the composite image video as the minutes, scenes in the teleconference are played back with a sense of presence.

Configuration of Record Creation System

Figure 3:
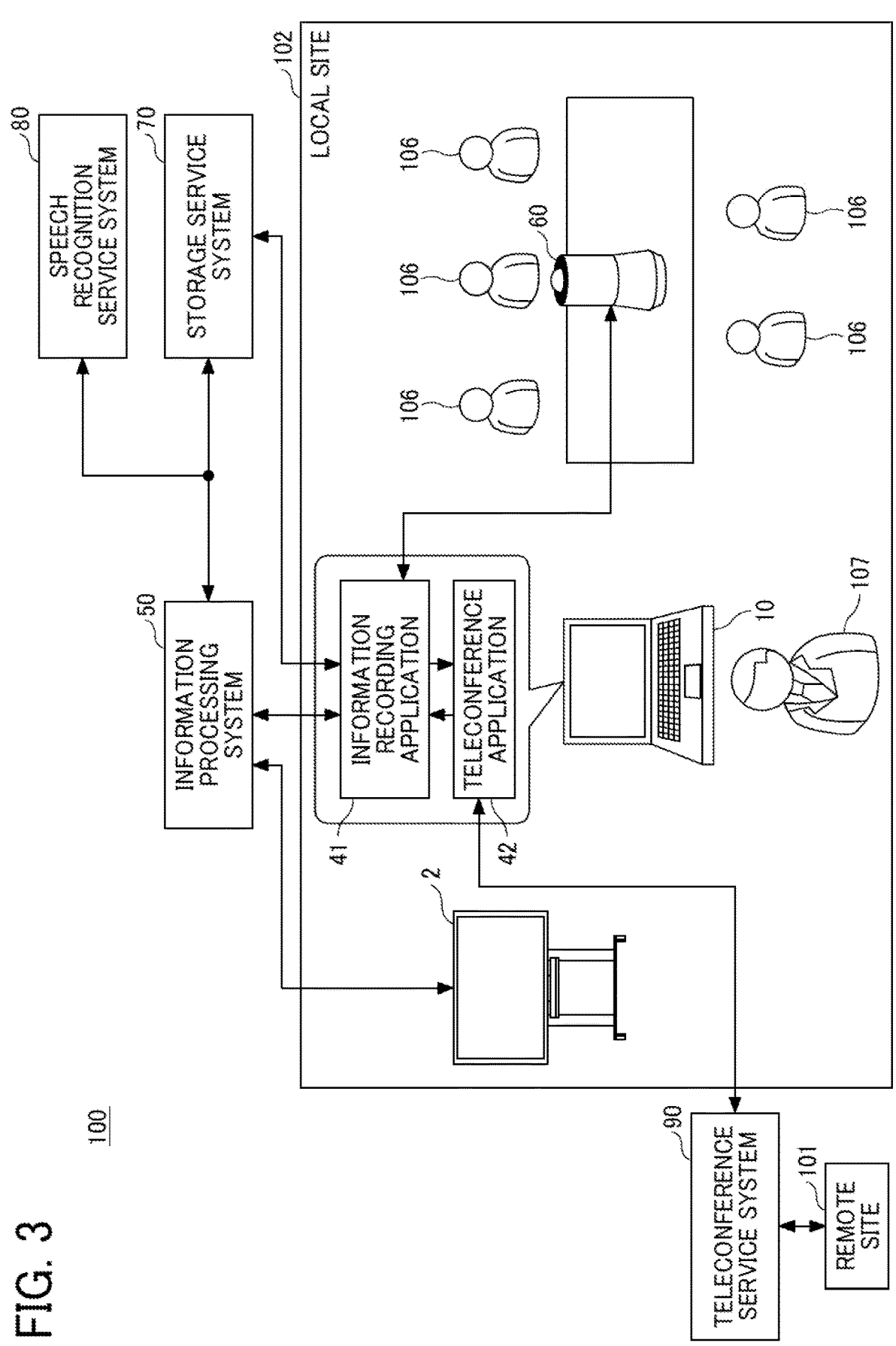
FIG. 3 is a schematic diagram illustrating a configuration of a record creation system according to embodiments of the present disclosure.

With reference to FIG. 3, a configuration of the record creation system 100 is described. FIG. 3 is a schematic diagram illustrating a configuration of the record creation system 100. In FIG. 3, one site (the local site 102) among a plurality of sites participating in a teleconference is illustrated. The terminal apparatus 10 located at the local site 102 communicates with the information processing system 50, the storage service system 70, and the teleconference service system 90 via a network. In addition, the meeting device 60 and the electronic whiteboard 2 are placed in the local site 102. The terminal apparatus 10 is communicably connected to the meeting device 60 via a universal serial bus (USB) cable.

On the terminal apparatus 10, at least the information recording application 41 and the teleconference application 42 operate. The teleconference application 42 communicates with another terminal apparatus 10 located at the remote site 101 via the teleconference service system 90 residing on the network to allow users at different sites to participate remotely in the teleconference. The information recording application 41 uses functions of the information processing system 50 and the meeting device 60 to create a record of the teleconference held by the teleconference application 42.

In the present embodiment, an example of creating a record of a teleconference is described. However, in another example, the conference is not necessarily a conference that involves communication to a remote site. In other words, the conference may be a conference in which participants at a single site participate. In this case, the image captured by the meeting device 60 and the audio collected by the meeting device 60 are independently stored without being combined. The rest of the processing executed by the information recording application 41 is performed as in the conference that involves communication to a remote site.

The terminal apparatus 10 includes a built-in (or external) camera having an ordinary angle of view. The camera included in the terminal apparatus 10 captures an image of a front space including a user 107 who operates the terminal apparatus 10. Images captured by the camera having the ordinary angle of view are not panoramic images. In the present embodiment, the built-in camera having the ordinary angle of view primarily captures planar images that are not curved like spherical images. Thus, the user can participate in a teleconference using the teleconference application 42 as usual without paying attention to the information recording application 41. The information recording application 41 and the meeting device 60 do not affect the teleconference application 42 except for an increase in the processing load of the terminal apparatus 10. The teleconference application 42 can transmit a panoramic image and a talker image captured by the meeting device 60 to the teleconference service system 90.

The information recording application 41 communicates with the meeting device 60 to create a record of a conference. The information recording application 41 also synthesizes audio collected by the meeting device 60 and audio received by the teleconference application 42 from a remote site. Alternatively, the meeting device 60, in place of the information recording application 41, may synthesize the audio collected by the meeting device 60 and the audio received by the teleconference application 42 from a remote site. The meeting device 60 is a device for a conference, including an imaging device that can capture a panoramic image, a microphone, and a speaker. The camera included in the terminal apparatus 10 captures an image of only a limited range of the front space. In contrast, the meeting device 60 captures an image of the entire surroundings (but not necessarily the entire surroundings) around the meeting device 60. The meeting device 60 can keep a plurality of participants 106 illustrated in FIG. 3 within the angle of view at all times.

In addition, the meeting device 60 cuts out a talker image from a panoramic image. The meeting device 60 is placed on a table in FIG. 3, but may be placed anywhere in the local site 102. Since the meeting device 60 can capture a spherical image, the meeting device 60 may be disposed, for example, on a ceiling.

The information recording application 41 displays a list of applications operating on the terminal apparatus 10, combines images for creating the above-described record (generates a composite image video), plays back the composite image video, and receives editing. Further, the information recording application 41 displays a list of teleconferences already held or to be held in the future. The list of teleconferences is used in information on the record to allow the user to link a teleconference with the record.

The teleconference application 42 establishes communication connection with the remote site 101, transmits and receives images and audio to and from the remote site 101, displays images, and outputs audio.

The information recording application 41 and the teleconference application 42 each may be a web application or a native application. The web application is an application in which a program on a web server and a program on a web browser cooperate with each other to perform processing. The web application does not have to be installed in the terminal apparatus 10. The native application is an application that is installed in the terminal apparatus 10 for use. In the present embodiment, both the information recording application 41 and the teleconference application 42 are described as native applications.

The terminal apparatus 10 may be, for example, a general-purpose information processing apparatus having a communication function, such as a personal computer (PC), a smartphone, or a tablet terminal. Alternatively, the terminal apparatus 10 may be, for example, an electronic whiteboard, a game console, a personal digital assistant (PDA), a wearable PC, a car navigation system, an industrial machine, a medical device, or a networked home appliance. The terminal apparatus 10 may be any apparatus on which the information recording application 41 and the teleconference application 42 operate.

The electronic whiteboard 2 is a display apparatus that displays, on a display, data handwritten on a touch panel with an input device such as a pen or a portion of the user such as a finger. The electronic whiteboard 2 communicates with the terminal apparatus 10 by wired or wireless communication, and can capture a screen displayed by a PC 470 to display the captured screen on the display. The electronic whiteboard 2 can convert the handwritten data into text data, and can share information displayed on the display with another electronic whiteboard 2 located at a remote site. The electronic whiteboard 2 may be simply a whiteboard not including a touch panel, onto which a projector projects an image. Alternatively, the electronic whiteboard 2 may be, for example, a tablet terminal including a touch panel, a notebook PC, a PDA, or a game console.

The electronic whiteboard 2 communicates with the information processing system 50. For example, after being powered on, the electronic whiteboard 2 performs polling on the information processing system 50 to receive information from the information processing system 50.

The information processing system 50 is implemented by one or more information processing apparatuses residing on a network. The information processing system 50 includes at least one server application that performs processing in cooperation with the information recording application 41, and provides basic services. The server application manages a list of teleconferences, records recorded in teleconferences, various settings, and path information of storages. Examples of the basic services are user authentication, processing of contracting, and processing of charging. Thus, the information processing system may be referred to as an information processing server.

All or some of the functions of the information processing system 50 may reside in a cloud environment or in an on-premises environment. The information processing system 50 may be implemented by a plurality of server apparatuses or may be implemented by a single information processing apparatus. For example, the server application and the basic services may be provided by different information processing apparatuses. Further, each function of the server application may be provided by an individual information processing apparatus. The information processing system 50 may be integral with the storage service system 70 and the speech recognition service system 80 to be described below.

The storage service system 70 is a storage on a network and provides a storage service for accepting the storage of files. Examples of the storage service system 70 include MICROSOFT ONEDRIVE, GOOGLE WORKSPACE, and DROPBOX. The storage service system 70 may be, for example, a Network Attached Storage (NAS) in an on-premises environment.

The speech recognition service system 80 performs speech recognition on audio data to provide a service of converting the audio data into text data. The speech recognition service system 80 may be, for example, a general commercial service or a part of the functions of the information processing system 50.

Hardware Configurations

Figure 4:
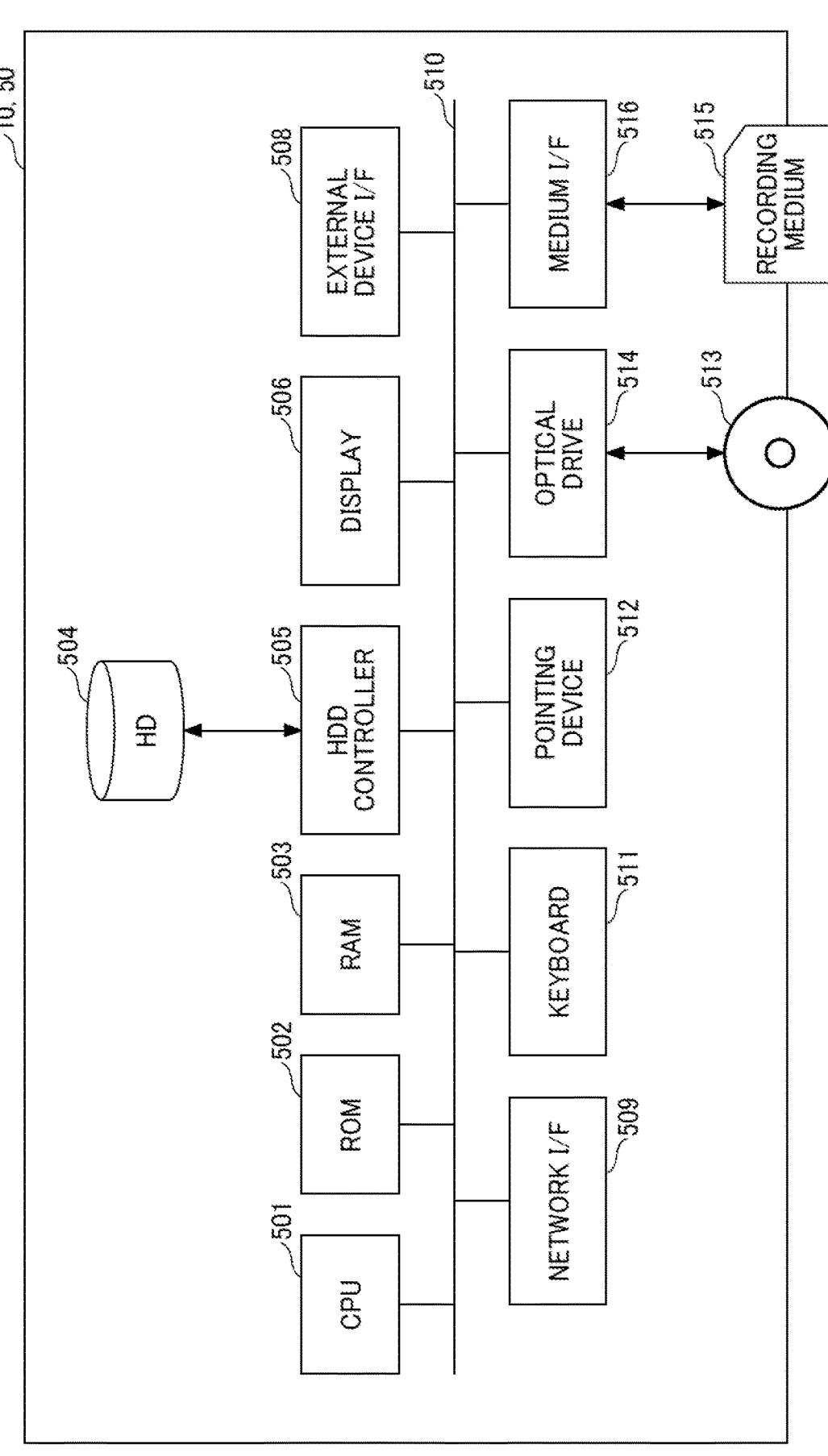
FIG. 4 is a block diagram illustrating a hardware configuration of an information processing system and a terminal apparatus according to embodiments of the present disclosure.

With reference to FIG. 4, a hardware configuration of the information processing system 50 and the terminal apparatus 10 according to the present embodiment is described.

Hardware Configuration of Information Processing System and Terminal Apparatus FIG. 4 is a block diagram illustrating a hardware configuration of the information processing system 50 and the terminal apparatus 10 according to the present embodiment. As illustrated in FIG. 4, each of the information processing system 50 and the terminal apparatus 10 is implemented by a computer. The computer includes a central processing unit (CPU) 501, a read only memory (ROM) 502, a random access memory (RAM) 503, a hard disk (HD) 504, a hard disk drive (HDD) controller 505, a display 506, an external device interface (I/F) 508, a network I/F 509, a bus line 510, a keyboard 511, the pointing device 512, an optical drive 514, and a medium I/F 516.

The CPU 501 controls entire operations of the information processing system 50 and the terminal apparatus 10 to which the CPU 501 belongs. The ROM 502 stores a program such as an initial program loader (IPL) used for driving the CPU 501. The RAM 503 is used as a work area for the CPU 501. The HD 504 stores various data such as a control program. The HDD controller 505 controls reading and writing of various data from and to the HD 504 under control of the CPU 501. The display 506 displays various information such as a cursor, a menu, a window, characters, and images. The external device I/F 508 is an interface for connection with various external devices. Examples of the external devices include, but are not limited to, a USB memory and a printer. The network I/F 509 is an interface for data communication through a communication network. The bus line 510 may be an address bus or a data bus, which electrically connects various elements such as the CPU 501 illustrated in FIG. 4.

The keyboard 511 is an example of an input device including a plurality of keys used for inputting characters, numerical values, and various instructions. The pointing device 512 is an example of an input device that allows a user to select or execute various instructions, select an object for processing, and move a cursor being displayed. The optical drive 514 controls reading and writing of various data from and to an optical recording medium 513, which is an example of a removable recording medium. The optical recording medium 513 may be a compact disc (CD), a digital versatile disc (DVD), or BLU-RAY disc. The medium I/F 516 controls reading and writing (storing) of data from and to a recording medium 515 such as a flash memory.

Hardware Configuration of Meeting Device

Figure 5:
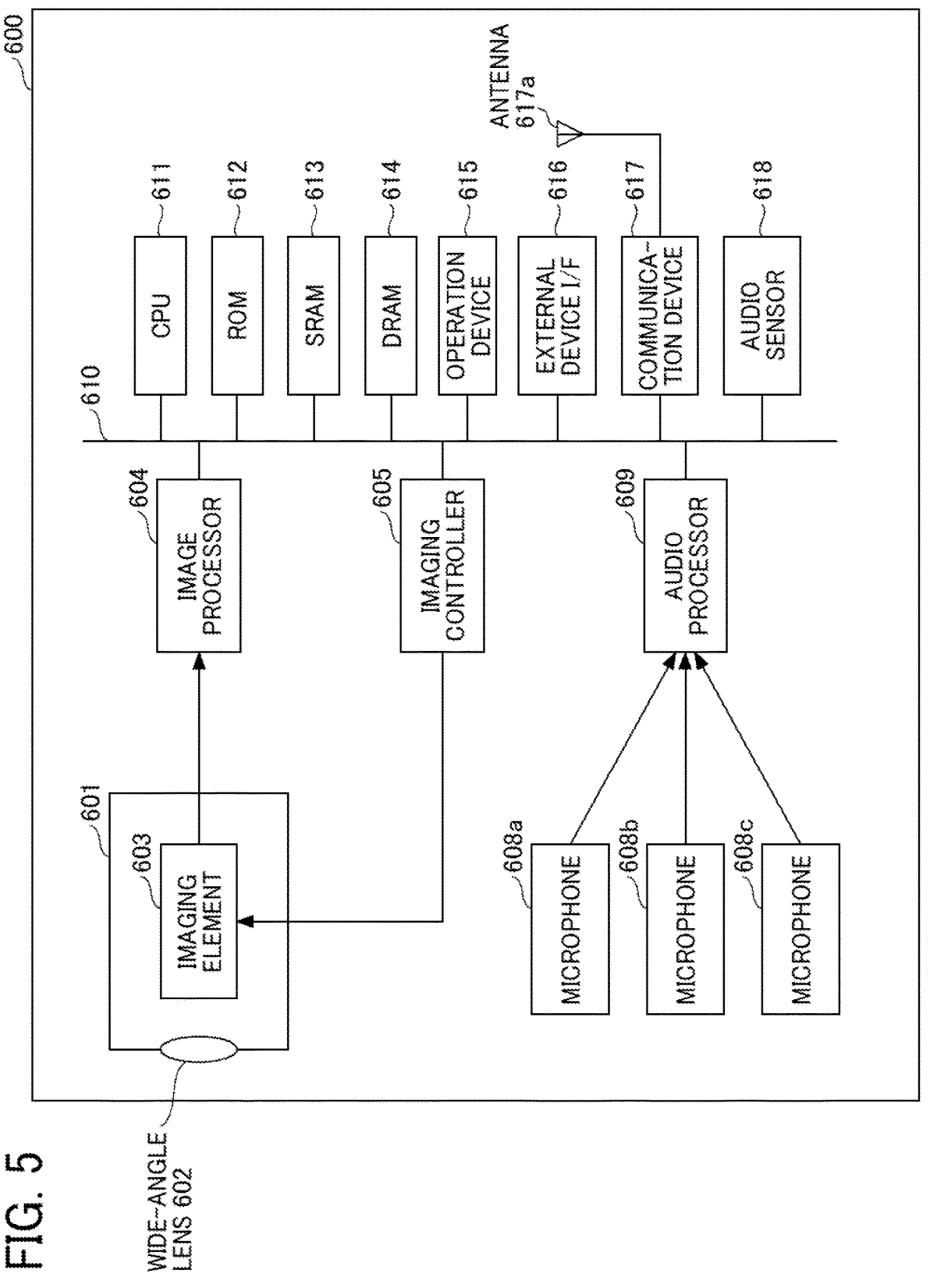
FIG. 5 is a block diagram illustrating a hardware configuration of a meeting device that can capture a video of surroundings in 360 degrees according to embodiments of the present disclosure.

With reference to FIG. 5, a hardware configuration of the meeting device 60 is described. FIG. 5 is a block diagram illustrating the hardware configuration of the meeting device 60 that can capture a video of surroundings in 360 degrees, according to the present embodiment. In the following description, the meeting device 60 is assumed to be a device that uses an imaging element to capture a video of surroundings in 360 degrees around the meeting device 60 at a predetermined height. The number of imaging elements may be one or two or more. The meeting device 60 is not necessarily a dedicated device. Alternatively, an external imaging unit that can capture a video of surroundings in 360 degrees may be retrofitted to a PC, a digital camera, or a smartphone to implement a meeting device having substantially the same functions as those of the meeting device 60.

As illustrated in FIG. 5, the meeting device 60 includes an imaging device 601, an image processor 604, an imaging controller 605, microphones 608a to 608c, an audio processor 609, a CPU 611, a ROM 612, a static random access memory (SRAM) 613, a dynamic random access memory (DRAM) 614, an operation device 615, an external device I/F 616, a communication device 617, an antenna 617a, and an audio sensor 618.

The imaging device 601 includes a wide-angle lens 602 (so-called a fish-eye lens) having an angle of view of 360 degrees to form a hemispherical image, and an imaging element 603 (an image sensor) provided for the wide-angle lens 602. The imaging element 603 includes an imaging sensor such as a complementary metal oxide semiconductor (CMOS) sensor or a charge-coupled device (CCD) sensor, a timing generation circuit, and a group of registers. The imaging sensor converts an optical image formed by the wide-angle lens 602 into electric signals to output image data. The timing generation circuit generates horizontal or vertical synchronization signals, and pixel clocks for the imaging sensor. Various commands and parameters for operations of the imaging element 603 are set in the group of registers.

The imaging element 603 (image sensor) of the imaging device 601 is connected to the image processor 604 via a parallel I/F bus. In addition, the imaging element 603 of the imaging device 601 is connected to the imaging controller 605 via a serial I/F bus such as an inter-integrated circuit (I2C) bus. Each of the image processor 604, the imaging controller 605, and the audio processor 609 is connected to the CPU 611 via a bus 610. The ROM 612, the SRAM 613, the DRAM 614, the operation device 615, the external device I/F 616, the communication device 617, and the audio sensor 618 are also connected to the bus 610.

The image processor 604 obtains image data output from the imaging element 603 via the parallel I/F bus and performs predetermined processing on the image data to generate data of a panoramic image and talker images from a fish-eye image. The image processor 604 combines the panoramic image and the talker images together to output a single moving image.

The imaging controller 605 typically serves as a master device, whereas the imaging element 603 typically serves as a slave device. The imaging controller 605 sets commands in the group of registers of the imaging element 603 via the I2C bus. The imaging controller 605 receives the commands from the CPU 611. In addition, the imaging controller 605 obtains status data of the group of registers of the imaging element 603 via the I2C bus and transmits the status data to the CPU 611.

Further, the imaging controller 605 instructs the imaging element 603 to output image data at a timing when an imaging start button of the operation device 615 is pressed or a timing when the imaging controller 605 receives an instruction to start imaging from the CPU 611. In some cases, the meeting device 60 has functions that support a preview display function and a video display function to be implemented by a display (e.g., a display of a PC or a smartphone). In this case, the image data is consecutively output from the imaging element 603 at a predetermined frame rate (frames per minute).

Furthermore, as will be described later, the imaging controller 605 operates in cooperation with the CPU 611 to function as a synchronization controller that synchronizes the time at which the imaging element 603 outputs the image data. In the present embodiment, the meeting device 60 does not include a display. However, in another embodiment, the meeting device 60 may include a display.

The microphones 608a to 608c convert audio into audio (signal) data. The audio processor 609 obtains the audio data output from each of the microphones 608a to 608c via I/F buses, mixes (synthesizes) the audio data output from each of the microphones 608a to 608c, and performs predetermined processing on the synthesized audio data. The audio processor 609 also determines a direction of an audio source (talker) from a level of the audio (volume) input from each of the microphones 608a to 608c.

The CPU 611 controls entire operation of the meeting device 60 and executes necessary processing. The ROM 612 stores various programs for operating the meeting device 60. Each of the SRAM 613 and the DRAM 614 is a work memory and stores programs to be executed by the CPU 611, and data being processed. In particular, the DRAM 614 stores image data being processed by the image processor 604 and processed data of an equirectangular projection image.

The operation device 615 collectively refers to various operation buttons such as the imaging start button. The user operates the operation device 615 to start capturing an image or recording. In addition, the user operates the operation device 615 to turn on or off the meeting device 60, to establish a connection for communication, and to input settings such as various imaging modes and imaging conditions.

The external device I/F 616 is an interface for connection with various external devices. The external device in this case is, for example, a PC. The video data or image data stored in the DRAM 614 is transmitted to an external terminal apparatus or stored in an external recording medium via the external device I/F 616.

The communication device 617 may communicate with a cloud server via the Internet using a wireless communication technology such as Wireless Fidelity (Wi-Fi) via an antenna 617a included in the meeting device 60 and transmit the video data or image data stored in the DRAM 614 to the cloud server. Further, the communication device 617 may be able to communicate with nearby devices using a short-range wireless communication technology such as BLUETOOTH LOW ENERGY (BLE) or the near field communication (NFC).

The audio sensor 618 is a sensor that obtains audio data in 360 degrees in order to identify the direction from which audio of high volume is input in the surroundings in 360 degrees (on a horizontal plane) around the meeting device 60. The audio processor 609 determines a direction in which the audio of the highest volume is input in the surroundings in 360 degrees based on a 360-degree audio parameter input in advance, and outputs the audio input from the determined direction.

Note that another sensor such as an azimuth and acceleration sensor or a global positioning system (GPS) sensor may be used to calculate an azimuth, a position, an angle, and an acceleration for image correction or addition of position information.

The CPU 611 generates a panoramic image in the following method. The CPU 611 executes predetermined camera image processing such as Bayer interpolation (red green blue (RGB) supplementation processing) on raw data input by an image sensor that inputs a spherical image to generate a wide-angle image (a moving image including curved-surface images). Further, the CPU 611 executes unwrapping processing (distortion correction processing) on the wide-angle image (the moving image including curved-surface images) to generate a panoramic image (a moving image including planar images) of the surroundings in 360 degrees around the meeting device 60.

The CPU 611 generates a talker image in the following method. The CPU 611 generates a talker image on which a talker is cut out from the panoramic image (the moving image including planar images) of the surroundings in 360 degrees around the meeting device 60. The CPU 611 determines a direction of the input audio identified from the audio of the surroundings in 360 degrees using the audio sensor 618 and the audio processor 609 to be a direction of the talker, and cuts out a talker image from the panoramic image. At this time, a method of cutting out an image of a person based on the direction of the input audio is cutting out an image of, from 360 degrees, a 30-degree portion around the determined direction of the input audio and performing processing to detect a human face on the image of 30-degree portion. Thus, the image of the person is cut out. The CPU 611 further identifies talker images of a specific number of persons (e.g., three persons) who have most recently made utterances among the talker images cut out from the panoramic image.

The panoramic image and one or more talker images may be individually transmitted to the information recording application 41. Alternatively, the meeting device 60 may generate a single image combined from the panoramic image and the one or more talker images, and transmit the single image to the information recording application 41. In the present embodiment, it is assumed that the panoramic image and the one or more talker images are individually transmitted from the meeting device 60 to the information recording application 41.

Figure 6:
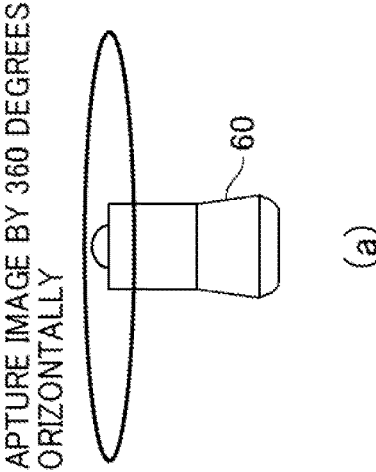
FIG. 6 is a schematic diagram illustrating an imaging range of the meeting device according to embodiments of the present disclosure.

FIG. 6 is a schematic diagram illustrating an imaging range of the meeting device 60. As illustrated in part (a) of FIG. 6, the meeting device 60 captures an image of a range of 360 degrees in the horizontal direction. As illustrated in part (b) of FIG. 6, the meeting device 60 captures an image in predetermined angles up and down from a 0-degree direction that is horizontal to the height of the meeting device 60.

Figure 7:
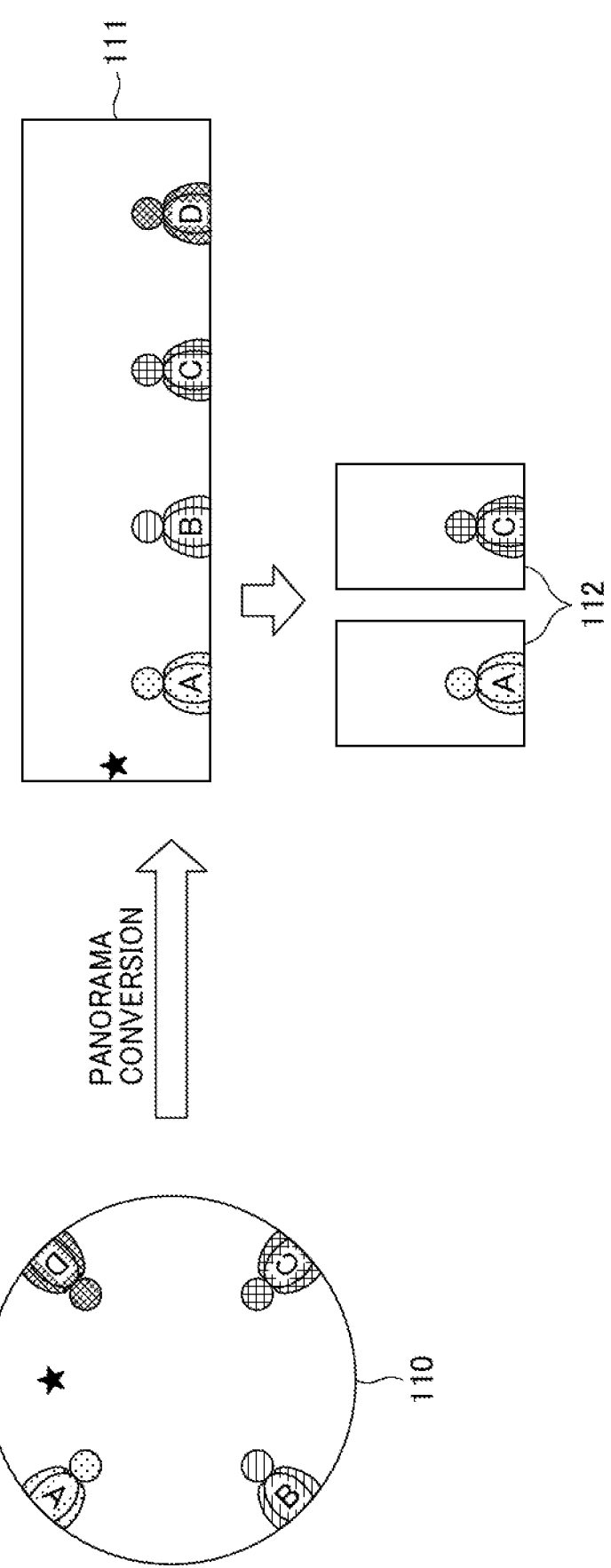
FIG. 7 is a schematic diagram illustrating a panoramic image and processing to cut out talker images from the panoramic image according to embodiments of the present disclosure.

FIG. 7 is a schematic diagram illustrating a panoramic image and processing to cut out talker images from the panoramic image. As illustrated in FIG. 7, an image captured by the meeting device 60 forms a part 110 of a sphere, and thus has a three-dimensional shape. As illustrated in part (b) of FIG. 6, the meeting device 60 divides the angles of view by a predetermined angle in the vertical direction and by a predetermined angle in the horizontal direction to perform perspective projection conversion on each of the angles of view. The meeting device 60 performs the perspective projection conversion on the entire 360-degree range in the horizontal direction without gaps to obtain a predetermined number of planar images and laterally connects the predetermined number of planar images to obtain a panoramic image 111. Further, the meeting device 60 performs the processing to detect a human face in a predetermined range centered around the direction of audio in the panoramic image, and cuts out images by 15 degrees each (30 degrees in total) to the left and right from the center of the human face to generate talker images 112.

Hardware Configuration of Electronic Whiteboard

Figure 8:
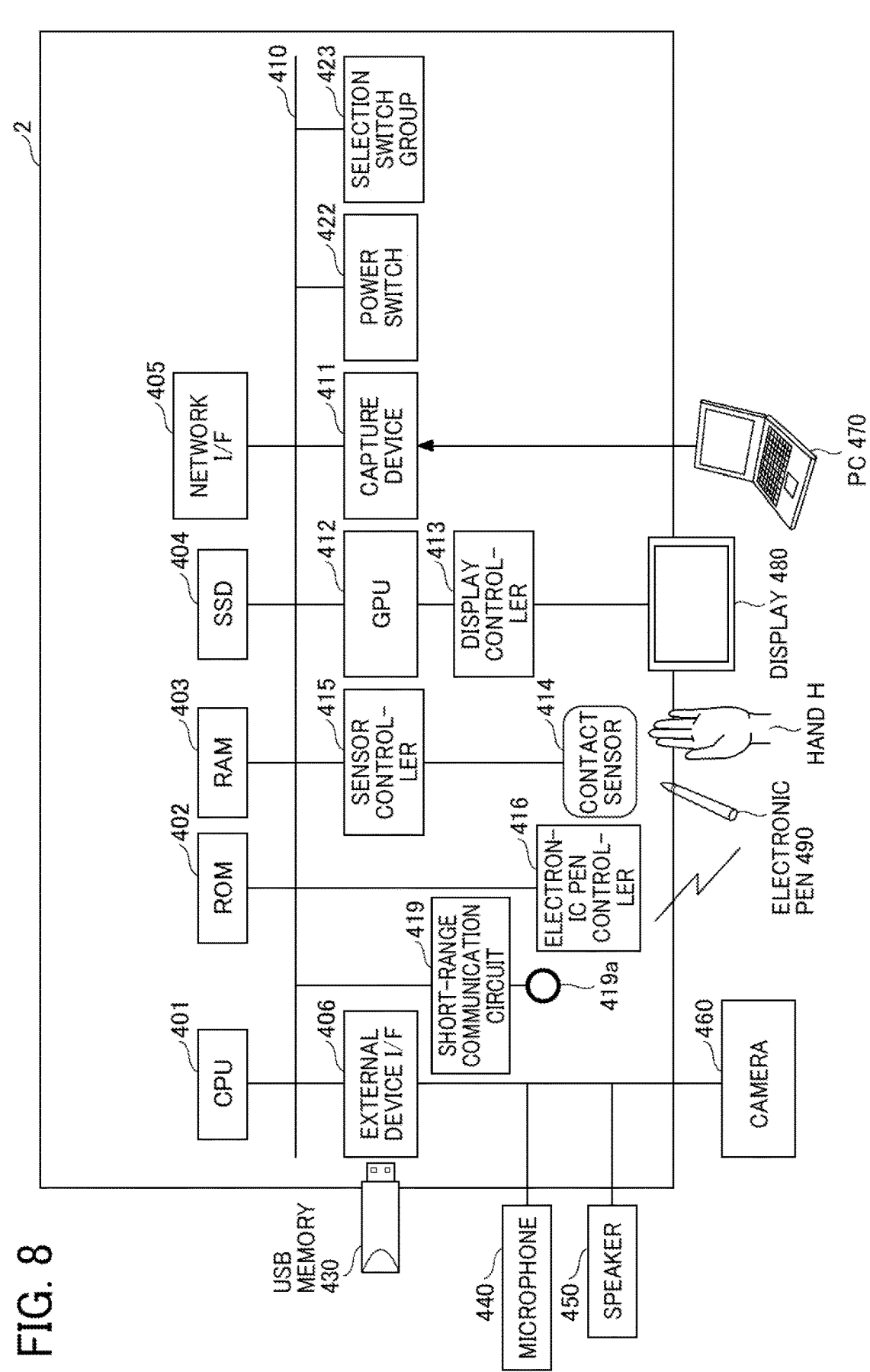
FIG. 8 is a block diagram illustrating a hardware configuration of an electronic whiteboard according to embodiments of the present disclosure.

FIG. 8 is a block diagram illustrating a hardware configuration of the electronic whiteboard 2. As illustrated in FIG. 8, the electronic whiteboard 2 includes a CPU 401, a ROM 402, a RAM 403, a solid state drive (SSD) 404, a network I/F 405, and an external device I/F 406.

The CPU 401 controls entire operation of the electronic whiteboard 2. The ROM 402 stores a program such as an IPL to boot an operating system (OS). The RAM 403 is used as a work area for the CPU 401. The SSD 404 stores various data such as a control program for the electronic whiteboard 2. The network I/F 405 controls communication with a communication network. The external device I/F 406 is an interface for connection with various external devices. Examples of the external devices in this case include, but are not limited to, a USB memory 430 and external devices (a microphone 440, a speaker 450, and a camera 460).

The electronic whiteboard 2 further includes a capture device 411, a graphics processing unit (GPU) 412, a display controller 413, a contact sensor 414, a sensor controller 415, an electronic pen controller 416, a short-range communication circuit 419, an antenna 419a of the short-range communication circuit 419, a power switch 422, and a selection switch group 423.

The capture device 411 acquires display information of the external PC 470 to display a still image or a video based on the display information. The GPU 412 is a semiconductor chip dedicated to processing of a graphical image. The display controller 413 controls screen display to output an image processed by the GPU 412 to a display 480. The contact sensor 414 detects a touch onto the display 480 with an electronic pen 490 or a user's hand H. The sensor controller 415 controls processing of the contact sensor 414. The contact sensor 414 receives a touch input and detects coordinates of the touch input according to the infrared blocking system. More specifically, for inputting and detecting the coordinates, the display 480 is provided with two light receiving and emitting devices disposed at both ends of the upper face of the display 480, and a reflector frame surrounding the periphery of the display 480. The light receiving and emitting devices emit a plurality of infrared rays in parallel to a surface of the display 480. The plurality of infrared rays is reflected by the reflector frame, and a light-receiving element receives light returning through the same optical path of the emitted infrared rays. The contact sensor 414 outputs, to the sensor controller 415, position information (a position on the light-receiving element) of the infrared ray that is emitted from the two light receiving and emitting devices and then blocked by an object. Based on the position information of the infrared ray, the sensor controller 415 detects specific coordinates of the position touched by the object. The electronic pen controller 416 communicates with the electronic pen 490 by BLUETOOTH to detect a touch by the tip or bottom of the electronic pen 490 onto the display 480. The short-range communication circuit 419 is a communication circuit in compliance with the NFC or BLUETOOTH. The power switch 422 is a switch that turns on or off the power of the electronic whiteboard 2. The selection switch group 423 is a group of switches for adjusting brightness, hue, etc., of display on the display 480, for example.

The electronic whiteboard 2 further includes a bus line 410. The bus line 410 is an address bus or a data bus, which electrically connects each component illustrated in FIG. 8 such as the CPU 401.

The contact sensor 414 is not limited to a touch sensor of the infrared blocking system, and may be a capacitive touch panel that detects a change in capacitance to identify a contact position. Alternatively, the contact sensor 414 may be a resistance film touch panel that detects a change in voltage of two opposing resistance films to identify a contact position. Further, the contact sensor 414 may be an electromagnetic inductive touch panel that detects electromagnetic induction caused by contact of an object onto the display to identify a contact position. In addition to the devices described above, various other types of detection devices may be used as the contact sensor 414. In addition to or alternative to detecting a touch by the tip or bottom of the electronic pen 490, the electronic pen controller 416 may also detect a touch by another part of the electronic pen 490, such as a part held by a hand of the user.

Functions

Figure 9:
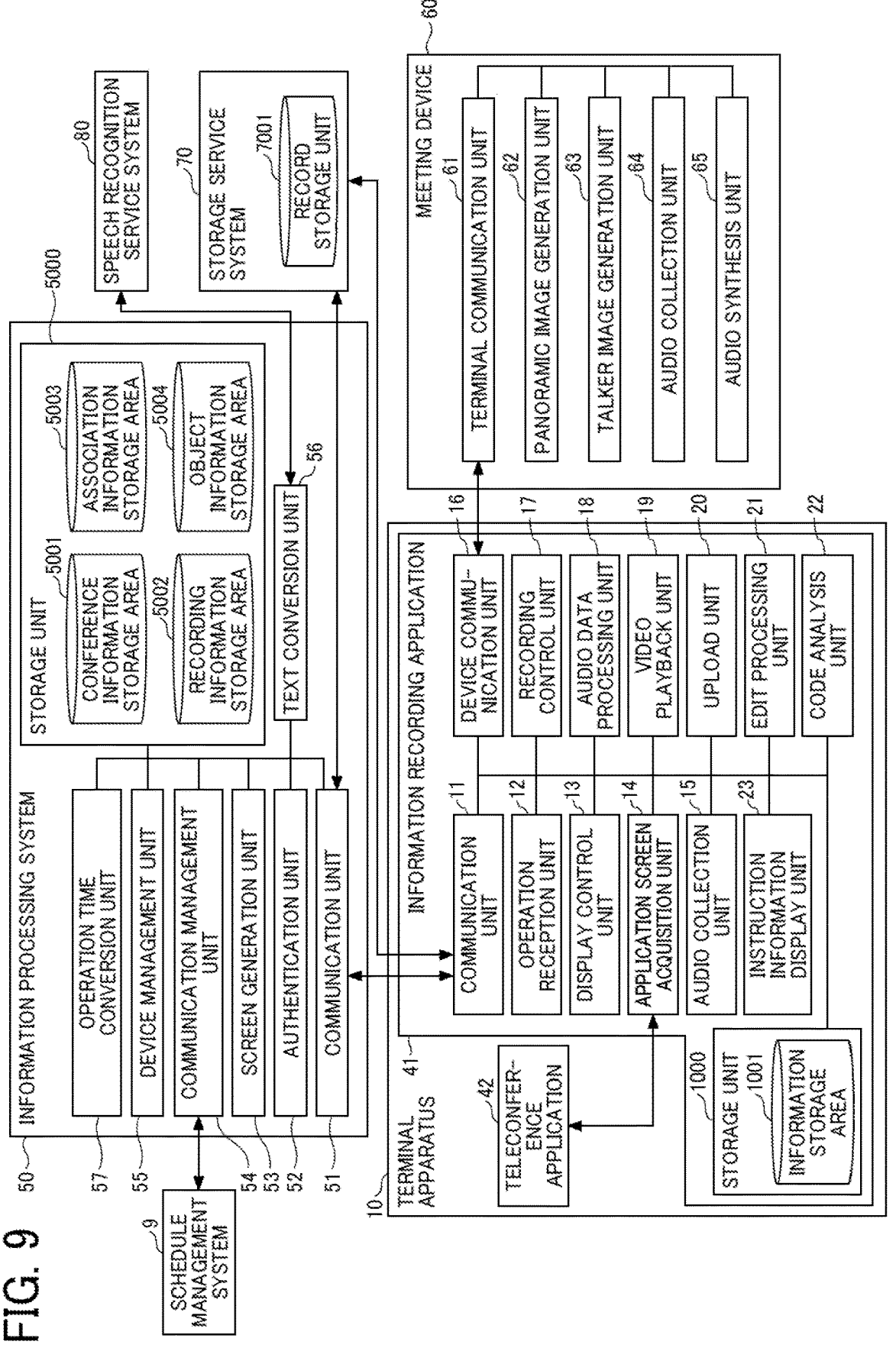
FIG. 9 is a block diagram illustrating functional configurations of the terminal apparatus, the meeting device, and the information processing system in the record creation system according to embodiments of the present disclosure.

With reference to FIG. 9, a functional configuration of the record creation system 100 is described. FIG. 9 is a block diagram illustrating functional configurations of the terminal apparatus 10, the meeting device 60, and the information processing system 50 in the record creation system 100 according to the present embodiment.

Functions of Terminal Apparatus

The information recording application 41 operating on the terminal apparatus 10 implements a communication unit 11, an operation reception unit 12, a display control unit 13, an application screen acquisition unit 14, an audio collection unit 15, a device communication unit 16, a recording control unit 17, an audio data processing unit 18, a video playback unit 19, an upload unit 20, an edit processing unit 21, a code analysis unit 22, and an instruction information display unit 23. These units of functions included in the terminal apparatus 10 are implemented by or caused to function by one or more of the hardware components illustrated in FIG. 4 operating in accordance with instructions from the CPU 501 according to the information recording application 41 loaded from the HD 504 to the RAM 503. The terminal apparatus 10 further includes a storage unit 1000 implemented by the HD 504 illustrated in FIG. 4. The storage unit 1000 includes an information storage area 1001, which is implemented by a database, for example.

The communication unit 11 transmits and receives various kinds of information to and from the information processing system 50 via a communication network. For example, the communication unit 11 receives a list of teleconferences from the information processing system 50, and transmits a request of speech recognition on audio data to the information processing system 50.

The display control unit 13 displays various screens serving as user interfaces in the information recording application 41 in accordance with screen transitions set in the information recording application 41. The operation reception unit 12 receives various operations input to the information recording application 41.

The application screen acquisition unit 14 acquires, from the OS, a desktop screen or a screen displayed by an application selected by the user. In a case that the application selected by the user is the teleconference application 42, a screen (including e.g., an image of each site and an image of a material or document displayed) generated by the teleconference application 42 is obtained.

The audio collection unit 15 acquires the audio data received by the teleconference application 42 in the teleconference from the teleconference application 42. The audio data acquired by the audio collection unit 15 does not include audio data collected by the terminal apparatus 10, but includes only the audio data received in the teleconference through the teleconference application 42. This is because the meeting device 60 separately collects audio.

The device communication unit 16 communicates with the meeting device 60 using a USB cable. Alternatively, the device communication unit 16 may use a wireless local area network (LAN) or BLUETOOTH to communicate with the meeting device 60. The device communication unit 16 receives the panoramic image and the talker images from the meeting device 60, and transmits the audio data acquired by the audio collection unit 15 to the meeting device 60. The device communication unit 16 receives the audio data synthesized by the meeting device 60.

The recording control unit 17 combines the panoramic image and the talker images received by the device communication unit 16 and the application screen acquired by the application screen acquisition unit 14 to generate a composite image. In addition, the recording control unit 17 connects, in time series, composite images that are repeatedly generated by the recording control unit 17 to generate a composite image video, and further attaches the audio data synthesized by the meeting device 60 to the composite image video to generate a composite image video with audio.

The audio data processing unit 18 requests the information processing system 50 to convert, into text data, the audio data extracted by the recording control unit 17 from the composite image video with audio or the synthesized audio data received from the meeting device 60. The conversion into text data may be performed when the composite image video is stored in the storage service system 70.

The video playback unit 19 plays back the composite image video. The composite image video is stored in the terminal apparatus 10 during recording, and then uploaded to the information processing system 50.

After the teleconference ends, the upload unit 20 transmits the composite image video to the information processing system 50.

The edit processing unit 21 performs editing (e.g., deleting a part and connecting parts) of the composite image video according to a user operation.

The code analysis unit 22 detects a two-dimensional code included in the panoramic image and analyzes the two-dimensional code to acquire a device identifier.

The instruction information display unit 23 displays an operation time associated with an object around the object and displays a mark at a position on a time indicator corresponding to the operation time.

FIG. 10 is a diagram illustrating a data structure of information on a recorded video stored in the information storage area 1001. The information on a recorded video includes, as data items, "CONFERENCE ID," "RECORD-ING ID," "UPDATE DATE AND TIME," "TITLE," "UPLOAD," and "STORAGE LOCATION." In a case that the user logs in to the information processing system 50, the information recording application 41 downloads conference information from a conference information storage area 5001 included in the information processing system 50. The conference ID included in the conference information is reflected in the information on a recorded video. The information on a recorded video illustrated in FIG. 10 is stored by the terminal apparatus 10 operated by a certain user.

The item "CONFERENCE ID" is identification information that identifies a teleconference that has been held. The conference ID is assigned in a case that a schedule of the teleconference is registered in a schedule management system 9 by the user, or is assigned by the information processing system 50 in response to a request from the information recording application 41.

The item "RECORDING ID" is identification information that identifies a composite image video recorded in the teleconference. The recording ID is assigned by the meeting device 60. Alternatively, the recording ID may be assigned by the information recording application 41 or the information processing system 50. Different pieces of the recording ID are assigned for the same conference ID in a case where the recording is suspended in the middle of the teleconference but is started again for some reason.

The item "UPDATE DATE AND TIME" is a date and time when the composite image video is updated (or recording is ended). In a case that the composite image video is edited, the update date and time indicates the date and time of editing.

The item "TITLE" is a name of a conference (or a teleconference). The title may be set in the case that the schedule of the conference is registered in the schedule management system 9, or may be freely set by the user.

The item "UPLOAD" indicates whether the composite image video has been uploaded to the information processing system 50.

The item "STORAGE LOCATION" indicates a location, such as a uniform resource locator (URL) or a file path, where the composite image video, text data, and object information are stored in the storage service system 70. Thus, the storage location allows the user to view the composite image video uploaded to the information processing system 50 as desired. The composite image video and the text data are stored with different file names, for example, following the same URL. In the storage location, minutes such as an action item list determined in the conference may also be stored.

Functions of Meeting Device

Returning to FIG. 9, the description continues. The meeting device 60 includes a terminal communication unit 61, a panoramic image generation unit 62, a talker image generation unit 63, an audio collection unit 64, and an audio synthesis unit 65. These functional units of the meeting device 60 are implemented by or caused to function by one or more of the hardware components illustrated in FIG. 5 operating in accordance with instructions from the CPU 611 according to the control program loaded from the ROM 612 to the DRAM 614.

The terminal communication unit 61 communicates with the terminal apparatus 10 using a USB cable. The connection of the terminal communication unit 61 to the terminal apparatus 10 is not limited to a wired cable, but includes connection by a wireless LAN or BLUETOOTH.

The panoramic image generation unit 62 generates a panoramic image. The talker image generation unit 63 generates a talker image. The methods of generating the panoramic image and the talker image have already been described with reference to FIGS. 6 and 7.

The audio collection unit 64 converts audio received by a microphone of the meeting device 60 into audio data (digital data). Thus, the utterances (speeches) made by the user and the participants at the site where the terminal apparatus 10 is located are collected.

The audio synthesis unit 65 synthesizes the audio transmitted from the terminal apparatus 10 and the audio collected by the audio collection unit 64. Thus, the audio of the utterances made at the remote site 101 and the audio of the utterances made at the local site 102 are synthesized.

Functions of Information Processing System

The information processing system 50 includes a communication unit 51, an authentication unit 52, a screen generation unit 53, a communication management unit 54, a device management unit 55, a text conversion unit 56, and an operation time conversion unit 57. These units of functions included in the information processing system 50 are implemented by or caused to function by one or more of the hardware components illustrated in FIG. 4 operating in accordance with instructions from the CPU 501 according to the control program loaded from the HD 504 to the RAM 503. The information processing system 50 also includes a storage unit 5000 implemented by the HD 504 illustrated in FIG. 4. The storage unit 5000 includes the conference information storage area 5001, a recording information storage area 5002, an association information storage area 5003, and an object information storage area 5004 each of which is implemented by a database, for example. The object information storage area 5004 will be described later in the description of the electronic whiteboard 2.

The communication unit 51 transmits and receives various kinds of information to and from the terminal apparatus 10 via a communication network. The communication unit 51, for example, transmits a list of teleconferences to the terminal apparatus 10 and receives a request of speech recognition on audio data from the terminal apparatus 10.

The authentication unit 52 authenticates a user who operates the terminal apparatus 10. For example, the authentication unit 52 authenticates the user based on whether authentication information (user ID and a password) included in an authentication request received by the communication unit 51 matches authentication information stored in advance. Alternatively, a card number of an integrated circuit (IC) card or biometric authentication information such as a face or a fingerprint may be used as the authentication information. Further, the authentication unit 52 may use an external authentication system or an authentication method such as an open authentication standard (OAuth) to authenticate the user.

The screen generation unit 53 provides screen information representing a screen to be displayed by the information recording application 41. Since the information recording application 41 has a structure of the screen, the screen generation unit 53 provides the terminal apparatus 10 with a heat map and an activity level in a format of Extensible Markup Language (XML). In a case that the terminal apparatus 10 executes a web application, the screen generation unit 53 generates screen information representing a screen to be displayed by the web application. The screen information is described in Hyper Text Markup Language (HTML), XML, Cascade Style Sheet (CSS), or JAVASCRIPT, for example. In the present embodiment, the screen generation unit 53 generates a screen that presents an object in synchronization with a record based on an operation time. Further, the screen generating unit 53 generates a screen that presents, based on time information, instruction information used for playing back the record in which audio or video relating to the object is recorded.

The communication management unit 54 acquires information relating to a teleconference from the schedule management system 9 using an account of an individual user or a system account assigned by the information processing system 50. The schedule management system 9 is a system that manages schedules of individual users. A schedule of a conference is registered in the schedule management system 9 as a schedule of an individual participant, and is shared by each participant. The communication management unit 54 stores conference information of a scheduled conference in association with the conference ID in the conference information storage area 5001. In addition, the communication management unit 54 acquires conference information for which a user belonging to a tenant has a right to view. Since the conference ID is set for a conference, the teleconference and the record are associated with each other by the conference ID.

In response to receiving the device identifiers of the electronic whiteboard 2 and the meeting device 60 to be used in the conference, the device management unit 55 stores these device identifiers, in the association information storage area 5003 in association with the teleconference. Accordingly, the device identifier of the electronic whiteboard 2 and the device identifier of the meeting device 60 are associated with the conference ID. Since the composite image video is also associated with the conference ID, an object input to the electronic whiteboard 2 and the composite image video are also associated with each other by the conference ID. In a case that recording ends (in a case that the conference ends), the device management unit 55 deletes the association from the association information storage area 5003.

The text conversion unit 56 uses an external service system such as the speech recognition service system 80 to convert, into text data, audio data requested to be converted into text data by the terminal apparatus 10. Alternatively, the text conversion unit 56 may perform the text conversion without using the external service system.

The operation time conversion unit 57 converts an operation time on the electronic whiteboard 2 into an elapsed time from a recording start time of the composite image video. This is because the operation time on the electronic whiteboard 2 is recorded in the standard time of the country or region.

FIG. 11 is a diagram illustrating a data structure of conference information stored in the conference information storage area 5001 and managed by the communication management unit 54, according to the present embodiment. The communication management unit 54 uses the above-described account to acquire a list of teleconferences for which a user belonging to a tenant has a right to view. In the present embodiment, teleconferences are used as an example. However, the list of teleconferences also includes conferences each of which is held in a single conference room.

The conference information is managed with the conference ID, which is associated with the items "PARTICIPANTS," "TITLE," "START DATE AND TIME," "END DATE AND TIME," and "PLACE." These items are an example of the data structure of the conference information, and the conference information may include other items.

The item "PARTICIPANTS" indicates participants of a conference.

The item "TITLE" indicates a content of the conference such as a name of the conference or an agenda of the conference.

The item "START DATE AND TIME" indicates the date and time when the conference is scheduled to be started.

The item "END DATE AND TIME" indicates a date and time when the conference is scheduled to be ended.

The item "PLACE" indicates a place where the conference is held such as a name of a conference room, a name of a branch office, or a name of a building.

The item "ELECTRONIC WHITEBOARD" indicates a device identifier of the electronic whiteboard 2 used in the conference.

The item "MEETING DEVICE" indicates a device identifier of the meeting device 60 used in the conference.

The item "VIEWING RIGHT" indicates user ID registered, in a case that an organizer of the conference registers the conference information in advance or after the conference is held, as a user having a right to view information on the conference. For example, for each conference, only names of participants, names of participants and any user names of the participants, or any user names of participants are registered in the conference information.

The item "ELECTRONIC WHITEBOARD OPERATION DATA ID" indicates identification information of electronic whiteboard operation data to be described later. The electronic whiteboard operation data ID is used for association with object information in the conference information.

As illustrated in FIGS. 10 and 11, the composite image video recorded in a conference is identified with the conference ID. Also, minutes created for a conference may be associated with an individual conference.

Recording information stored in the recording information storage area 5002 may be the same as the information on a recorded video illustrated in FIG. 10. Note that the information processing system 50 has a list of composite image videos recorded by all users belonging to the tenant.

FIG. 12 is a diagram illustrating a data structure of association information associating the device identifiers of the electronic whiteboard 2 and the meeting device 60 with conference ID each other. The association information is stored in the association information storage area 5003. The association information is kept stored from when the information recording application 41 transmits the device identifiers of the electronic whiteboard 2 and the meeting device 60 to the information processing system 50 to when the recording ends.

Storage Service System

The storage service system 70 may be any service system that stores a record and object information. In the record storage unit 7001, a record (e.g., a composite image video and text data) and object information are stored.

FIG. 13 is a diagram illustrating a data structure of a record and object information stored in the record storage unit 7001. As illustrated in FIG. 13, a composite image video and text data that are parts of a record and object information are stored in association with conference ID. The composite image video includes synthesized audio. The text data is obtained by converting the synthesized audio data through speech recognition. The object information is information relating to an object such as handwritten data input to the electronic whiteboard 2, which will be described later. Since the record and the object information are associated with the conference ID, the record and the object information are also associated with the conference information.

FIG. 14 is a diagram illustrating a data structure of text data which is a part of a record. As illustrated in FIG. 14, in the text data, items of "ID," "TIME," "RECOGNITION RESULT CHARACTER STRING," "AUDIO DATA," "SITE IDENTIFICATION INFORMATION," and "TALKER ID" are associated with each other, for example, in a database in a table format.

The item "ID" indicates identification information that is assigned in a case that audio at the local site and audio at the remote site are divided according to a predetermined rule. The predetermined rule is set in the meeting device 60 (or at least one of the meeting device 60 and the speech recognition service system 80). For example, the rule specifies dividing the audio in a case that a silence continues for a certain period of time, dividing the audio by elapse of a certain period of time regardless of presence of silence, or dividing the audio by units of sentence detected by morphological analysis.

The item "TIME" indicates a time elapsed from the recording start time of the composite image video in a case that an utterance is made. Since the so-called time of day is also recorded at the start of recording, the time (absolute time) when the utterance converted into the text is made is also known.

The item "RECOGNITION RESULT CHARACTER STRING" is a part of text data obtained by converting, through speech recognition, the synthesized audio data already divided according to the predetermined rule. The synthesized audio data is the audio data that is a source from which the recognition result character string is converted.

The item "AUDIO DATA" is synthesized audio data that is obtained by synthesizing the audio at the local site and the audio at the remote site after the determination of the site is performed and has already been divided according to the predetermined rule.

The item "SITE IDENTIFICATION INFORMATION" is identification information that identifies a site where the utterance represented by the audio data is made. The site is determined based on the sound pressure of the audio at the local site and the sound pressure of the audio at the remote site. As for the site identification information, for example, a numeric value "1" indicates the local site, and a numeric value "2" indicates the remote site.

The item "TALKER ID" indicates user ID indicating a talker who has made the utterance of the recognition result character string. The participant who has made the utterance is also identified by the user ID. Several methods are known for identifying a talker in a conference. For example, one of the methods is using a voiceprint. A voiceprint that is registered by an individual employee in advance is used for identifying a talker. Another one of the methods is using face recognition. Since the meeting device 60 detects a direction of a talker, the talker can be identified by performing face recognition on a participant located in the direction. Any method that can identify a talker may be used. In a venue where microphones are prepared for individual talkers, a talker is identified by specifying a microphone that collects the audio.

Functions of Electronic Whiteboard

Figures 15, 16:
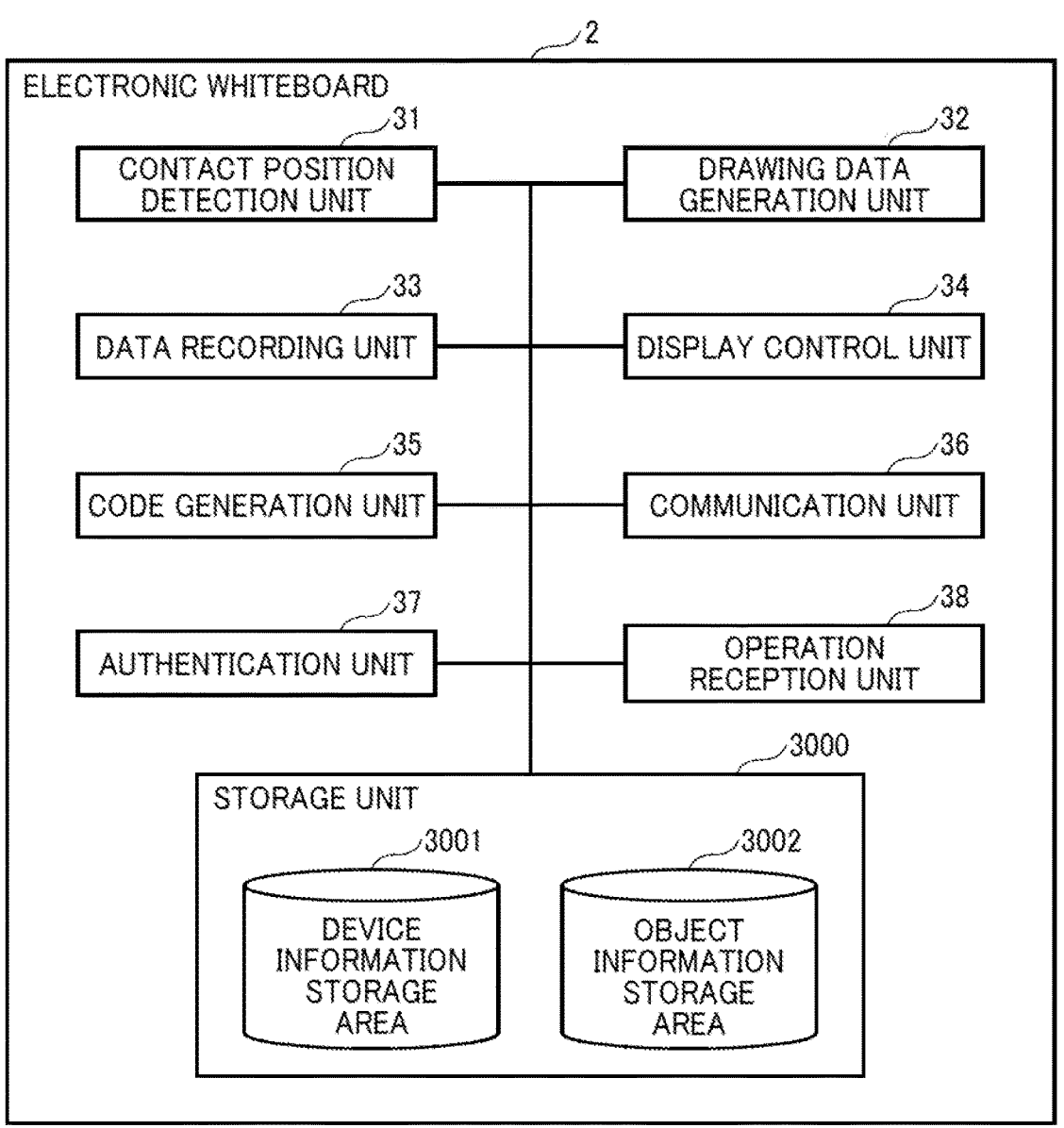
FIG. 15 is a block diagram illustrating functional configurations of the electronic whiteboard according to embodiments of the present disclosure.
FIG. 16 is a diagram illustrating a data structure of device identification information stored in a device information storage area according to embodiments of the present disclosure.

FIG. 15 is a block diagram illustrating functional configurations of the electronic whiteboard 2. The electronic whiteboard 2 includes a contact position detection unit 31, a drawing data generation unit 32, a data recording unit 33, a display control unit 34, a code generation unit 35, a communication unit 36, an authentication unit 37, and an operation reception unit 38. These units of functions included in the electronic whiteboard 2 are implemented by or caused to function by one or more of the hardware components illustrated in FIG. 8 operating in accordance with instructions from the CPU 401 according to the control program loaded from the SSD 404 to the RAM 403.

The contact position detection unit 31 detects coordinates of a position of a contact detected by the contact sensor 414, at which the electronic pen 490 has touched. The drawing data generation unit 32 acquires the coordinates of the position touched by the tip of the electronic pen 490 from the contact position detection unit 31. The drawing data generation unit 32 connects a plurality of contact coordinates into a coordinate point sequence by interpolation, to generate stroke data.

The display control unit 34 displays handwritten data and a menu to be operated by the user on the display 480.

The data recording unit 33 stores, in an object information storage area 3002, handwritten data drawn on the electronic whiteboard 2, a graphic such as a circle or triangle, a stamp indicating completion, a screen of a PC, and a file. Each of the handwritten data, the graphic, an image such as the screen of the PC, and the file is treated as an object.

The communication unit 36 is connected to Wi-Fi or a LAN, and communicates with the information processing system 50. The communication unit 36 transmits object information to the information processing system 50, and receives object information stored in the information processing system 50 from the information processing system 50 for the display 480 to display an object based on the object information.

The code generation unit 35 encodes the device identifier of the electronic whiteboard 2 stored in a device information storage area 3001 and information indicating that the device is usable in the conference into a two-dimensional pattern, to generate a two-dimensional code. The code generation unit 35 may encode, into a barcode, the device identifier of the electronic whiteboard 2 and the information indicating that the device is usable in the conference. The device identifier is, for example, either a serial number or a universally unique identifier of the electronic whiteboard 2. Alternatively, the device identifier may be set by the user.

The authentication unit 37 authenticates a user of the electronic whiteboard 2. The authentication method performed by the authentication unit 37 may be the same as that of the authentication unit 52. Alternatively, the authentication unit 37 may request the authentication unit 52 to perform the authentication.

The operation reception unit 38 receives a user operation to the electronic whiteboard 2, such as pressing a menu displayed by the electronic whiteboard 2 or pressing an operation time.

In addition, the electronic whiteboard 2 includes a storage unit 3000 implemented by the SSD 404 illustrated in FIG. 8. The storage unit 3000 includes the device information storage area 3001 and the object information storage area 3002 each of which is implemented by a database, for example.

FIG. 16 is a diagram illustrating a data structure of device identification information stored in the device information storage area 3001. The item "DEVICE IDENTIFIER" indicates identification information that identifies the electronic whiteboard 2. The item "IP ADDRESS" indicates an IP address used by another device to connect to the electronic whiteboard 2 via a network. The item "PASSWORD" indicates a character string used for authentication in a case that another apparatus connects to the electronic whiteboard 2.

FIG. 17 is a diagram illustrating a data structure of electronic whiteboard operation data stored in an object information storage area 3002. FIG. 18 is a diagram illustrating a data structure of object information stored in the object information storage area 3002. The information stored in the object information storage area 3002 may be the same as the information stored in the object information storage area 5004. The electronic whiteboard operation data is information in which operations on objects displayed by the electronic whiteboard 2 are recorded in time series. The electronic whiteboard operation data ID is assigned to the electronic whiteboard operation data as illustrated in FIG. 17 and is associated with a record.

FIG. 17 is a diagram schematically illustrating the electronic whiteboard operation data. The electronic whiteboard operation data includes, as data items, "OPERATION ID," "OPERATION TIME," "OPERATION TYPE," "OBJECT ID," and "OBJECT DETAILS."

The item "OPERATION ID" indicates identification information that identifies one operation to the electronic whiteboard 2.

The item "OPERATION TIME" indicates a time in a case that a user performs an operation on the electronic whiteboard 2. In other words, the item "OPERATION TIME" indicates an input start time or an update time of an object input to the electronic whiteboard 2. In a case that the object is input for the first time, the operation time indicates the input start time. In another case that an object already input is updated, the operation time indicates the update time. The latest update time of the same object is the last update time. The input start time and the last update time are separately stored in the object information.

The item "OBJECT ID" indicates identification information that identifies an object displayed on the electronic whiteboard 2. Although one piece of object ID is assigned to one stroke in FIG. 17, it is preferable that one piece of object ID is assigned to collectively a plurality of strokes as described later with reference to FIG. 19.

The item "OBJECT TYPE" indicates the type of an object such as a stroke, text, or a graphic.

The item "OBJECT DETAILS" indicates detailed information on an object, such as what kind of object is input.

With reference to FIG. 18, object information generated using the electronic whiteboard operation data illustrated in FIG. 17 and transition of display examples of objects are described. FIG. 18 is a diagram illustrating how object information is generated based on electronic whiteboard operation data.

(1) A user draws a stroke 221 by hand drafted input. The data recording unit 33 assigns operation ID to the stroke 221 and records electronic whiteboard operation data of the stroke 221. According to the electronic whiteboard operation data illustrated in FIG. 17, the electronic whiteboard operation data with operation ID of "1" has the operation time of "13:30:00," the operation type of "CREATION (DRAWING)," the object ID of "1," the object type of "STROKE," and the object details of "PASS, GREEN." The data recording unit 33 transcribes these items in the object information illustrated in part (a) of FIG. 18. The input start time is "13:30:00" which is the same as the operation time, and the last update time is "13:30:00" which is the same as the operation time.

(2) The user writes a text 222 by hand drafted input. The data recording unit 33 generates electronic whiteboard operation data with operation ID of "2" in FIG. 17. Then, the data recording unit 33 transcribes the electronic whiteboard operation data in the object information illustrated in part (b) of FIG. 18. The input start time is "13:31:10" which is the same as the operation time, and the last update time is "13:31:10" which is the same as the operation time.

(3) The user deletes the stroke 221. The data recording unit 33 generates electronic whiteboard operation data with operation ID of "3" in FIG. 17. Since the operation type is "DELETION," the data recording unit 33 specifies a piece of object information having the object ID "1" in the object information and deletes the piece of object information (part (c) of FIG. 18).

(4) The user deletes "B" which is a part of the text 222. The data recording unit 33 generates electronic whiteboard operation data with operation ID of "4" in FIG.

17. Since the operation type is "UPDATE," the data recording unit 33 specifies a piece of object information having the object ID "2" in the object information and updates the object details of the piece of object information (updates "ABC" to "AC"). In addition, the data recording unit 33 updates the last update time to be "13:33:35" which is the operation time of the electronic whiteboard operation data with operation ID of "4" as illustrated in part (d) of FIG. 18.

Since the handwritten data is a group of one or more strokes, the electronic whiteboard 2 or the information processing system 50 appropriately determines from which stroke to which stroke make up one object (handwritten data having some meaning).

Figure 19:
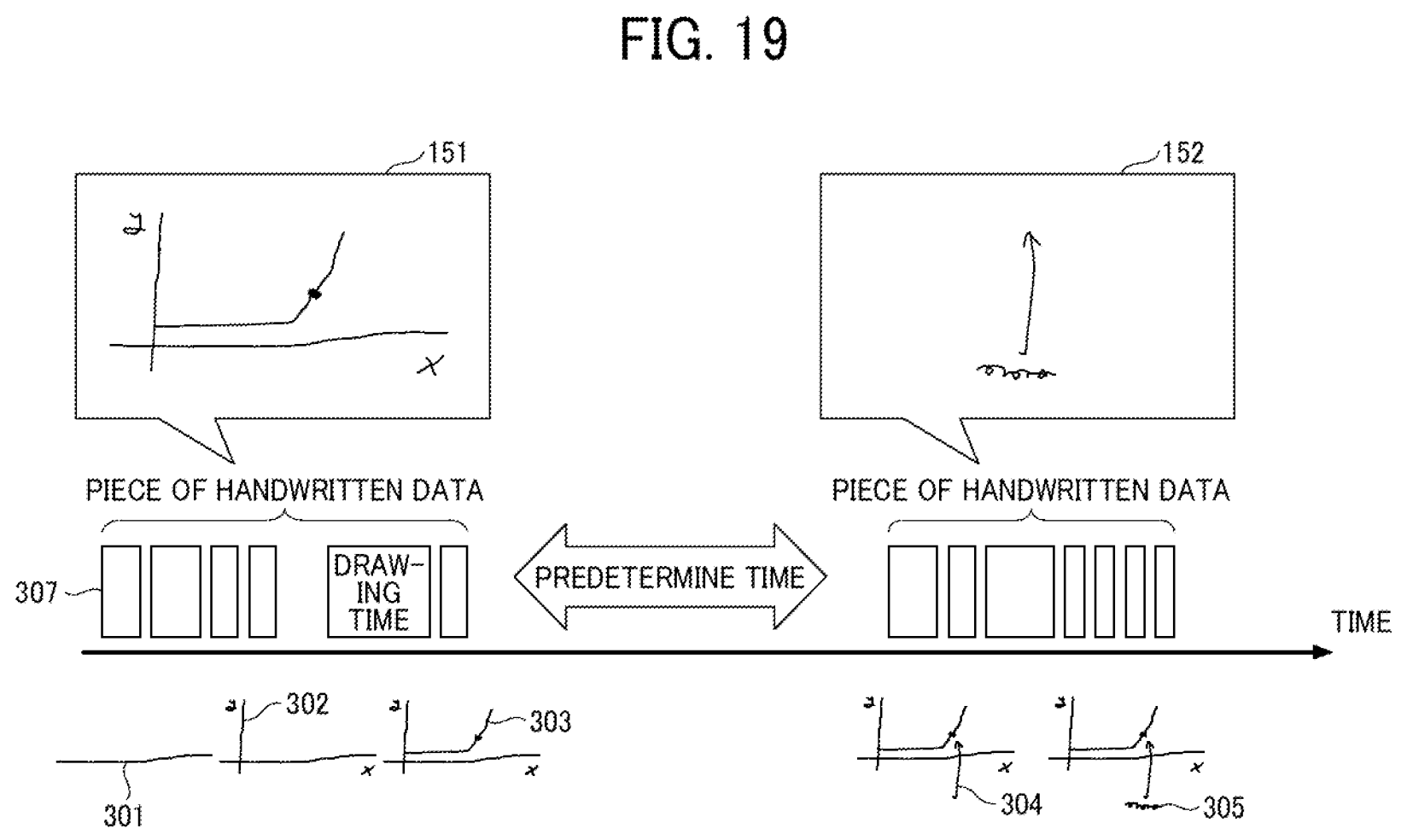

FIG. 19 is a diagram illustrating a method of dividing handwritten data. As a method of dividing handwritten data, there is a method focusing on a time interval between a time when one stroke data is input and a time when another stroke data is input. The data recording unit 33 separates, as other handwritten data, strokes handwritten after a lapse of time equal to or greater than a threshold value determined by a designer in advance. This method is based on assumption that strokes successively handwritten make up handwritten data that has some meaning.

In FIG. 19, time periods spent in handwriting strokes are indicated by quadrangles 307 along the time axis. An interval between a quadrangle 307 and another quadrangle 307 is a time period during which the electronic pen is not in contact with the electronic whiteboard 2 (a time period from disengagement to engagement of an electronic pen). Hereinafter, disengagement of an electronic pen and engagement of an electronic pen are also referred to as "pen disengagement" and "pen engagement," respectively. A stroke 301, a stroke 302, a stroke 303, a stroke 304, and a stroke 305 are added in relation to time. It is assumed that the interval from when the electronic pen is disengaged after inputting the stroke 303 to when the electronic pen is engaged for inputting the stroke 304 is equal to or greater than the threshold value. In this case, the data recording unit 33 records the stroke 301, the stroke 302, and the stroke 303 as one piece of handwritten data 151 and records the stroke 304 and the stroke 305 as another one piece of handwritten data 152.

The time period from pen disengagement to pen engagement is used for dividing the strokes since there is a case where a single object is drawn by a plurality of persons in a conference. In a case that strokes are extracted for each individual person from the object drawn by the plurality of persons by simply using user ID, for example, it may be difficult to grasp what is written with the strokes handwritten by each individual person because the strokes of the other persons are premised.

Conversion of Operation Time

With reference to FIGS. 20A and 20B, conversion of an operation time into an elapsed time is described. The operation time is recorded in the standard time of the country. In the case of Japan, the operation time is recorded in Japan Standard Time. On the other hand, although the recording start time and the recording end time of the composite image video are recorded in standard time, an individual frame forming the composite image video has only an elapsed time from the recording start time. For this reason, the operation time conversion unit 57 converts the operation time into the elapsed time from the recording start time.

FIGS. 20A and 20B are diagrams illustrating processing of converting an operation time into an elapsed time from a recording start time. Conference information illustrated in FIG. 20A is the same as the conference information illustrated in FIG. 11. For example, in the conference having the conference ID "001," the recording start time of the composite image video is "13:28." FIG. 20B is a diagram illustrating a data structure of electronic whiteboard operation data. In a case that an operation time of the electronic whiteboard operation data is "13:30:00," a difference from the recording start time is "2:00." In the same manner, in cases that operation times of the electronic whiteboard data are "13:31:10," "13:32:05," and "13:33:35," differences from the recording start time are "3:10," "4:05," and "5:35," respectively. The operation time conversion unit 57 thus calculates the difference between the recording start time and the operation time as a post-conversion operation time, and adds the post-conversion operation time to the electronic whiteboard operation data. In this way, in a case that the viewer designates an object being played back, the terminal apparatus 10 can play back a composite image video from the post-conversion operation time associated with the object.

Since the operation time includes the input start time and the last update time, the input start time and the last update time stored in the object information are respectively converted into post-conversion operation times.

Operation Procedure

Figure 21:
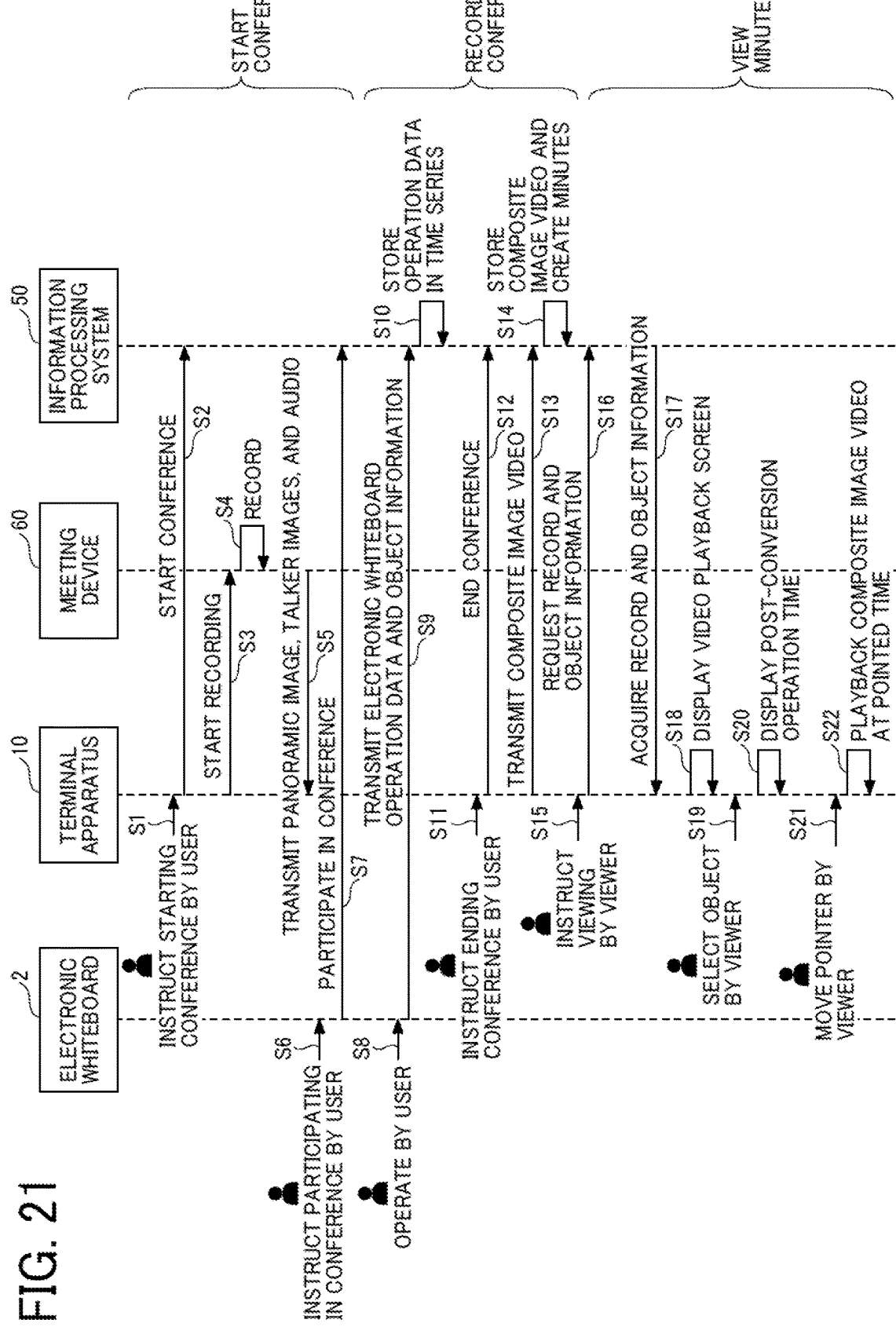
FIG. 21 is a sequence chart illustrating processing to store a record and object information recorded in a conference, and processing performed by the terminal apparatus to view the record and the object information according to embodiments of the present disclosure.

FIG. 21 is a sequence chart illustrating processing to store a record and object information recorded in a conference and processing performed by the terminal apparatus 10 to view the record and the object information. It is assumed that the electronic whiteboard 2 and the meeting device 60 are associated with each other in advance.

S1: The user instructs the information recording application 41 operating on the terminal apparatus 10 to start a conference. For example, the user may select a conference from a list of conference information. The user may or may not separately operate the teleconference application 42 to start a teleconference with a remote site.

S2: The operation reception unit 12 of the terminal apparatus 10 receives the instruction to start the conference. The communication unit 11 transmits the instruction to start the conference to the information processing system 50 with designation of the conference ID.

S3: In response to the instruction to start the conference, the device communication unit 16 implemented by the information recording application 41 requests the meeting device 60 to start recording.

S4: The terminal communication unit 61 of the meeting device 60 receives the request to start recording. The panoramic image generation unit 62 starts generating a panoramic image. The talker image generation unit 63 starts generating talker images. The audio collection unit 64 collects audio of the surroundings. In a case that the teleconference is held, audio synthesis is performed. In such a case, the audio synthesis may be performed by either the meeting device 60 or the terminal apparatus 10.

S5: The terminal communication unit 61 transmits the panoramic image, the talker images, and the audio data of the collected audio to the terminal apparatus 10. The device communication unit 16 of the terminal apparatus 10 receives the panoramic image, the talker images, and the audio data of the collected audio. The recording control unit 17 combines the panorama image, the talker images, and the audio data of the collected audio, and further combines the video of the teleconference application 42 to generate a composite image video.

S6: The user instructs the electronic whiteboard 2 to participate in the conference with designation of the conference.

S7: Accordingly, the communication unit 36 of the electronic whiteboard 2 transmits a notification of participating in the conference to the information processing system 50 with the device identifier of the electronic whiteboard 2 and designation of the conference ID.

S8: The user inputs an object such as a stroke to the electronic whiteboard 2. The drawing data generation unit 32 generates a stroke. The display control unit 34 displays the stroke on the display 480. The data recording unit 33 generates electronic whiteboard operation data and object information of the stroke.

S9: The communication unit 36 of the electronic whiteboard 2 transmits the electronic whiteboard operation data and the object information to the information processing system 50. These data and information may be transmitted collectively after the end of the conference.

S10: The communication unit 51 of the information processing system 50 receives the electronic whiteboard operation data and the object information, and stores the electronic whiteboard operation data and the object information in the object information storage area 5004 in time series.

S11: The user instructs the information recording application 41 operating on the terminal apparatus 10 to end the conference.

S12: The operation reception unit 12 of the terminal apparatus 10 receives the instruction to end the conference. The communication unit 11 transmits the instruction to end the conference to the information processing system 50 with designation of the conference ID.

S13: In response to the end of the conference, the communication unit 11 implemented by the information recording application 41 transmits the composite image video to the information processing system 50 together with the conference ID.

S14: The communication unit 51 of the information processing system 50 receives the composite image video. The text conversion unit 56 converts the audio recorded in the composite image video into text data. The communication unit 51 stores a record (e.g., the composite image video and the text data) and the object information in the storage service system 70.

S15: After the end of the conference, the viewer instructs, with designation of the conference, the information recording application 41 operating on the terminal apparatus 10 to view the record and the object information. The viewer may be either a person who has participated in the conference or a person who has not participated in the conference.

S16: The operation reception unit 12 of the terminal apparatus 10 receives the instruction to view the record and the object information. The communication unit 11 transmits a request for the record and the object information to the information processing system 50 with designation of the conference ID.

S17: The communication unit 51 of the information processing system 50 receives the request for the record and the object information, and acquires the record and the object information identified by the conference ID from the storage service system 70. The communication unit 51 transmits the record and the object information to the terminal apparatus 10.

S18: The communication unit 11 of the terminal apparatus 10 receives the record and the object information. The display control unit 13 displays the record and the object information on the video playback screen 220. Display examples will be described later.

S19: The viewer, for example, presses an object displayed on the video playback screen 220 with the pointing device 512 for selection.

S20: The operation reception unit 12 of the terminal apparatus 10 receives the selection of the object. The instruction information display unit 23 displays a post-conversion operation time associated with the object.

S21: The viewer, for example, operates a pointer on a time indicator displayed on the video playback screen 220 to overlap with a position of the post-conversion operation time.

S22: The operation reception unit 12 of the terminal apparatus 10 receives the operation of the pointer. The video playback unit 19 displays the composite image video at the post-conversion operation time designated by the pointer. The display control unit 13 displays the object at the post-conversion operation time designated by the pointer.

Examples of Video Playback Screen

With reference to FIGS. 22 to 31, the video playback screen 220 displayed in step S18 is described.

FIG. 22 is a diagram illustrating the video playback screen 220 on which a post-conversion operation time is displayed. Although the configuration of the video playback screen 220 illustrated in FIG. 22 is merely an example, the configuration of the video playback screen 220 is described first.

An area R1 is an area in which relatively important conference information is displayed. In the area R1, for example, a name of the conference, a date and time of the conference, and a place of the conference are displayed.

The area R2 is an area in which the composite image video (panoramic image 203 and talker images 204) and the object 210 are displayed. The video playback unit 19 plays back the composite image video in the same manner as an ordinary video is played back. On the other hand, the object is not a video. For this reason, the display control unit 13 displays, while referring to a playback time of the composite image video, an object having the object ID of which a post-conversion operation time in the electronic whiteboard operation data coincides with the playback time of the composite image video. In this way, the composite image video and the object are displayed in synchronization with each other. Further, in response to a particular operation performed by the user in the area R2, the video playback unit 19 starts playing back the object. The video playback unit 19 displays objects having the object ID of which post-conversion operation times are on or later than the time designated by the user while changing the objects in accordance with an elapsed time. The video playback unit 19 may also play back the composite image video in synchronization with the playback of the objects. The video playback unit 19 sequentially acquires objects having the object ID of which post-conversion operation times are on or later than the designated time from the electronic whiteboard operation data. The video playback unit 19 plays back the composite image video according to the playback time until the post-conversion operation time is switched. In a case that the playback time comes to a next post-conversion operation time to which the post-conversion operation time is switched, the video playback unit 19 plays back another object based on the information on the object details. Both the objects and the composite image video can be played back at multi-speeds (0.5×, 0.75×, 1.25×, 1.5×, 1.75×, or 2.0× speed, or any desired speed). Only either the objects or the composite image video may be played back. In this case, the objects or the composite image video which is not played back is in a stationary state.

An area R3 is an area in which the conference information that is not displayed in the area R1 is displayed. In the area R3, for example, names of participants and decisions are displayed.

An area R4 is an area in which text data is displayed. The text data is also displayed in synchronization with the composite image video in the same manner as the object is displayed in synchronization with the composite image video. Accordingly, the text data in the area R4 is scrolled downward as the playback time elapses.

In the area R2, the object 210 of "ABC" is displayed. In a case that the viewer presses the object 210 with the pointing device 512, the instruction information display unit 23 displays the post-conversion operation time 211 associated with the object 210. The post-conversion operation time 211 may be a post-conversion time obtained by converting either the input start time or the last update time. In this example, the post-conversion operation time 211 obtained by converting the input start time is displayed. The post-conversion operation time 211 may be a median value between the post-conversion operation times obtained by converting the input start time and the last update time.

The viewer can check that a discussion on the object 210 is conducted at the post-conversion operation time 211. The composite image video is played back from the post-conversion operation time 211 with an operation to the pointer 212 on the time indicator 213 by the viewer. The post-conversion operation time 211 may be hidden after a certain period of time elapses after being displayed.

For convenience of explanation, the only one object 210 is displayed in the area R2 on the video playback screen 220 of FIG. 22. However, in a case that the viewer advances the pointer 212 on the time indicator 213, all objects input up to the time indicated by the pointer 212 are displayed. Accordingly, in a case that a desired object that is the object 210 is displayed and selected by an operation performed by the viewer, the post-conversion operation time 211 associated with the object 210 is displayed.

Alternatively, as illustrated in FIG. 23, in a case that the viewer presses the object 210 with the pointing device 512, the instruction information display unit 23 may display the post-conversion operation time 211 associated with the object 210, and the video playback unit 19 may play back the composite image video from the post-conversion operation time 211. FIG. 23 is a diagram illustrating the video playback screen 220 on which the composite image video is to be played back from the post-conversion operation time 211 in the case that the object is pressed. The composite image video is played back from the post-conversion operation time 211 without the operation to the pointer 212 on the time indicator 213 by the viewer.

The video playback unit 19 may play back the composite image video from a time slightly before the post-conversion operation time 211. If a conversation related to the object starts before the object is drawn, the viewer is allowed to hear the conversation from the beginning or the middle of the conversation.

In FIG. 23, the composite image video is played back from the post-conversion operation time 211 by the operation of pressing the object 210. Alternatively, the composite image video may be played back from the post-conversion operation time 211 by an operation of pressing the post-conversion operation time 211 displayed on the video playback screen 220 as in FIG. 22.

In the case that the composite image video is played back from the post-conversion operation time 211, the display control unit 13 displays all objects from the initial object to the object having the operation time coinciding with the post-conversion operation time 211 in the electronic whiteboard operation data. The user can retroactively check not only the composite image video but also the objects at the time of the post-conversion operation time 211. The composite image video and the objects are displayed in synchronization with each other without any particular operation by the user. In the following description, unless otherwise specified, the objects are displayed in synchronization with the composite image video.

Alternatively, as illustrated in FIG. 24, the video playback unit 19 may play back the composite image video from the post-conversion operation time 211 through a menu operation. FIG. 24 is a diagram illustrating a menu 215 displayed on the video playback screen 220 after the object 210 is pressed. In the case that the viewer selects the object 210, the post-conversion operation time 211 is displayed and the menu 215 is displayed. In a case that the viewer selects an option 215a (an example of a display component) of "PLAYBACK FROM TIME OF DRAWING," the video playback unit 19 plays back the composite image video from the post-conversion operation time 211. According to the operation illustrated in FIG. 24, the composite image video is played back from the post-conversion operation time 211 without the operation to the pointer 212 on the time indicator 213 by the viewer.

Figure 25:
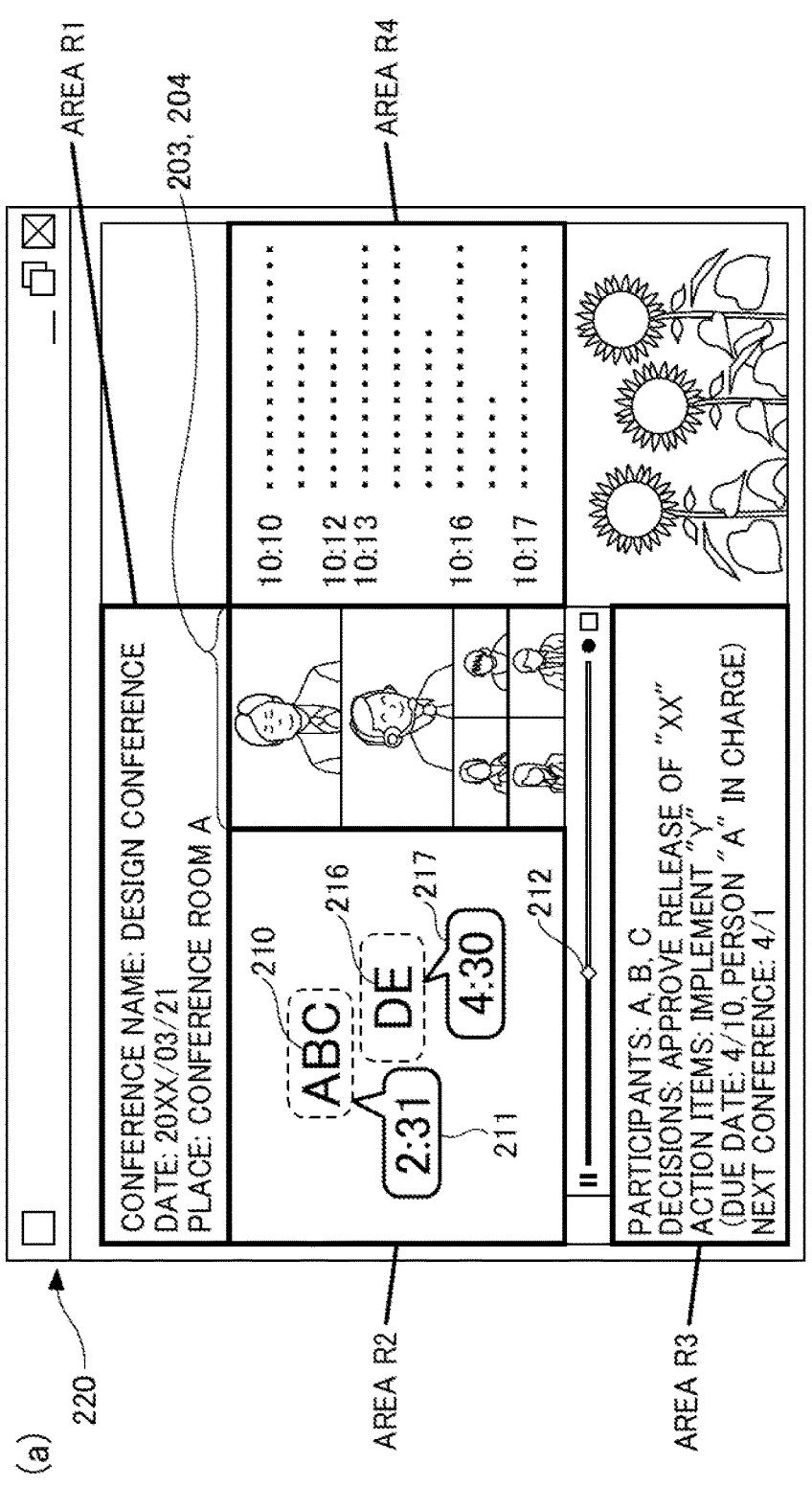
FIG. 25 is a diagram illustrating the video playback screen on which post-conversion operation times are continuously displayed, and a data structure of object information related to objects displayed in an area of the video playback screen according to embodiments of the present disclosure.

Alternatively, as illustrated in FIG. 25, the post-conversion operation time 211 may be continuously displayed. Part (a) of FIG. 25 is a diagram illustrating the video playback screen 220 on which the post-conversion operation time is continuously displayed. Part (b) of FIG. 25 is a diagram illustrating a data structure of object information on the object 210 and an object 216 displayed in the area R2. In part (a) of FIG. 25, the post-conversion operation time 211 and a post-conversion operation time 217 are respectively displayed for both of the object 210 of "ABC" and the object 216 of "DE." Such processing can be performed by the instruction information display unit 23 to display the post-conversion operation times 211 and 217 of the objects according to the playback time of the composite image video in a case that the display control unit 13 displays each object of which an input start time in the electronic whiteboard operation data comes to the playback time of the composite image video. The viewer can check the post-conversion operation times 211 and 217 at which the discussions on the objects 210 and 216 are conducted without pressing neither of the object 210 or 216.

Figure 26:
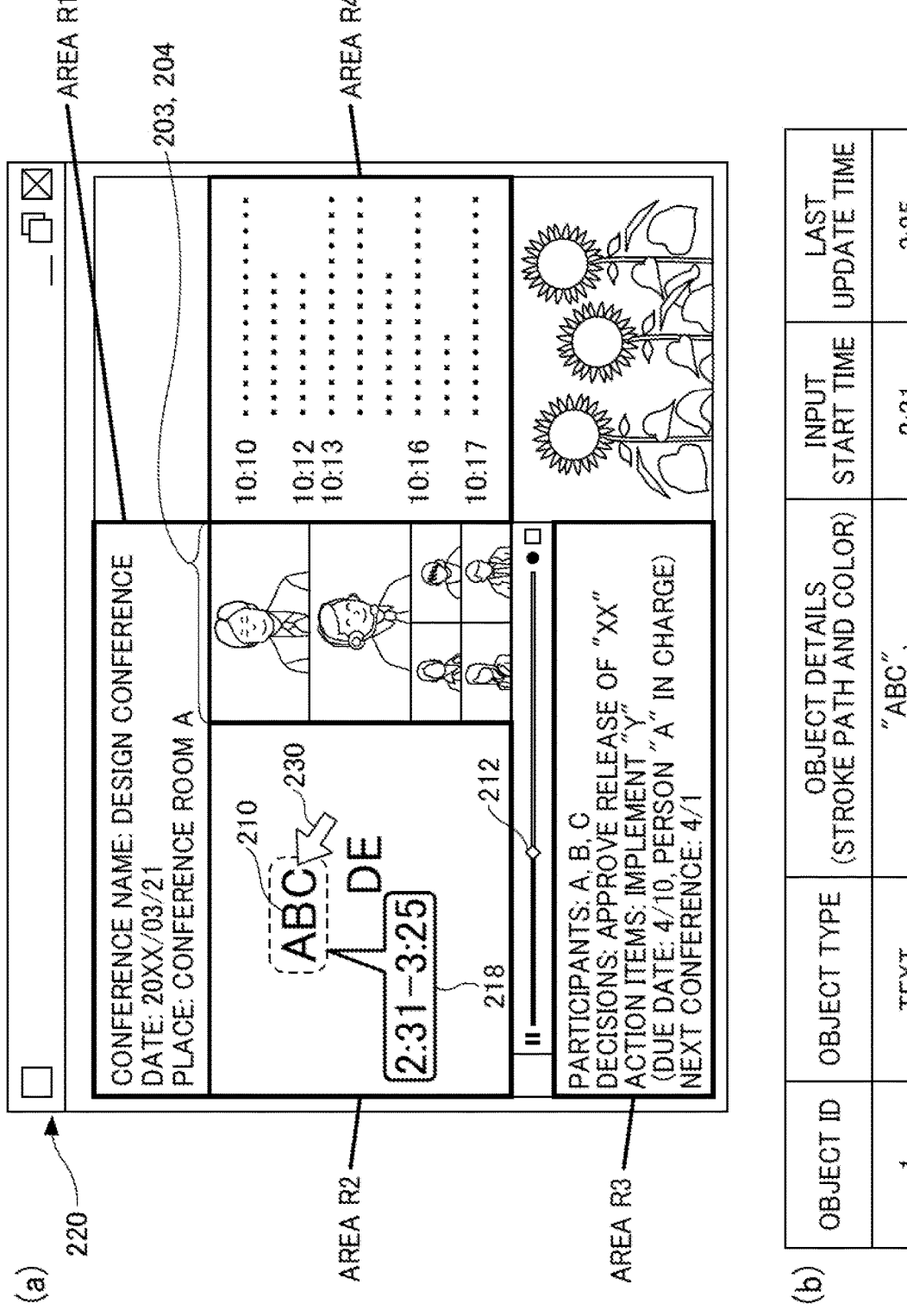
FIG. 26 is a diagram illustrating the video playback screen on which a post-conversion operation time indicating two post-conversion operation times of an input start time and a last update time of an object is displayed, and a data structure of the object information related to objects displayed in the area of the video playback screen according to embodiments of the present disclosure.

Alternatively, as illustrated in FIG. 26, a post-conversion operation time 218 indicating two post-conversion operation times of the input start time and the last update time of the object may be displayed. Part (a) of FIG. 26 is a diagram illustrating the video playback screen 220 on which the post-conversion operation time 218 indicating the two post-conversion operation times of the input start time and the last update time of the object is displayed. Part (b) of FIG. 26 is a diagram illustrating a data structure of object information on the objects displayed in the area R2. According to the object information, among the objects displayed in the area R2, the input start time and the last update time of the object 210 are "2:31" and "3:25," respectively. In part (a) of FIG. 26, since the object 210 of "ABC" is pressed, the instruction information display unit 23 displays the post-conversion operation time 218 indicating two post-conversion operation times of "2:31-3:25." Similarly, in a case that the viewer presses the object 216 of "DE," the instruction information display unit 23 displays the post-conversion operation time 218 indicating two post-conversion operation times of "4:30-4:30."

Accordingly, the viewer can check from when to when the discussion on the object 210 is conducted. Thus, a desired scene of the composite image video can be retrieved fast and easy.

Figure 27:
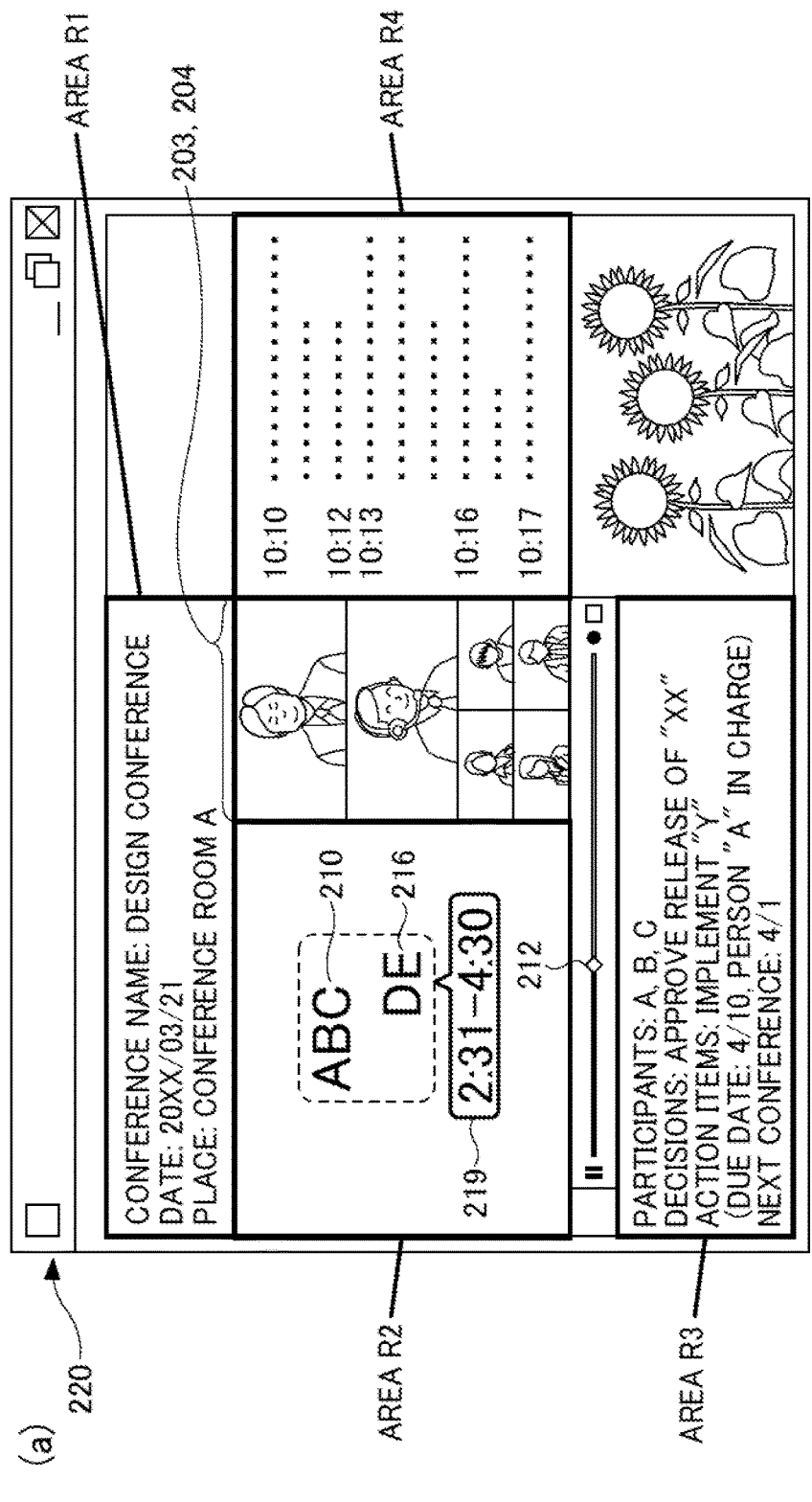
FIG. 27 is a diagram illustrating display of a post-conversion operation time in a case that a plurality of objects are selected, and a data structure of the object information related to the objects displayed in the area of the video playback screen according to embodiments of the present disclosure.

With reference to FIG. 27, a post-conversion operation time for a plurality of objects is described. Part (a) of FIG. 27 is a diagram illustrating display of a post-conversion operation time 219 in a case that a plurality of objects 210 and 216 are selected. Part (b) of FIG. 27 is a diagram illustrating a data structure of object information on the objects displayed in the area R2. The viewer surrounds the plurality of objects 210 and 216 in the area R2 with the pointing device 512 to select the plurality of objects. The instruction information display unit 23 retrieves an input start time of the initial object and a last update time of the last object from the object information of the plurality of objects and displays the input start time and the last update time. In part (a) of FIG. 27, two objects 210 of "ABC" and 216 of "DE" are selected as an example. Since the input start time of the object 210 of "ABC" is "2:31" and the last update time of the object 216 of "DE" is "4:30", the instruction information display unit 23 displays the post-conversion operation time 219 indicating a range of "2:31-4:30" for the two selected objects. Accordingly, the viewer can check from when to when the discussions on the two objects are conducted. Thus, a desired scene of the composite image video can be retrieved fast and easy.

Alternatively, as illustrated in FIG. 28, in a case where a post-conversion operation time of a selected object overlaps with an utterance segment, the composite image video may be played back from the beginning of the utterance segment. Part (a) of FIG. 28 is a diagram illustrating the composite image video to be played back from the beginning of the utterance segment. Part (b) of FIG. 28 is a diagram illustrating a data structure of object information on the objects displayed in the area R2. Part (c) of FIG. 28 is a diagram illustrating an utterance start time and an utterance end time obtained from the item "TIME" of the text data.

The utterance segment is a period in which audio is continuously output. For example, one utterance segment is a period separated by a silent state for a certain period of time. Information on the utterance segment is information that includes a certain time and another time indicating from when to when an utterance segment ranges. In a case where the length of the certain period of time used for separating the utterance segment is the same as that used for separating one recognition result character string in the text data, the utterance segment is the period of time in which the one recognition result character string is uttered. Note that the length of the certain period of time used for separating the utterance segment does not have to be the same as that used for separating the text data. For example, in a case that a talker switches to another talker, the utterance segment may be separated even if the length of a silence state is less than the certain period of time. An utterance start time and an utterance end time are described in part (c) of FIG. 28 as an example. The utterance start time is the same as the item "TIME" of the text data. The utterance end time is a time obtained by subtracting the length of the silent state from the value of the item "TIME" associated with the next recognition result character string. Both the utterance start time and the utterance end time are converted into elapsed times from the recording start time of the composite image video.

In part (a) of FIG. 28, the object 210 of "ABC" is selected with the pointing device 512. The post-conversion operation time of the object 210 of "ABC" is "2:31." According to the information on the utterance segment illustrated in part (c) of FIG. 28, the post-conversion operation time "2:31" overlaps with a period of time in which the text data having the utterance segment ID "1" is uttered from the utterance start time "2:15" to the utterance end time "3:20." Accordingly, the video playback unit 19 plays back the composite image video from "2:15" that is the utterance start time of the text data having the utterance segment ID "1." The pointer 212 on the time indicator 213 instantaneously moves (jumps) to "2:15."Thus, the viewer can view the composite image video from the initial discussion among the discussions conducted on the object.

Figure 29:
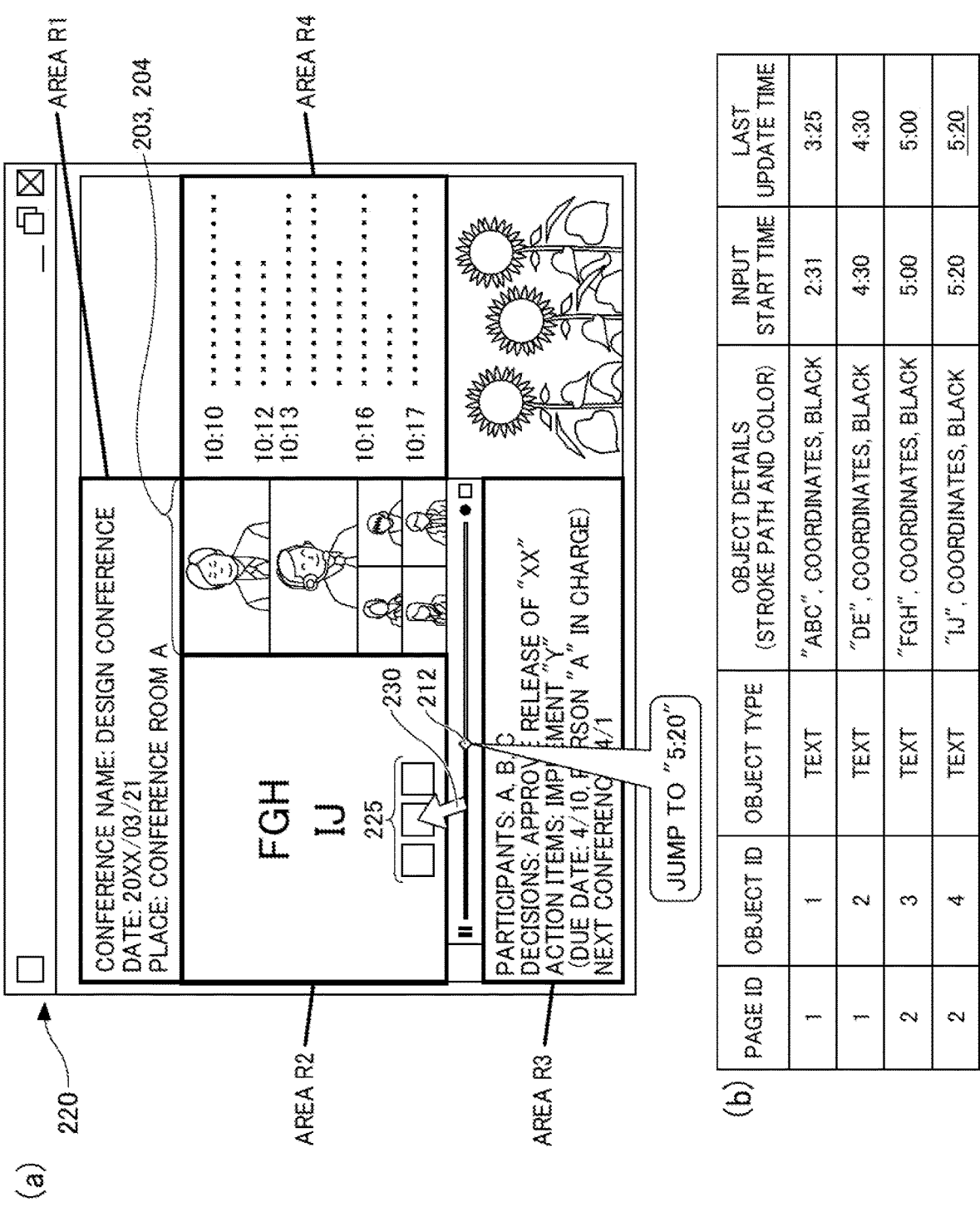
FIG. 29 is a diagram illustrating the video playback screen on which the composite image video is to be played back from a post-conversion operation time of an object input last to a page, and a data structure of the object information related to objects displayed in the area of the video playback screen according to embodiments of the present disclosure.

Alternatively, as illustrated in FIG. 29, the video playback unit 19 may play back the composite image video from a time corresponding to a post-conversion operation time of an object in units of pages. Part (a) of FIG. 29 is a diagram illustrating the composite image video to be played back from a post-conversion operation time of an object last input in a page. Part (b) of FIG. 29 is a diagram illustrating a data structure of object information on the objects displayed in the area R2.

Thumbnails 225 (another example of a display component) representing individual pages are displayed in the lower portion of the area R2. A page is, for example, a partition representing one screen (corresponding to the size of the display) on which objects are displayed. In a case that the viewer selects one thumbnail representing a page from the thumbnails 225, the video playback unit 19 plays back the composite image video from the last update time of the object that is updated last among the objects in the page. For example, in a case that the viewer selects a thumbnail representing the second page, the composite image video is played back from the time "5:20" which is the last update time of the object updated last on the second page. Further, the display control unit 13 displays, in the area R2, all objects from the initial object to the object having the operation time coinciding with the time "5:20" in the electronic whiteboard operation data. The viewer can select an object on which discussion is to be checked in the final state of the second page and operate the terminal apparatus 10 to play back again the composite image video from the post-conversion operation time 211 of the object selected by the viewer. In other words, the viewer can select an object on which discussion is to be checked from all the objects on a page.

Alternatively, as illustrated in FIG. 30, the color of the time indicator and the color of the object may be associated with each other. Part (a) of FIG. 30 is a diagram illustrating the video playback screen 220 on which objects are displayed in colors according to the color of the time indicator 213. Part (b) of FIG. 30 is a diagram illustrating a data structure of object information on the objects displayed in the area R2.

The time indicator 213 is color-coded according to the time zone as follows. As described below, it is assumed that colors and time zones are associated with each other in advance. The video playback unit 19 divides the length of the time indicator into time zones and displays objects in colors corresponding to the time zones. A time zone "0:00-2:00" corresponds to yellow. Also, times zones "2:00-4:00," "4:00-6:00," and "6:00-8:00" correspond to green, blue, and purple, respectively. On the other hand, according to the object information, the input start time of an object 226 of "AB" is "1:31." Also, the input start times of an object 227 of "CD," an object 228 of "EF," and an object 229 of "GH" are "3:30," "5:00," and "6:20," respectively. Accordingly, the display control unit 13 displays, based on the associations between the colors and the time zones, the object 226 of "AB" in yellow, the object 227 of "CD" in green, the object 228 of "EF" in blue, and the object 229 of "GH" in purple, respectively. Thus, the viewer can easily specify, based on the color of the time indicator 213, the time zone in which the discussion on each object is conducted.

Alternatively, as illustrated in FIG. 31, the difference between the operation time of the object and the playback time of the composite image video may be associated with the gradation of the object. Part (a) of FIG. 31 is a diagram illustrating the video playback screen 220 on which objects are displayed in gradation according to a difference between an operation time of each object and a playback time. Part (b) of FIG. 31 is a diagram illustrating a data structure of object information on the objects displayed in the area R2.

Each of the objects 226 to 229 is displayed in the color drawn in the conference indicated in the object details. On the other hand, according to the object information, the input start time of the object 226 of "AB" is "1:31." Also, the input start times of the object 227 of "CD," the object 228 of "EF," and the object 229 of "GH" are "3:30," "5:00," and "6:20," respectively.

The display control unit 13 displays the objects 226 to 229 in gradation according to a difference between an input start time of each of the objects 226 to 229 and the playback time of the composite image video. In a case that the current playback time of the composite image video is considered to be "3:30," the absolute value of the difference between the input start time of each object and the playback time is as follows. The absolute values for the object 226 of "AB," the object 227 of "CD," the object 228 of "EF," and the object 229 of "GH" are calculated by formulas given below.

AB: "3:30"–"1:31"=1:59
CD: "3:30"–"3:30"=0:00
EF: "3:30"–"5:00"=1:30
GH: "3:30"–"6:20"=2:50

The display control unit 13 displays an object darker in gradation as a difference is smaller, and displays an object lighter in gradation as a difference is larger. In a case where a difference is extremely large, the object is displayed transparent and substantially invisible. Accordingly, the display control unit 13 displays the objects darker in gradation in the order of "CD," "EF," "AB," and "GH." The display control unit 13 recalculates the density of the gradation for each object every second, for example, and updates the gradation for each object. The display control unit 13 displays even the objects that have not been played back at the current playback time of "3:30" with reduced densities in gradation. The viewer may be allowed to set how much range of objects before and after the current playback time of "3:30" are displayed (a time range to display the objects transparent).

As a result, since only the objects highly relevant to the discussion at the playback time are displayed, visual recognizability increases. In addition, displaying the objects to be played back in the future allows the viewer to easily understand the discussion. The viewer can determine, from the gradation densities of the objects, how long before or after the current playback time the objects are input. The difference between the last update time and the playback time may be used instead of the difference between the input start time and the playback time.

As described above, according to the record creation system of the present embodiment, a time at which a discussion on an object is conducted can be displayed in association with the object.

Second Embodiment

In the present embodiment, a record creation system that displays an operation time of an object on a time indicator is described.

Figure 32:
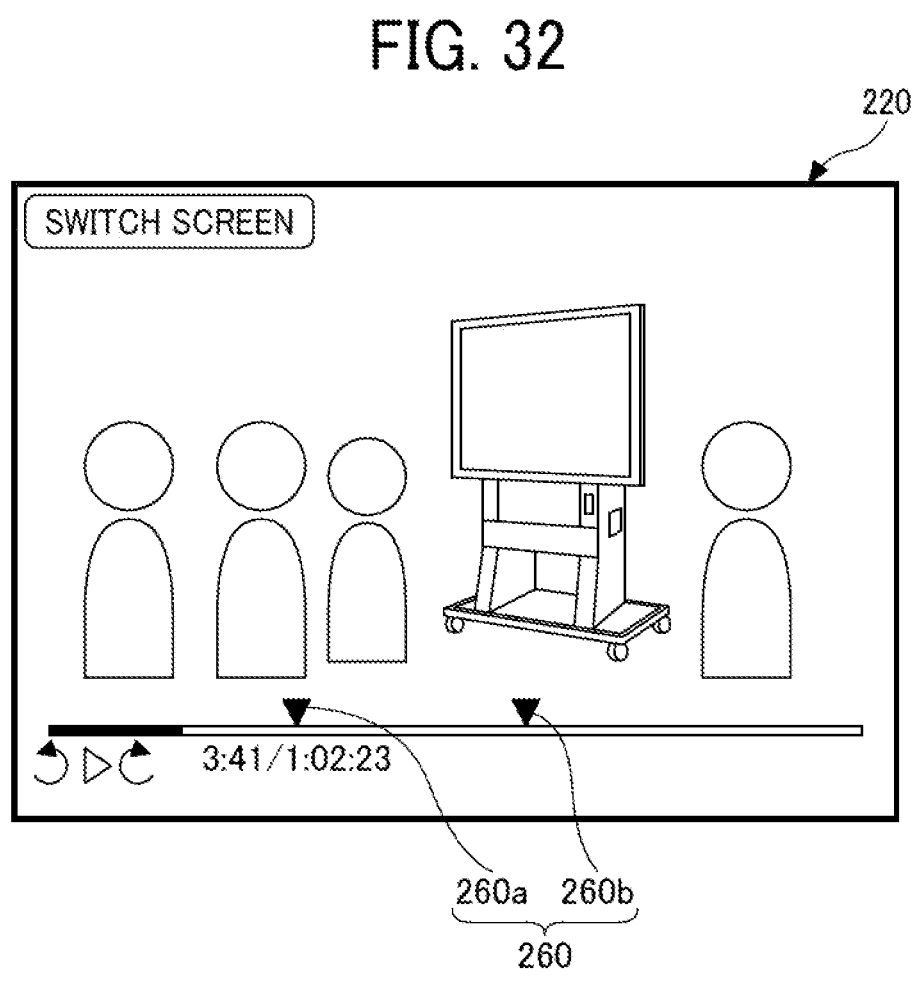
FIG. 32 is a diagram illustrating the video playback screen on which marks are displayed according to embodiments of the present disclosure.

With reference to FIG. 32, an overview of the record creation system is described. FIG. 32 is a diagram illustrating the video playback screen 220 according to the present embodiment. On the video playback screen 220 of FIG. 32, pen engagement times of objects are indicated by marks 260 (260*a* and 260*b*) on the time indicator 213. A mark 260 is displayed at the time when an input of one object is started (or may be finished) and another mark 260 is displayed at the time when another input is started again after no input for a certain period of time.

In a case that the viewer presses one of the marks 260 with the pointing device 512, the terminal apparatus 10 plays back the composite image video from the pen engagement time corresponding to the one of the marks 260. The display control unit 13 displays all objects from the initial object to the object having the operation time coinciding with the pen engagement time corresponding to the one of the marks 260 in the electronic whiteboard operation data.

The present embodiment is described on the assumption that the hardware configurations illustrated in FIGS. 4, 5, and 8, and the functional configuration illustrated in FIG. 9 described in the first embodiment are applicable.

Figure 33:
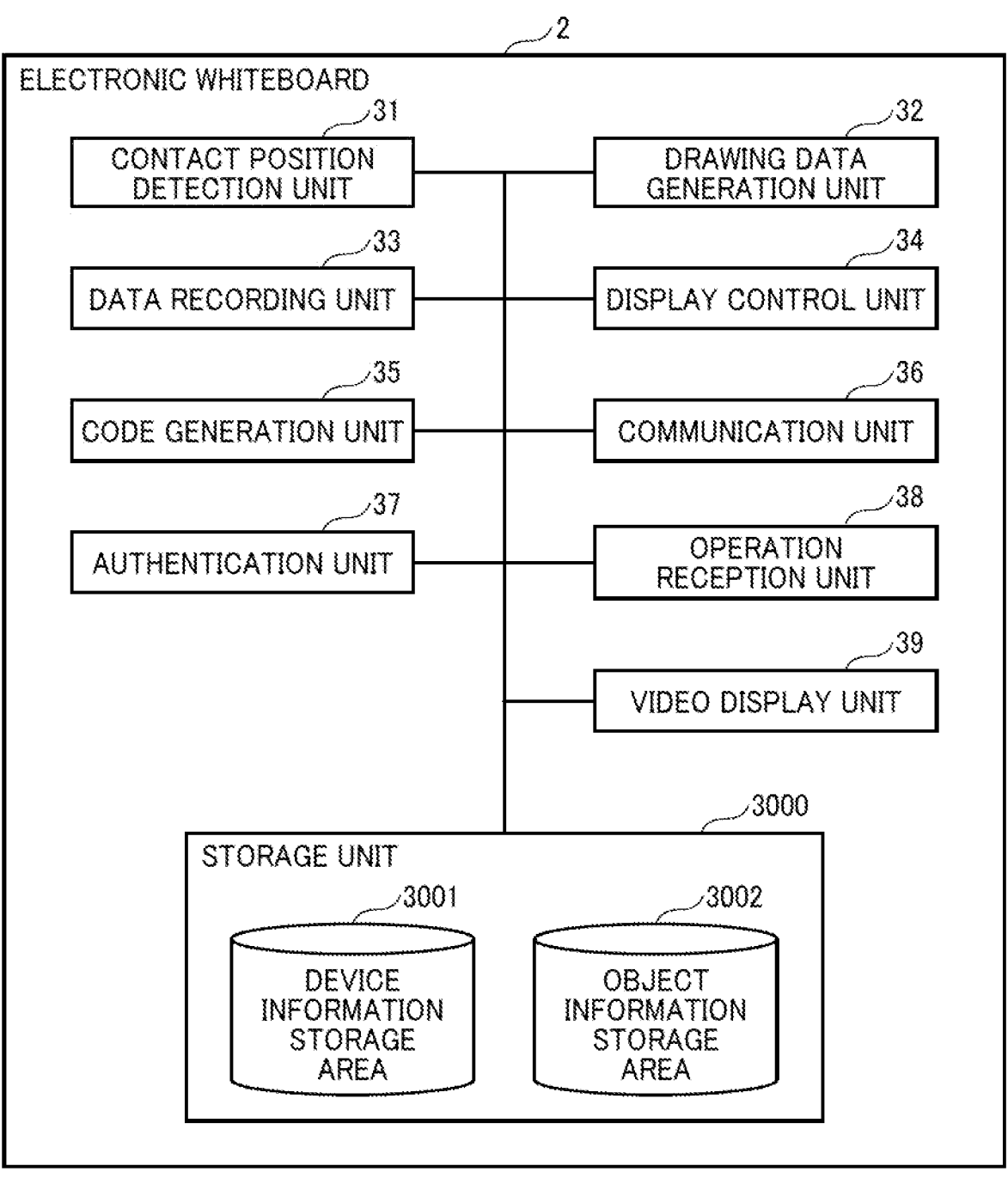
FIG. 33 is a block diagram illustrating functional configurations of another electronic whiteboard according to embodiments of the present disclosure.

On the other hand, as illustrated in FIG. 33, a functional configuration of the electronic whiteboard 2 is different from that of the first embodiment. FIG. 33 is a block diagram illustrating functional configurations of the electronic whiteboard 2. The electronic whiteboard 2 of the present embodiment includes a video display unit 39. In a case where the capture device 411 receives a video transmitted from an external device such as the PC 470 via a High-Definition Multimedia Interface (HDMI) cable, the video display unit 39 displays the video on an entirety or a part of the display 480.

FIG. 34 is a diagram illustrating a data structure of stroke data. The item "LINE TYPE" indicates a type of a line such as a solid line or a broken line. The item "LINE COLOR" indicates a color of the line. The item "LINE WIDTH" indicates a width of the line. The item "PEN ENGAGE-MENT TIME" indicates a time (standard time) at which an electronic pen or a finger contacts the touch panel. The item "PEN ENGAGEMENT COORDINATES" indicates contact coordinates. The items "DIFFERENTIAL COORDINATES $(\Delta x_1, \Delta y_1)$," " . . . ," and "DIFFERENTIAL COORDI-NATES $(\Delta x_n, \Delta y_n)$" indicate differences (differences in an X-axis direction and differences in a Y-axis direction) between coordinates of a contact position detected this time and coordinates of a contact position detected previously. The coordinates of a position are calculated at predeter-mined time intervals between when the user engages the electronic pen or the finger on the touch panel and when the user disengages the electronic pen or the finger from the touch panel.

The stroke data as illustrated in FIG. 34 is also generated in the first embodiment. In the present embodiment, since the pen engagement time may be the operation time, the description is given with reference to FIG. 34.

In the present embodiment, in addition to an input of a stroke used in the first embodiment, a page switching operation, an operation of expanding a handwriting area (swipe event data), and video input event data are used as examples of the electronic whiteboard operation data.

Operation Procedure

Figure 35:
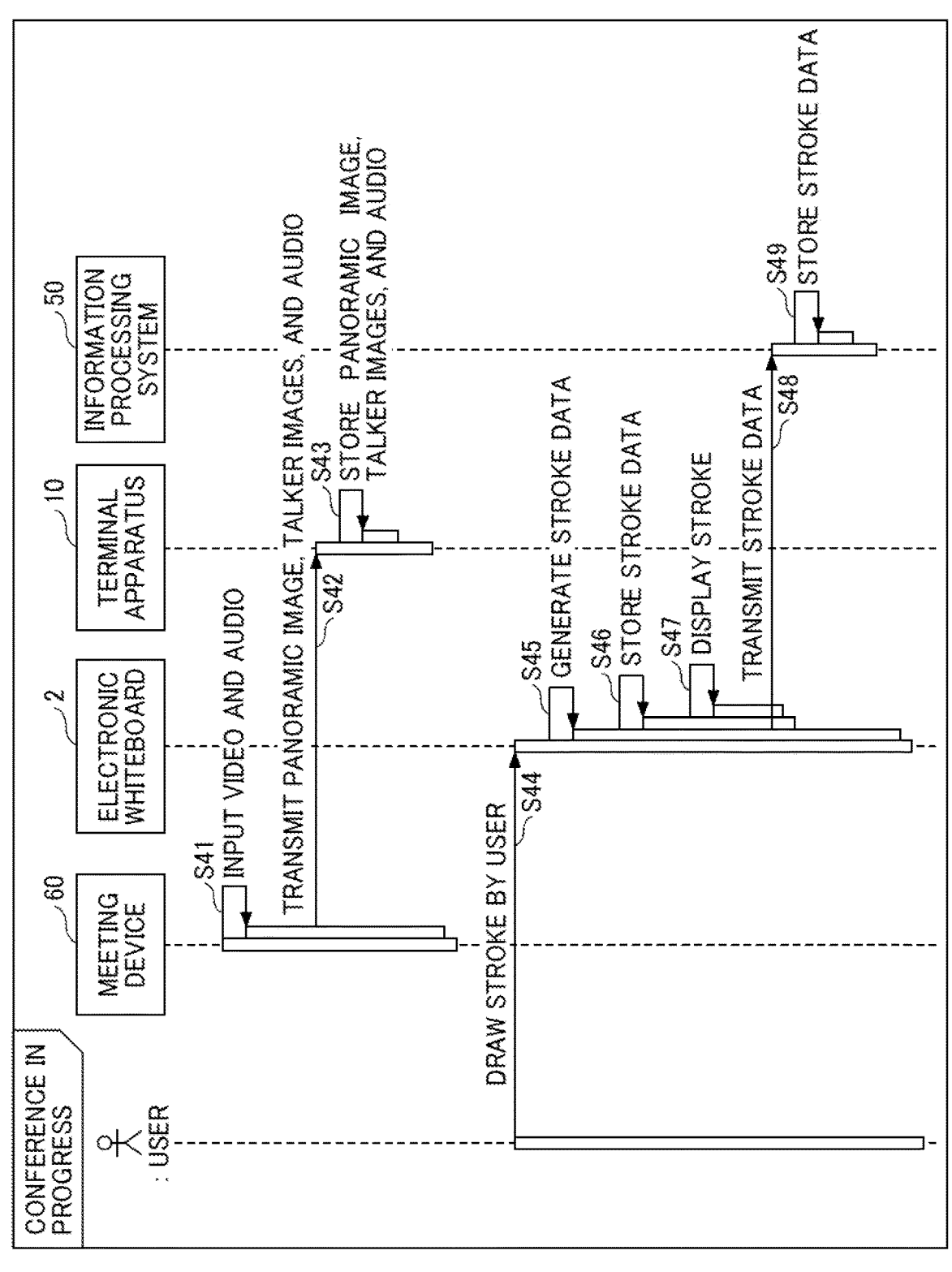
FIG. 35 is a sequence chart illustrating processing to store object information according to embodiments of the present disclosure.

FIG. 35 is a sequence chart illustrating processing to store object information.

S41: The user participates in a conference using the meeting device 60 and the electronic whiteboard 2 in the same conference. The meeting device 60 and the electronic whiteboard 2 are already linked to each other by the proce-dure for participating in the same conference (see FIG. 12). The meeting device 60 and the electronic whiteboard 2 are in a state in which each of the meeting device 60 and the electronic whiteboard 2 can transmit a composite image video and electronic whiteboard operation data to the infor-mation processing system 50 with designation of common conference ID.

S42: In the conference, the panoramic image generation unit 62 of the meeting device 60 generates a panoramic image. The talker image generation unit 63 generates talker images. The audio collection unit 64 collects audio. The terminal communication unit 61 transmits the panoramic image, the talker images, and the audio data of the collected audio to the terminal apparatus 10.

S43: The device communication unit 16 of the terminal apparatus 10 receives and stores the panoramic image, the talker images, and the audio data.

S44: In the conference, the user touches the touch panel of the electronic whiteboard 2 with an electronic pen or a finger at any time to draw strokes.

S45: The drawing data generation unit 32 generates stroke data according to the coordinate point sequences of the positions touched by the user on the touch panel.

S46: The data recording unit 33 formats the stroke data into the data structure illustrated in FIG. 34 and stores the stroke data in the object information storage area 3002. The data recording unit 33 also stores the time (pen engagement time) at which the electronic pen or the finger touches the touch panel in the object information storage area 3002.

S47: The display control unit 34 displays the strokes based on the stroke data on the display 480.

S48: The communication unit 36 of the electronic white-board 2 transmits the stroke data as illustrated in FIG. 34 to the information processing system 50 with designation of the conference ID.

S49: The communication unit 51 of the information processing system 50 receives the stroke data and stores the stroke data in the object information storage area 5004 included in the information processing system 50.

Figure 36:
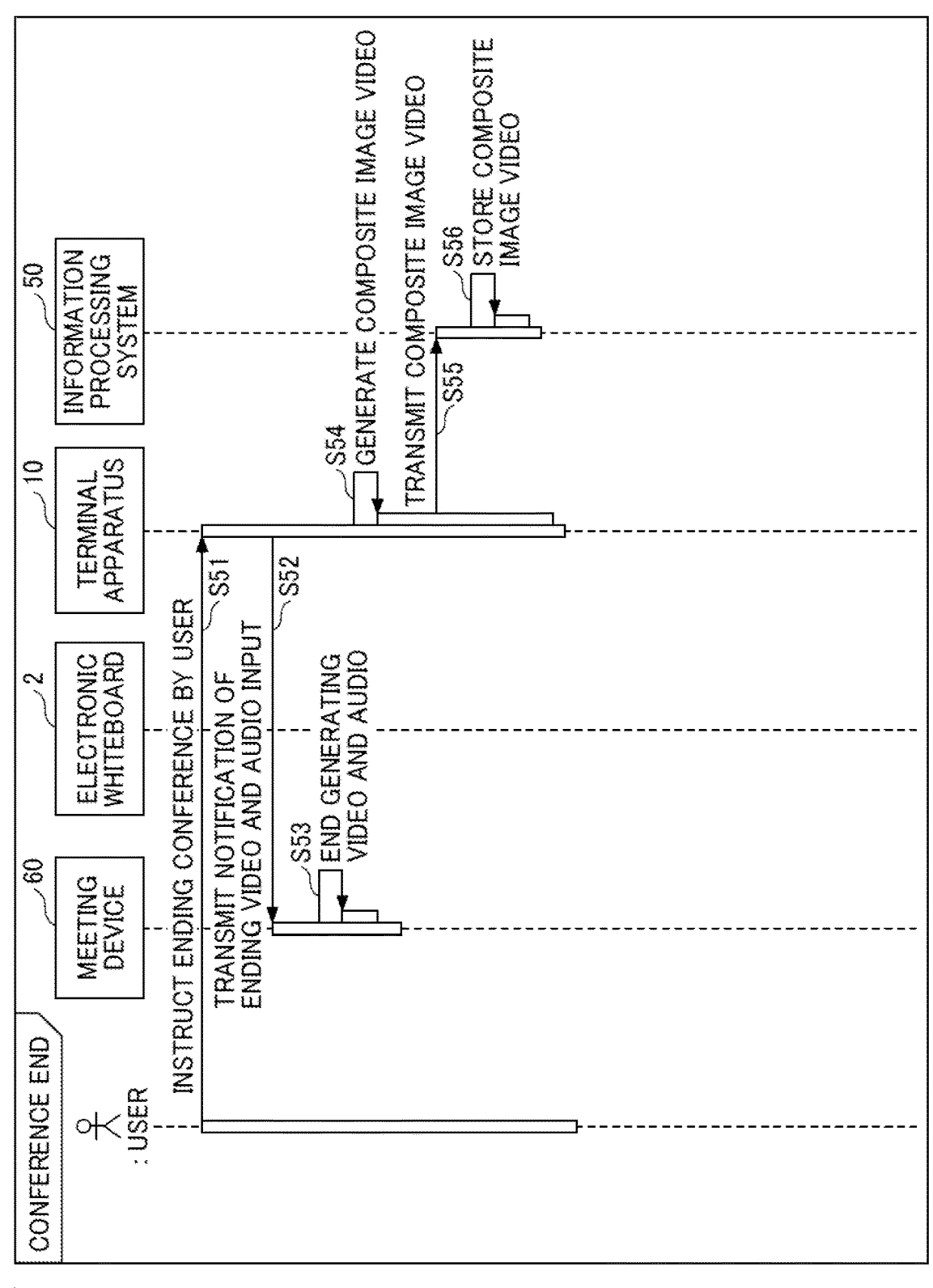
FIG. 36 is a sequence chart illustrating processing performed at the end of a conference in which the other electronic whiteboard is used according to embodiments of the present disclosure.

FIG. 36 is a sequence chart illustrating processing per-formed at the end of the conference in which the electronic whiteboard 2 is used.

S51: The user presses a button to end a conference on the information recording application 41 operating on the ter-minal apparatus 10.

S52: Accordingly, the device communication unit 16 transmits a notification of the end of the conference (end of video input and audio input) to the meeting device 60.

S53: The terminal communication unit 61 of the meeting device 60 receives the notification of the end of the confer-ence and ends generating video and audio.

S54: The information recording application 41 generates a composite image video with the panoramic image, the talker images, and the audio stored in the conference.

S55: The communication unit 11 of the terminal apparatus 10 transmits the composite image video to the information processing system 50.

S56: The communication unit 51 of the information processing system 50 receives the composite image video. The text conversion unit 56 converts the audio recorded in the composite image video into text data. The information processing system 50 stores the composite image video, the text data, and the object information in the storage service system 70 in association with the conference ID.

Playback of Composite Image Video

Figure 37:
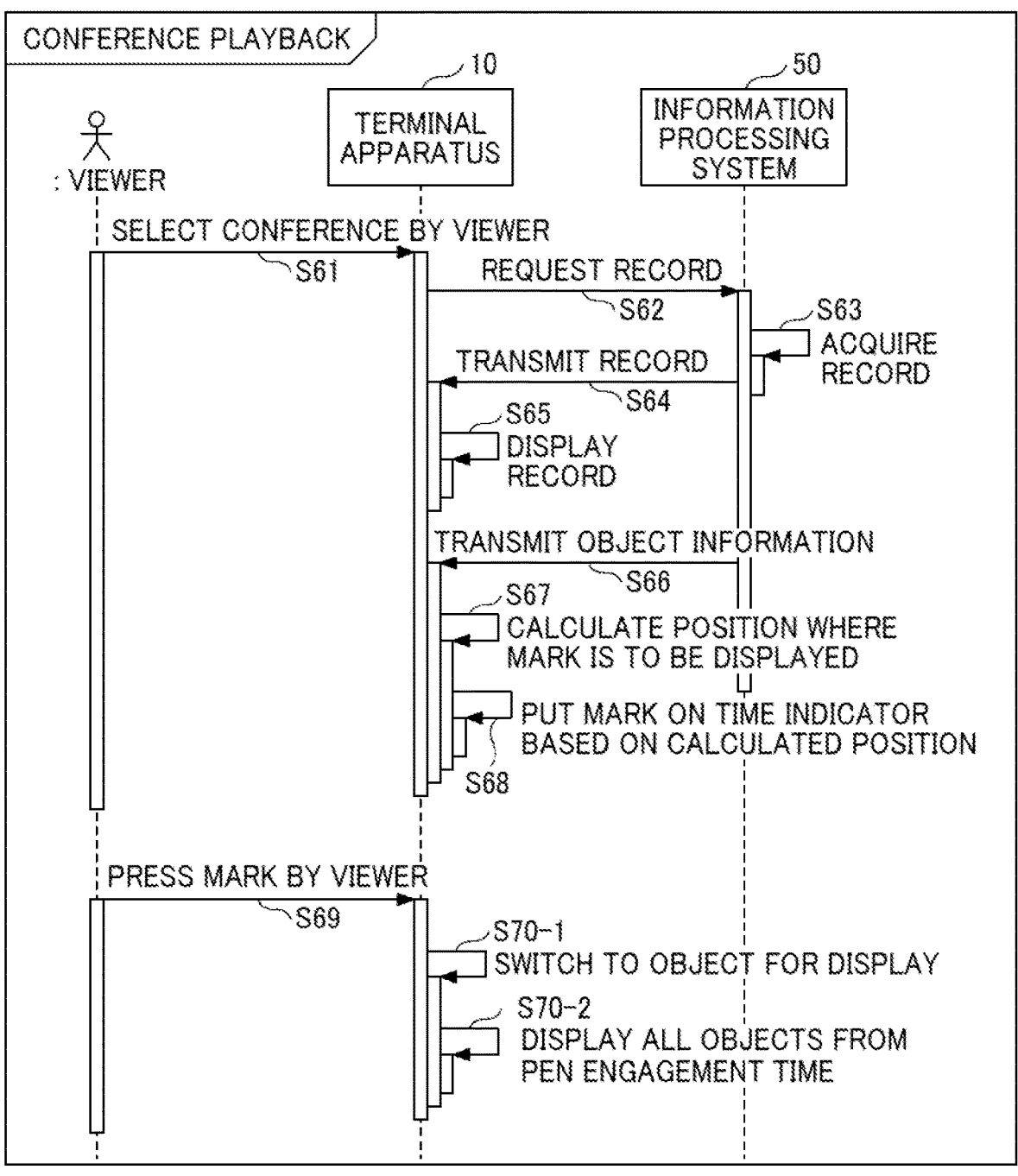
FIG. 37 is a sequence chart illustrating processing at a time of playback of a composite image video according to embodiments of the present disclosure.

FIG. 37 is a sequence chart illustrating processing at a time of playback of the composite image video.

S61: After the end of the conference, the viewer selects the conference just held on a conference list screen displayed by the information recording application 41 operating on the terminal apparatus 10.

S62: The operation reception unit 12 receives the operation of selecting the conference. The communication unit 11 requests a record of the conference from the information processing system 50 with designation of the conference ID.

S63: The communication unit 51 of the information processing system 50 receives the request and acquires the record (composite image video and text data) specified by the conference ID from the storage service system 70.

S64: The communication unit 51 of the information processing system 50 transmits the record to the terminal apparatus 10.

S65: The communication unit 11 of the terminal apparatus 10 receives the record. The video playback unit 19 displays the composite image video and the text data on the video playback screen 220. The video playback unit 19 plays back the composite image video and outputs the audio recorded in the composite image video from a speaker of the terminal apparatus 10.

S66: Also, the communication unit 51 of the information processing system 50 transmits the object information associated with the conference ID to the terminal apparatus 10.

S67: The communication unit 11 of the terminal apparatus 10 receives the object information. The display control unit 13 displays the object based on the object information on the video playback screen 220. The instruction information display unit 23 calculates, based on the pen engagement time, a position where the mark 260 is to be displayed on the time indicator. As in the first embodiment, the pen engagement time of the initial stroke of the strokes represented by the stroke data is already converted into the post-conversion operation time from the recording start time of the composite image video. The instruction information display unit 23 divides the total recording time of the composite image video by the post-conversion operation time, and then multiplies the length of the time indicator by the result of the division to calculate the position where the mark 260 is to be displayed on the time indicator.

S68: The display control unit 13 creates a link that associates the mark 260 with the pen engagement time. Details of the link will be described with reference to FIG. 38. Since the mark 260 indicates a playback time from which the composite image video is to be played back, the link is the playback time from which the composite image video is played back. The playback time is the pen engagement time. The link is embedded in the mark 260.

S69: The viewer presses the mark 260 with the pointing device 512. The operation reception unit 12 of the terminal apparatus 10 receives the operation of pressing.

S70-1: In the present embodiment, since the composite image video and the object are switched and displayed in the same area, the display control unit 13 of the terminal apparatus 10 switches the composite image video to the object for display.

S70-2: The display control unit 13 displays, on the video playback screen 220, the object having the operation time that coincides with the playback time associated with the link embedded in the mark 260. In this case, the display control unit 13 displays all objects on the current page from the initial object to the object having the operation time coinciding with the playback time (pen engagement time) in the electronic whiteboard operation data.

Figure 38:
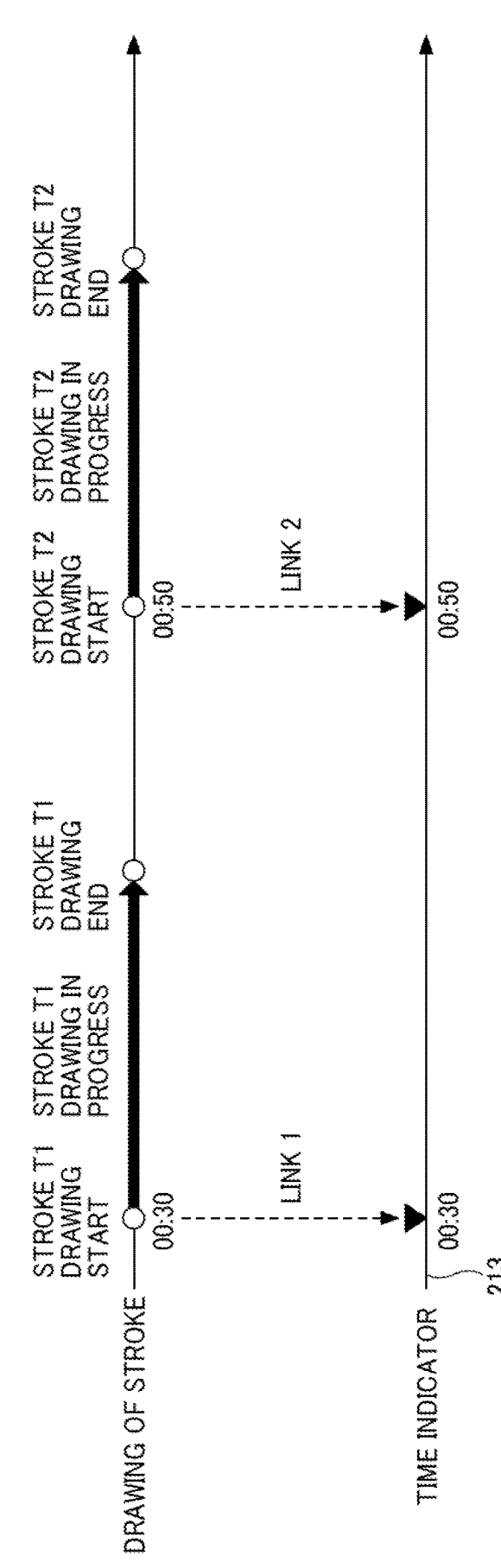
FIG. 38 is a diagram illustrating a link according to embodiments of the present disclosure.

FIG. 38 is a diagram illustrating the link. In FIG. 38, pen engagement and pen disengagement are associated with the time axis for an individual stroke. The link associates the mark 260 with the operation time. For example, the pen engagement time "00:30" of a stroke T1 is associated with the mark 260, and the pen engagement time "00:50" of a stroke T2 is associated with the other mark 260. By pressing one of the marks 260, an object having the operation time associated with the one of the marks 260 is displayed.

On the other hand, by pressing the one of the marks 260, the composite image video can be played back from the operation time associated with the one of the marks 260. Thus, the link associates the mark 260 with the playback time from which the composite image video is played back. In this way, the link associates the mark 260 with the operation time or the playback time.

Examples of Screen

Figure 39:
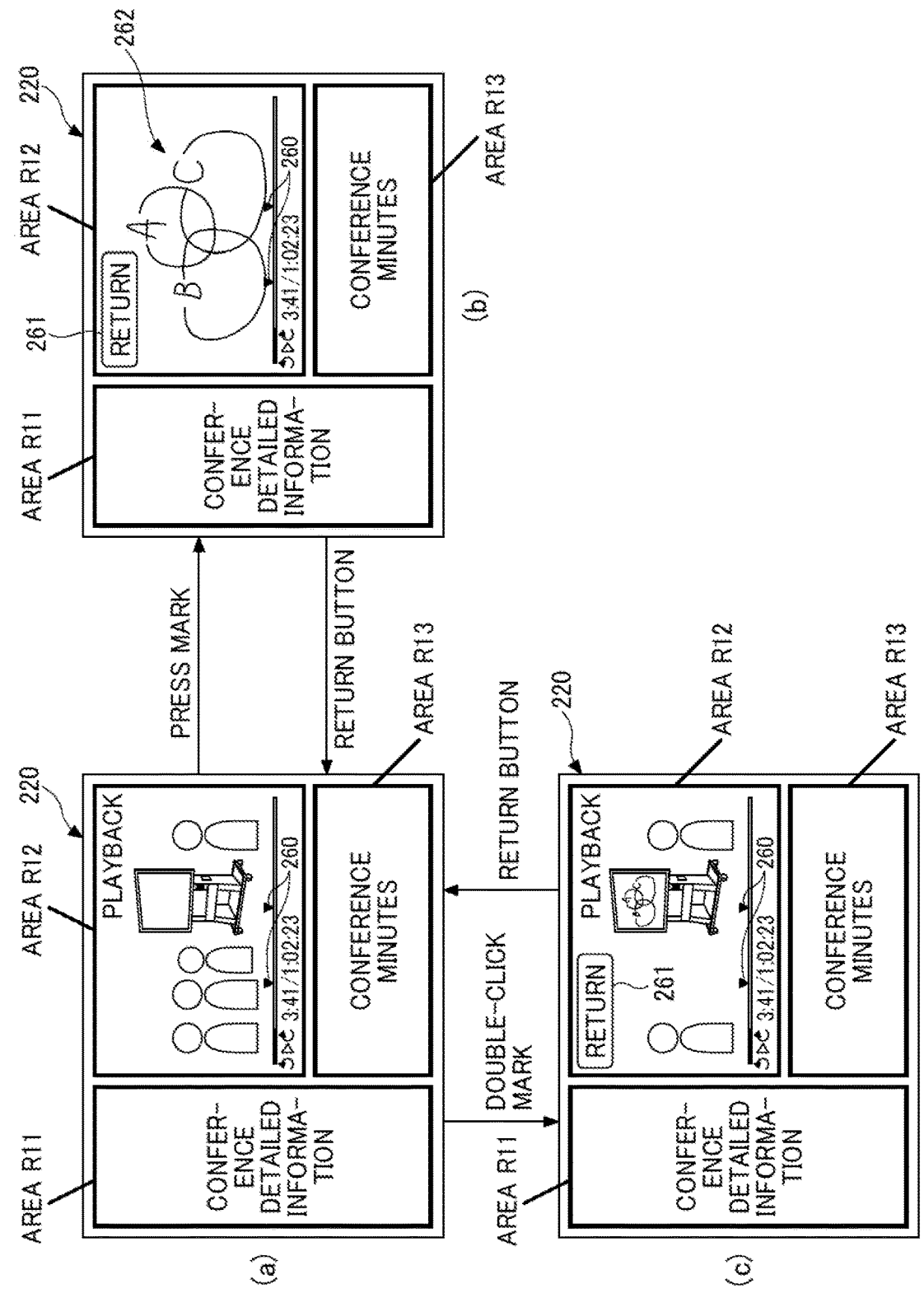
FIG. 39 is a diagram illustrating another video playback screen according to embodiments of the present disclosure.

FIG. 39 is a diagram illustrating the video playback screen 220 according to the present embodiment. Although the configuration of the video playback screen 220 of the second embodiment is different from that of the first embodiment, there is no particular intention. The configuration of the video playback screen 220 may be common between the first embodiment and the second embodiment. Conference information is displayed in an area R11. A composite image video or object information is switched and displayed in an area R12. Minutes of a conference are displayed in an area R13. On the video playback screen 220 illustrated in part (a) of FIG. 39, a composite image video is displayed in the area R12. In addition, the marks 260 are displayed on the time indicator on the video playback screen 220 in part (a) of FIG. 39.

In a case that the viewer presses (for example, clicks) one of the marks 260 with the pointing device 512, the screen is switched to the video playback screen 220 illustrated in part (b) of FIG. 39. A return button 261 is displayed in the area R12. On the video playback screen 220 illustrated in part (b) of FIG. 39, an object representing object information is displayed in the area R12. The display control unit 13 displays the object representing the object information having the operation time that coincides with the playback time (pen engagement time) associated with the one of the marks 260 in the area R12. In other words, the display control unit 13 displays an object 262 based on the object information from the initial object to the object having the operation time coinciding with the pen engagement time in the electronic whiteboard operation data. The object 262 is a group of the objects from the initial object to the object having the operation time coinciding with the pen engagement time in the electronic whiteboard operation data.

In the case that the object 262 is displayed in the area R12, the video playback unit 19 stops playing back the composite image video. Alternatively, the video playback unit 19 may continue to play back the composite image video without stopping playing back the composite image video. Further, in a case that the composite image video is being played back, the display control unit 13 may change the display of the object 262 in accordance with the playback time.

In a case that the viewer presses the return button 261, the screen is switched to the video playback screen 220 illustrated in part (a) of FIG. 39. The video playback unit 19 plays back the composite image video from the playback time (pen engagement time) associated with the one of the marks 260 that has been pressed last. In other words, the video playback unit 19 restarts playing back the composite image video from the time at which the playback of the composite image video is stopped (or from several seconds before the time).

In a case that the viewer double-clicks (or double taps) one of the marks 260 with the pointing device 512, the screen is switched to the video playback screen 220 illustrated in part (c) of FIG. 39. On the video playback screen 220 illustrated in part (c) of FIG. 39, the composite image video is displayed in the area R12. The video playback unit 19 plays back the composite image video from the playback time (pen engagement time) associated with the one of the marks 260 that has been pressed. Thus, the viewer can view the composite image video from the time at which the stroke is handwritten. In the case that the composite image video is displayed in the area R12, the video playback unit 19 does not have to stop playing back the composite image video.

As described above, by displaying the marks 260 on the time indicator 213, the objects having the operation times associated with the respective marks 260 can be displayed. The viewer can operate the terminal apparatus 10 to display the state of the electronic whiteboard 2 at the time when the object is input. In addition, the viewer can operate the terminal apparatus 10 to play back the composite image video from the time when the object is input. After the conference in which the electronic whiteboard 2 and the meeting device 60 that are linked to each other participate, the viewer can check individual objects together with the composite image video of the conference.

Although the objects and the composite image video are switched in the area R12 of FIG. 39, both the objects and the composite image video may be displayed in parallel as in the first embodiment. In such a case, the objects and the composite image video are displayed in synchronization with each other.

Pressing (clicking or tapping) or double-clicking the mark 260 is merely an example. The display of the objects and the playback of the composite image video may be switched by different operations performed by the viewer. The transition of the video playback screen 220 may be performed in a circulation of displaying the objects from the initial state, playing back the composite image video, and then returning to the initial state.

Display of Object at Point in Time of Page Switching

Figures 40, 41:
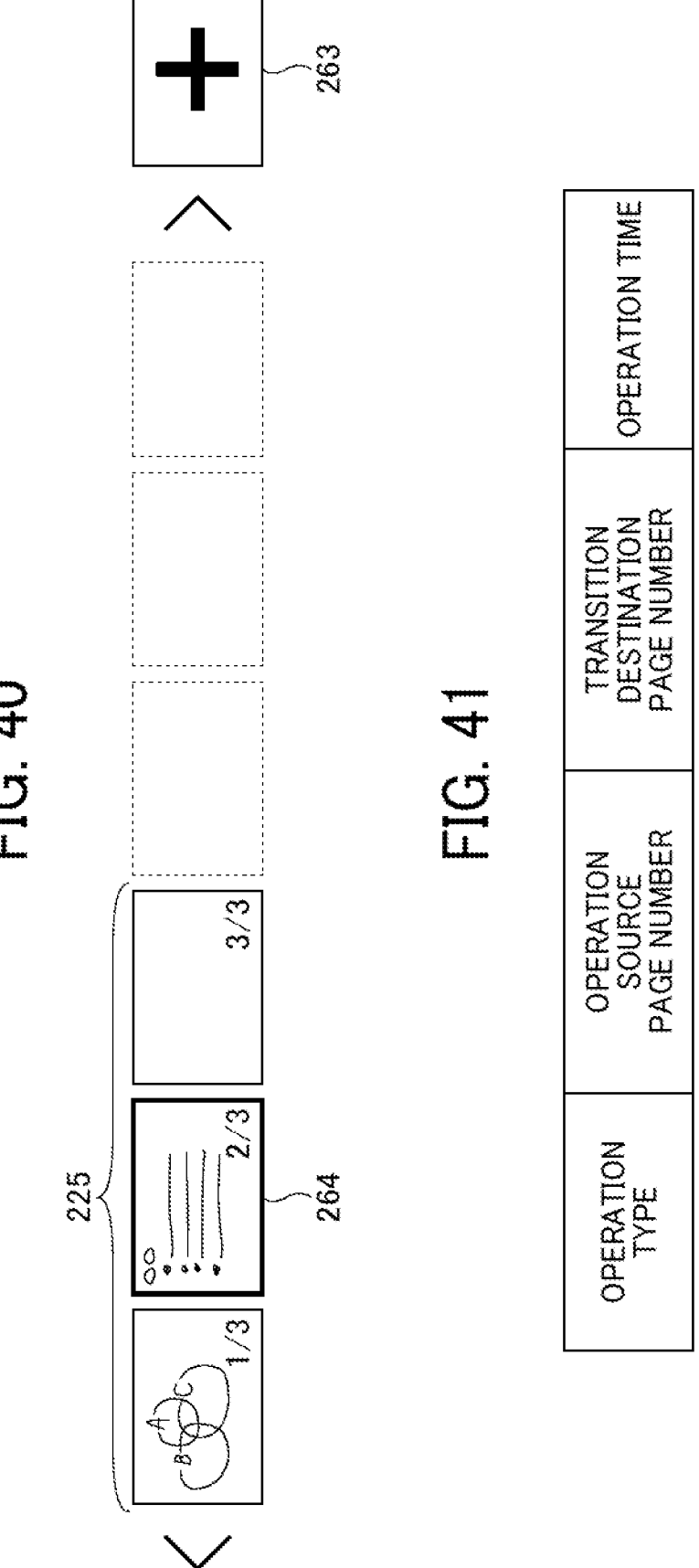
FIG. 40 is a diagram illustrating thumbnails and a page add button displayed at a lower portion on a display of the other electronic whiteboard according to embodiments of the present disclosure.
FIG. 41 is a diagram illustrating a data structure of page operation data according to embodiments of the present disclosure.

FIG. 40 is a diagram illustrating the thumbnails 225 and a page addition button 263 displayed at a lower portion on the display 480 of the electronic whiteboard 2. The electronic whiteboard 2 according to the present embodiment can display, at the lower portion on the display 480 of the electronic whiteboard 2, the thumbnails 225 representing pages stored already. The electronic whiteboard 2 can also display a blank page to be newly added by the page addition button 263 being pressed. A thumbnail corresponding to the page currently displayed on the electronic whiteboard 2 is displayed with emphasis (indicated by a colored rectangle 264, for example). In a case that one of the thumbnails 225 is pressed, the electronic whiteboard 2 newly displays a page corresponding to the one of the thumbnail 225. The user can edit the objects or add objects on the page newly displayed.

The operations of pressing the page addition button 263 and selecting the thumbnails 225 are stored together with the times when the operations are performed, in the same manner as the stroke data representing the strokes is stored as the electronic whiteboard operation data. The information on the operations of pressing the page addition button and selecting the thumbnails on the electronic whiteboard is referred to as page operation data. FIG. 41 is a diagram illustrating a data structure of the page operation data.

The item "OPERATION TYPE" indicates addition of a new page by the operation of pressing the page addition button or selection of a page by the operation of selecting a page.

The item "OPERATION SOURCE PAGE NUMBER" indicates a page number of the page displayed on the display 480 before the operation of adding a new page or selecting a page is performed.

The item "TRANSITION DESTINATION PAGE NUMBER" indicates a page number of the page to be displayed on the display 480 in a case that the operation of adding a new page or selecting a page is performed.

The item "OPERATION TIME" indicates a time at which the operation of newly adding a page or selecting a page is performed.

Figure 42:
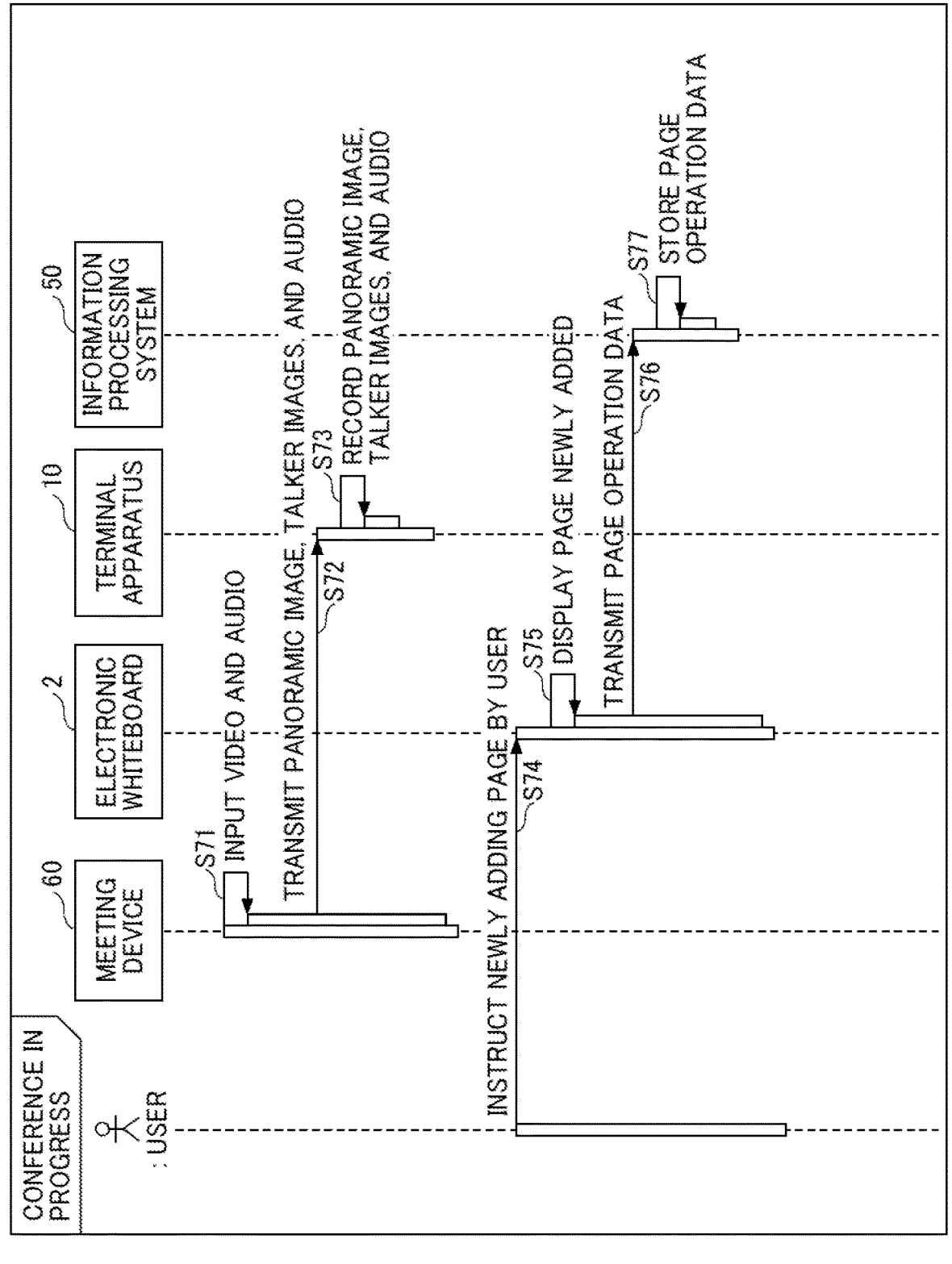
FIG. 42 is a sequence chart illustrating processing to store object information according to embodiments of the present disclosure.

FIG. 42 is a sequence chart illustrating processing to store object information. In the description referring to FIG. 42, for simplicity, the main differences from FIG. 35 are described. The operations in steps S71 to S73 are similar to those in steps S41 to S43 in FIG. 35.

S74: In the conference, in a case that the user presses the page addition button 263 displayed by the electronic whiteboard 2, the display control unit 34 newly adds a page to the end of the existing pages.

S75: The display control unit 34 displays the page newly added. The data recording unit 33 generates page operation data including time information indicating the time at which the operation of newly adding the page is performed, and stores the page operation data in the object information storage area 3002 of the electronic whiteboard 2.

S76: After the page operation data is stored, the communication unit 36 of the electronic whiteboard 2 transmits the page operation data to the information processing system 50.

S77: The communication unit 51 of the information processing system 50 receives the page operation data and stores the page operation data in the object information storage area 5004.

Page operation data is stored in the information processing system 50 not only for the operation of newly adding the page but also for the operation of pressing the thumbnails 225 to select a page in the same manner.

The processing of ending the conference may be the same as that of FIG. 36. Also, the display processing of the video playback screen 220 after the end of the conference may be the same as that of FIG. 37. However, the method of creating the link is different. The display control unit 13 of the terminal apparatus 10 creates a link for associating the operation time included in the page operation data with the playback time from which the composite image video is to be played back. The instruction information display unit 23 calculates a position where the mark 260 is to be displayed on the time indicator. The instruction information display unit 23 displays, at the calculated position on the time indicator, the mark 260 in which the link is embedded.

In a case that the user presses the mark 260 displayed on the time indicator, the video playback unit 19 stops playing back the composite image video. The display control unit 13 displays all objects on the page from the initial object to the last object having the operation time on or immediately before the time at which the page switching operation of the page associated with the link is performed in the electronic whiteboard operation data. Pressing the return button 261 allows to switch from the display of the objects to the screen of the composite image video. By double-clicking the mark 260, the composite image video is played back from the time at which the page switching operation is performed.

Display of Object Using Time of Expanding Operation of Handwriting Area

Figures 43, 44:
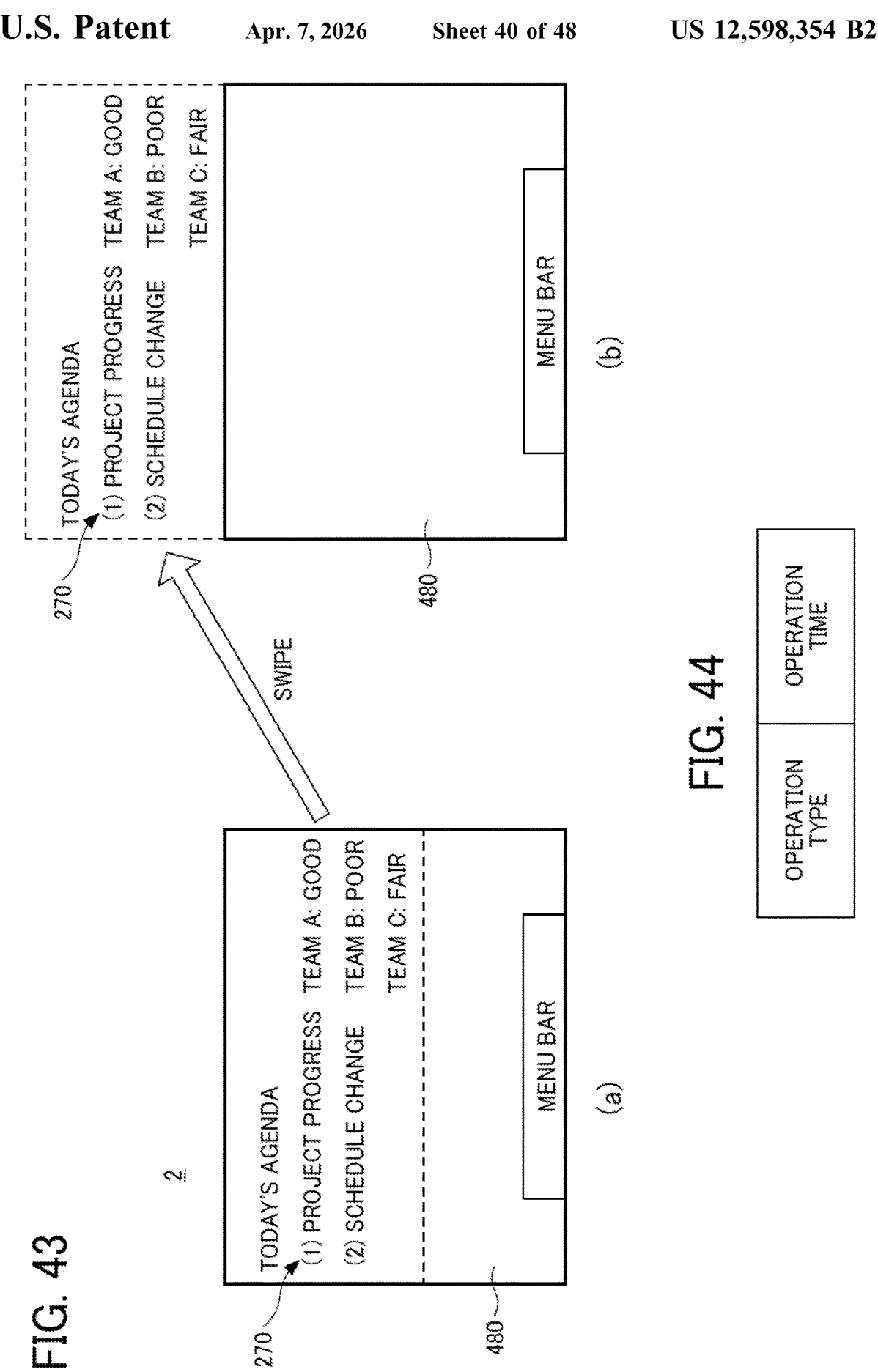
FIG. 43 is a diagram illustrating an expansion of a handwriting area where objects are drawn according to embodiments of the present disclosure.
FIG. 44 is a diagram illustrating a data structure of information on an expanding operation of the handwriting area (swipe event data) according to embodiments of the present disclosure.

In the electronic whiteboard 2 according to the present embodiment, the handwriting area where objects are drawn can be expanded wider than the screen size of the display 480. FIG. 43 is a diagram illustrating an expansion of a handwriting area where objects are drawn.

In part (a) of FIG. 43, a handwriting area whose size is the same as the screen size of the display 480 is illustrated. Assume that, after the user writes the progress of a certain project as an agenda of a conference, the user desires to write a schedule in order to change the schedule of the project. The user touches any position on the display 480 and performs a swipe operation upward. In this way, as illustrated in part (b) of FIG. 43, the electronic whiteboard 2 moves an object 270 being displayed out of the handwriting area of the display 480. The handwriting area is expanded by an amount corresponding to the swipe operation. The size of the area expanded by the swipe operation may be the same as the size of the display 480 of the electronic whiteboard 2.

In the case that the expanding operation is performed by the user, the electronic whiteboard 2 transmits information on the expanding operation including time information indicating the time at which the expanding operation is performed to the information processing system 50 as swipe event data. The information processing system 50 stores the swipe event data in the object information storage area 5004.

FIG. 44 is a diagram illustrating a data structure of the information on the expanding operation of the handwriting area (swipe event data). The item "OPERATION TYPE" indicates an expanding operation. The item "OPERATION TIME" indicates a time at which the expanding operation (swipe operation) is performed. The expanding operation is performed not only by swiping, but may be performed also by a button for expanding the handwriting area being pressed.

Figure 45:
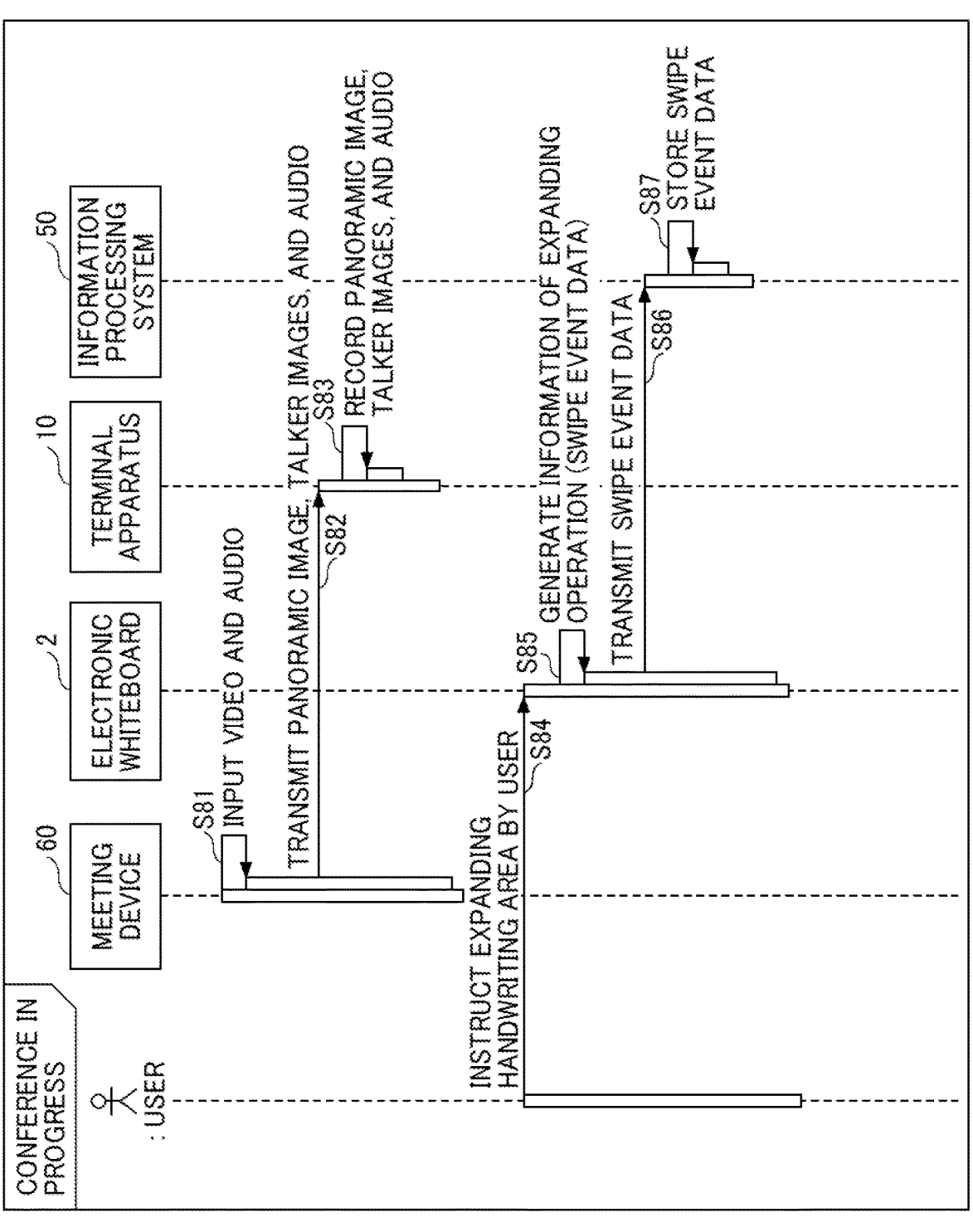
FIG. 45 is a sequence chart illustrating processing to store object information according to embodiments of the present disclosure.

FIG. 45 is a sequence chart illustrating processing to store object information. In the description referring to FIG. 45, for simplicity, the main differences from FIG. 42 are described. The operations in steps S81 to S83 are similar to those in steps S71 to S73 in FIG. 42.

S84: In the conference, the user desires to write a schedule in order to change the schedule of the project, but there is no space to write the schedule. For this reason, the user performs a swipe operation upward to expand the handwriting area.

S85: In response to the swipe operation, the display control unit 34 determines whether an amount moved by the swipe operation is equal to or greater than a predetermined value. In a case that the display control unit 34 determines that the amount moved by the swipe operation is equal to or greater than the predetermined value, the data recording unit 33 generates swipe event data including the time information indicating the time (operation time) at which the expanding operation of the handwriting area is performed.

S86: The communication unit 36 transmits the information on the expanding operation of the handwriting area (swipe event data) to the information processing system 50.

S87: The communication unit 51 of the information processing system 50 receives the information on the expanding operation of the handwriting area (swipe event data) and stores the information in the object information storage area 5004.

The processing of ending the conference may be the same as that of FIG. 36. Also, the display processing of the video playback screen 220 after the end of the conference may be the same as that of FIG. 37. However, the method of creating the link is different. The display control unit 13 of the terminal apparatus 10 creates a link for associating the operation time included in the information on the expanding operation of the handwriting area (swipe event data) with the playback time from which the composite image video is to be played back. The instruction information display unit 23 calculates a position where the mark 260 is to be displayed on the time indicator. The instruction information display unit 23 displays, at the calculated position on the time indicator, the mark 260 in which the link is embedded.

In a case that the user presses the mark 260 displayed on the time indicator, the video playback unit 19 stops playing back the composite image video. The display control unit 13 displays all objects on the page from the initial object to the last object having the operation time on or immediately before the time at which the expanding operation associated with the link is performed in the electronic whiteboard operation data. Pressing the return button 261 allows to switch from the display of the objects to the screen of the composite image video. By double-clicking the mark 260, the composite image video is played back from the time at which the expanding operation is performed.

Display of Object at Point in Time of Video Input from External Device

The electronic whiteboard 2 according to the present embodiment can receive a video from an external device such as the PC 470 and display the video on the display 480. In a case that the capture device 411 of the electronic whiteboard 2 detects an input of a video from the PC 470 via the HDMI cable, the electronic whiteboard 2 displays the video on the display 480.

FIG. 46 is a diagram illustrating a data structure of video input event data. The item "EVENT TYPE" indicates an input of video data from the PC 470. The item "EVENT TIME" indicates a time at which the input of the video data is started (detected). The item "VIDEO FILE NAME" indicates a file name of the video data input from the external device.

Figure 47:
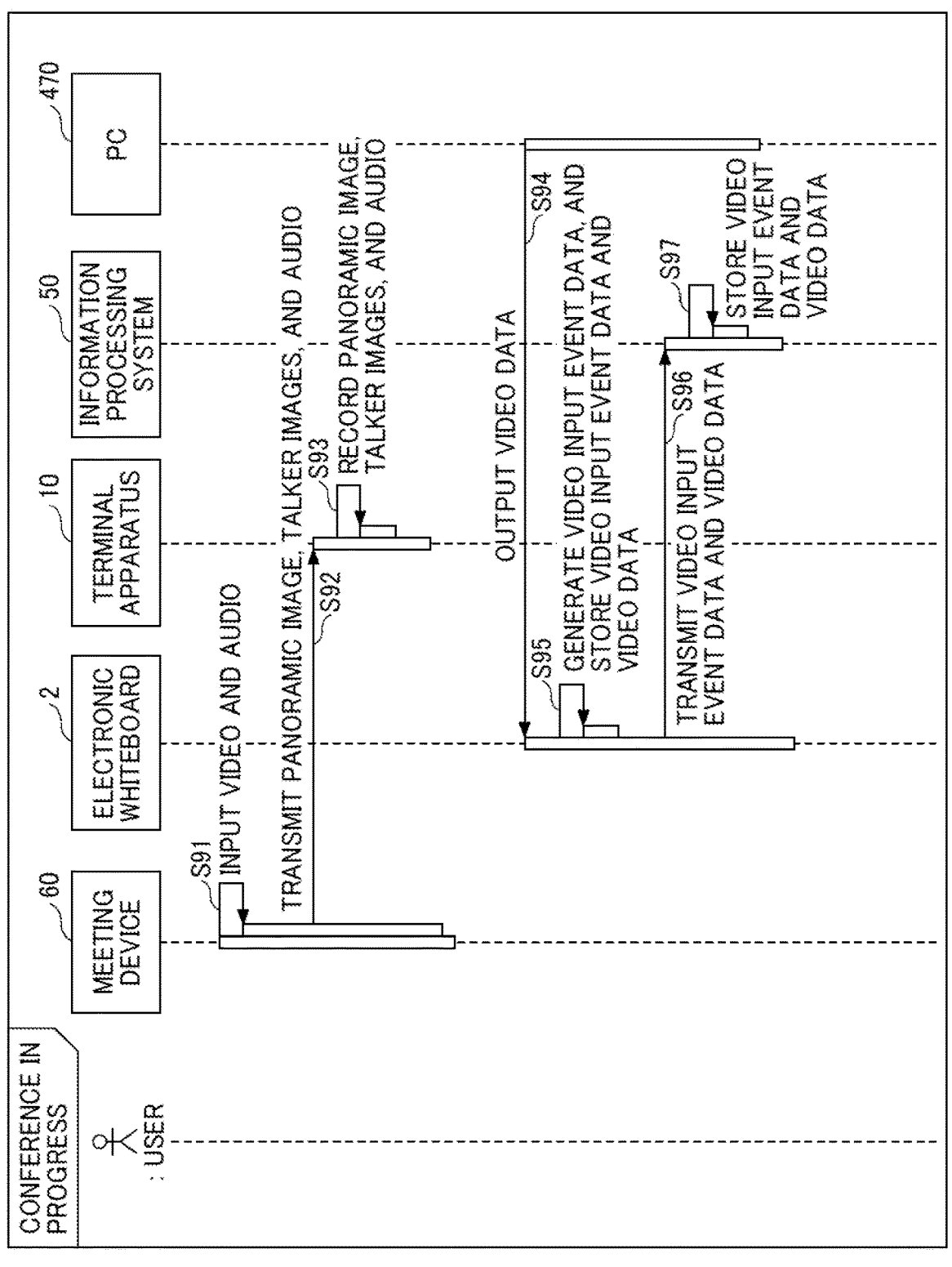
FIG. 47 is a sequence chart illustrating processing to store object information according to embodiments of the present disclosure.

FIG. 47 is a sequence chart illustrating processing to store object information. In the description referring to FIG. 47, for simplicity, the main differences from FIG. 42 are described. The operations in steps S91 to S93 are similar to those in steps S71 to S73 in FIG. 42.

S94: In the conference, the user connects the PC 470 brought by the user to the electronic whiteboard 2 via the HDMI cable to display the screen of the PC 470 on the display 480 of the electronic whiteboard 2.

S95: The capture device 411 of the electronic whiteboard 2 detects an input of video data output from the PC 470. Then, the data recording unit 33 generates video input event data including time information indicating the time at which the input of the video data is started (detected). The data recording unit 33 of the electronic whiteboard 2 compresses the video data in compliance with Moving Picture Experts Group phase 4 (MPEG-4), and stores the compressed video data as a file (an external input video file). In a case where the HDMI cable connected to the electronic whiteboard 2 is disconnected or the display on the display 480 is switched to the display of the electronic whiteboard 2 (an end of video data input from the external device) in response to a user operation of pressing a display button of the electronic whiteboard 2, the processing of compressing the video data is stopped.

S96: In a case that the input of the video data from the external device ends, the data recording unit 33 of the electronic whiteboard 2 includes a file name of the external input video file in the video input event data. The communication unit 36 transmits the video input event data and the external input video file to the information processing system 50.

S97: The communication unit 51 of the information processing system 50 receives the video input event data and the external input video file, and stores the video input event data and the external input video file in the object information storage area 5004.

The processing of ending the conference may be the same as that of FIG. 36. Also, the display processing of the video playback screen 220 after the end of the conference may be the same as that of FIG. 37. However, the method of creating the link is different. The display control unit 13 of the terminal apparatus 10 creates a link for associating the operation time included in the video input event data with the playback time from which the composite image video is to be played back. The instruction information display unit 23 calculates a position where the mark 260 is to be displayed on the time indicator. The instruction information display unit 23 displays, at the calculated position on the time indicator, the mark 260 in which the link is embedded.

In a case that the user presses the mark 260 displayed on the time indicator, the video playback unit 19 stops playing back the composite image video. The display control unit 13 displays all objects on the page from the initial object to the object having the operation time on or immediately before the time at which the input of the video data associated with the link is started in the electronic whiteboard operation data. Pressing the return button 261 allows to switch from the display of the objects to the screen of the composite image video. By double-clicking the mark 260, the composite image video is played back from the time at which the input of the video data is started.

In the example described above, the time at which the input of the video data via the HDMI cable is detected is defined as the operation time at which the input of the video data is started. However, there may be a case where the electronic whiteboard 2 is designed not to display a video immediately after the video (data) is input. In such a case, the electronic whiteboard 2 may display an external input video switching button on the display 480 in response to detection of the input of the video data, and display the video input from the external device in response to a user operation of pressing the external input video switching button. In this case, the time at which the external input video switching button is pressed is the operation time at which the input of the video data is started.

Variations of Mark According to Type of Object and Operation Content

The electronic whiteboard 2 has a function of displaying graphics. Graphics refer to shapes defined by names, such as a triangle, a quadrangle, a rhombus, and a circle. The electronic whiteboard 2 displays a graphic button on the menu. In a case that the user selects (presses) the graphic button, the electronic whiteboard 2 displays a list of graphics. In a case that the user selects any one of the graphics in the list and then presses any position where the graphic selected by the user is to be displayed on the display 480, the display control unit 13 generates the graphic in a default size and displays the graphic at the position pressed by the user. The color (filling) of the graphic, the color of the line of the graphic, and the width of the line can be set in a setting menu.

FIG. 48 is a diagram illustrating a data structure of graphic data. The item "GRAPHIC TYPE" indicates a type of a graphic (rectangle, circle, triangle, etc.). The item "COLOR" indicates a color with which the graphic is filled. The item "LINE COLOR" indicates a color of the line of the graphic. The item "LINE WIDTH" indicates a width of the line of the graphic. The item "DRAWING TIME" indicates a time at which the user touches a position where the graphic is to be displayed. The item "CIRCUMSCRIBED RECTANGLE START POINT COORDINATES" indicates coordinates of the upper left corner of a rectangle circumscribed with the graphic. The item "CIRCUMSCRIBED RECTANGLE END POINT COORDINATES" indicates coordinates of the lower right corner of the rectangle circumscribed with the graphic.

Figure 49:
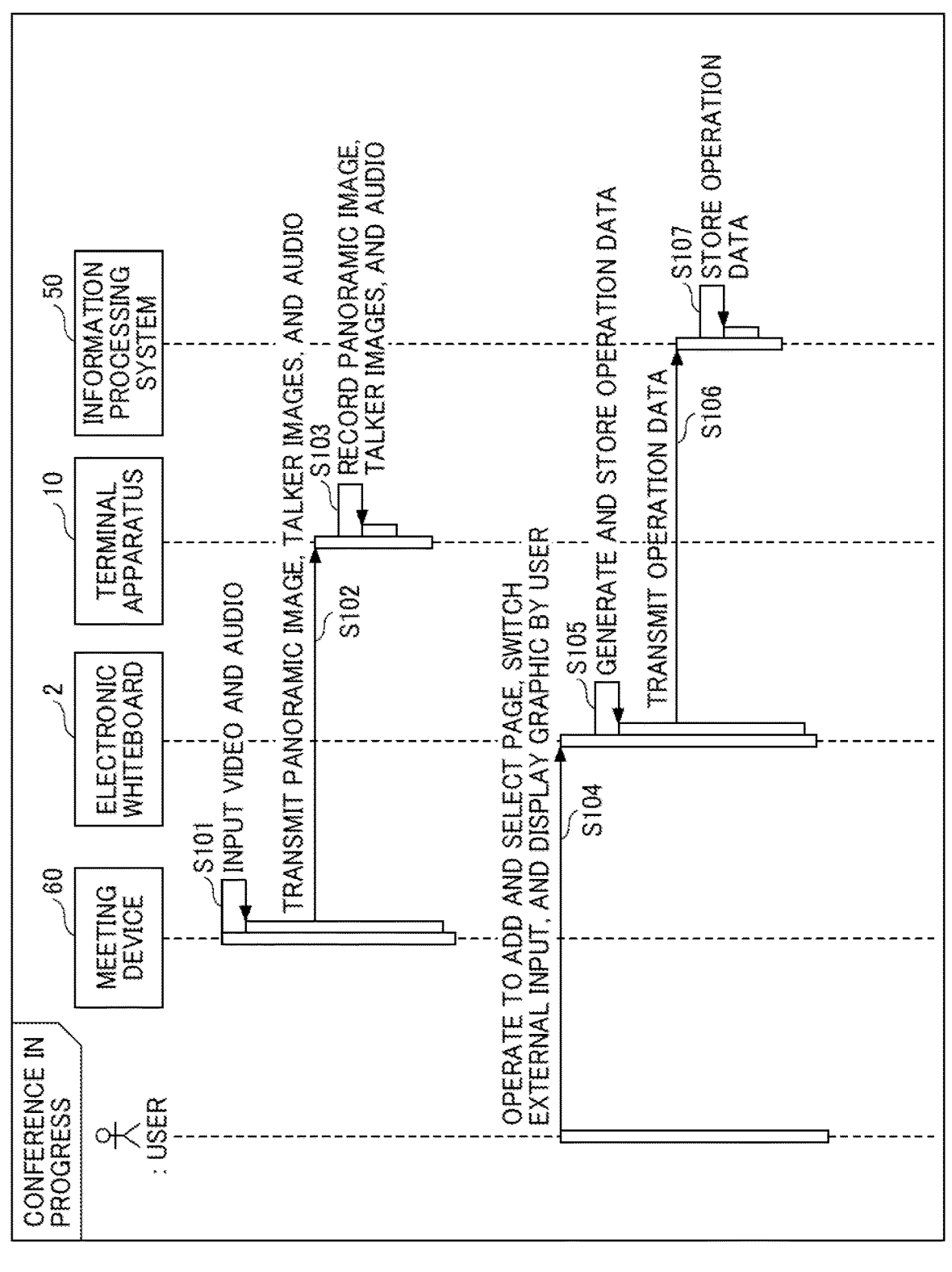
FIG. 49 is a sequence chart illustrating processing to store object information according to embodiments of the present disclosure.

FIG. 49 is a sequence chart illustrating processing to store object information. In the description referring to FIG. 49, for simplicity, the main differences from FIG. 42 are described. The operations in steps S101 to S103 are similar to those in steps S71 to S73 in FIG. 42.

S104: In the conference, the user performs operations of inputting strokes, adding and selecting pages, switching an external input, and displaying graphics at any desired time.

S105: The data recording unit 33 generates electronic whiteboard operation data for each of the operations including time information indicating the time at which each of the operations is performed, and stores the electronic whiteboard operation data in the object information storage area 3002 of the electronic whiteboard 2.

S106: After the electronic whiteboard operation data is stored, the communication unit 36 of the electronic whiteboard 2 transmits the electronic whiteboard operation data and the object information to the information processing system 50.

S107: The communication unit 51 of the information processing system 50 receives the electronic whiteboard operation data and the object information, and stores the electronic whiteboard operation data and the object information in the object information storage area 5004.

The processing of ending the conference may be the same as that of FIG. 36. Also, the display processing of the video playback screen 220 after the end of the conference may be the same as that of FIG. 37. However, the method of creating the link is different. The display control unit 13 of the terminal apparatus 10 creates a link for associating the operation time included in the electronic whiteboard operation data with the playback time from which the composite image video is to be played back. The instruction information display unit 23 calculates a position where the mark 260 is to be displayed on the time indicator. The instruction information display unit 23 displays, at the calculated position on the time indicator, the mark 260 in which the link is embedded. The mark 260 has a different shape for each type of the electronic whiteboard operation data.

Figure 50:
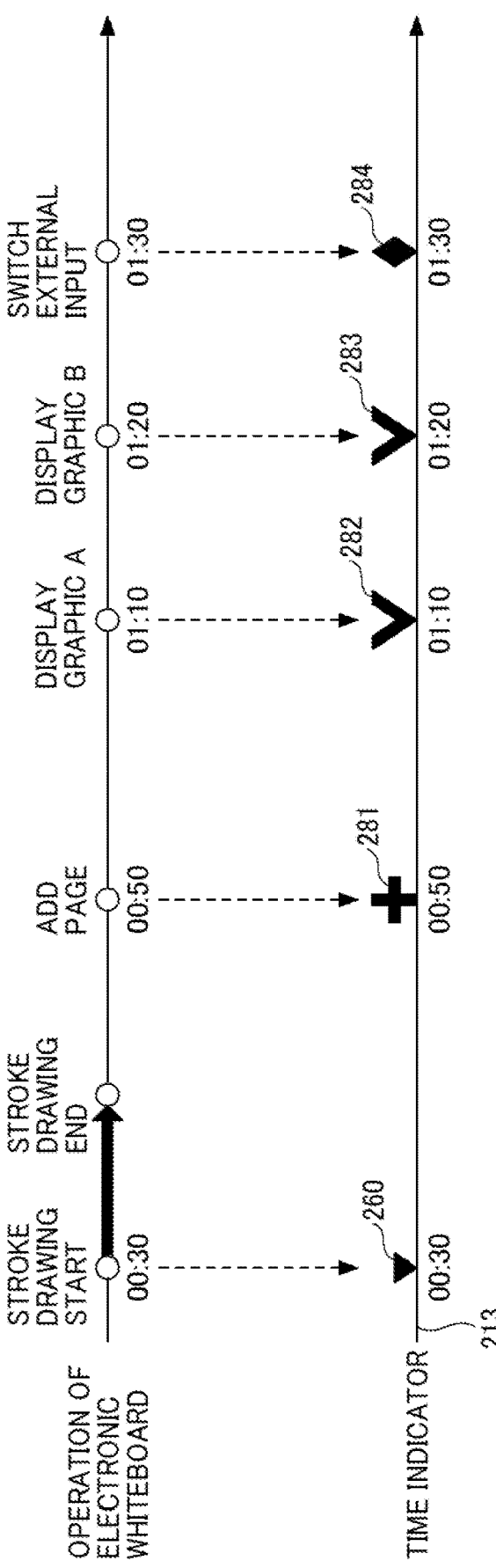
FIG. 50 is a diagram illustrating marks displayed in different shapes according to the type of an object or the content of an operation (stroke data, page switching operation, operation of expanding a handwriting area (swipe event data), and video input event data) according to embodiments of the present disclosure.

FIG. 50 is a diagram illustrating marks displayed in different shapes according to the type of an object or the content of an operation (stroke data, page switching operation, expanding operation of a handwriting area (swipe event data), and video input event data). In FIG. 50, the mark 260, a mark 281, marks 282 and 283, and a mark 284 are displayed in different shapes. The mark 260 indicates an operation time at which a stroke is input. The mark 281 indicates an operation time at which a page is newly added. Each of the marks 282 and 283 indicates an operation time at which a graphic is displayed. The mark 284 indicates a time at which an external input video is displayed. Thus, the viewer can determine which object is input with the shapes of the marks 260 and 281 to 284, and can select one of the marks 260 and 281 to 284 corresponding to an object desired to be played back.

In a case that the user presses one of the marks 260 and 281 to 284 displayed on the time indicator, the video playback unit 19 stops playing back the composite image video. The display control unit 13 displays all objects on the page from the initial object to the object having the operation time on or immediately before the time at which the operation corresponding to the mark pressed by the user is performed in the electronic whiteboard operation data. Pressing the return button 261 allows to switch from the display of the objects to the screen of the composite image video. By double-clicking one of the marks 260 and 281 to 284, the composite image video is played back from the time at which the operation corresponding to the double-clicked mark is performed.

Display of Thumbnail by Mouse-Over Operation

As described above, the information recording application 41 according to the present embodiment displays the mark 260 on the time indicator of the composite image video. In a case that the user places the cursor 230 of the pointing device 512 of the terminal apparatus 10 on the mark 260, the display control unit 13 displays, above the mark 260, a thumbnail including the object having the operation time on the playback time associated with the mark 260.

Figure 51:
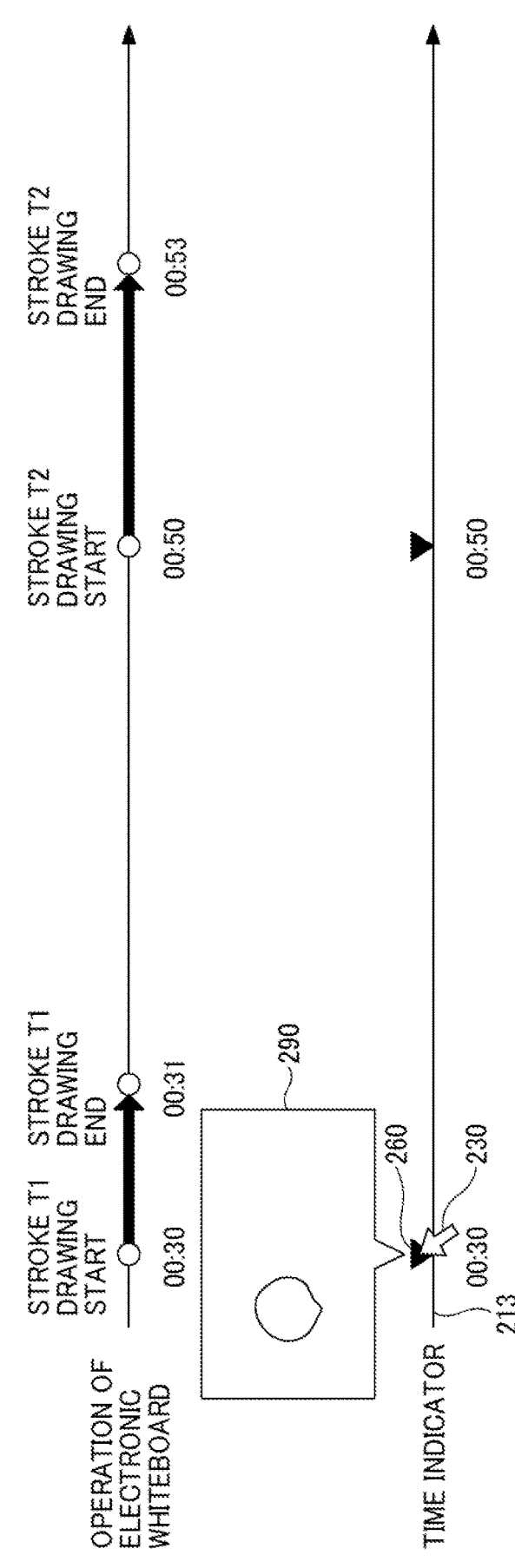
FIG. 51 is a diagram illustrating a thumbnail to be displayed in a case that a mouse-over operation is performed on a mark according to embodiments of the present disclosure.

FIG. 51 is a diagram illustrating a thumbnail 290 to be displayed in a case that a mouse-over operation with the cursor 230 is performed on the mark 260. In FIG. 51, since a mouse-over operation with the cursor 230 is performed on the mark 260 associated with the pen engagement time of the stroke T1, the thumbnail 290 including the object at the time of "00:31" which is a stroke drawing end time of the stroke having the playback time (pen engagement time "00:30") associated with the mark 260 is displayed in a pop-up manner. The reason that the display control unit 13 displays the object at the stroke drawing end time of "00:31" is to display the stroke in the state in which the input of the stroke is completed. The viewer can simply check the object at the pen engagement time without pressing the mark 260. As described above, for an object such as handwritten data, the thumbnail includes an image at the time of end of drawing.

Further, as long as objects such as strokes and graphics are input to the same page, all objects of the page from the initial object to the object having the operation time on or immediately before the playback time associated with the mark 260 in the electronic whiteboard operation data are accumulated and displayed in the thumbnail 290. For example, it is assumed that the stroke T1 and the stroke T2 in FIG. 51 are displayed on the same page. In a case that the viewer performs a mouse-over operation on the other mark 260 associated with the pen engagement time of the stroke T2 with the cursor 230, the thumbnail of the stroke T2 includes the image representing the stroke T1.

It is assumed that the display control unit 13 stores a thumbnail for each mark 260 as cache data when displaying any thumbnail. As a result, in a case that a mouse-over operation with the cursor 230 is performed on the same mark 260 for the second time and thereafter, the load of displaying the thumbnail can be reduced.

Mark Thinning Display

In a conference, since the number of operations of inputting stroke data and graphics is greater than the number of operations of page switching and inputting video data, there may be a case where the marks 260 are dense. For this reason, the display control unit 13 thins out the marks 260 and displays the remaining marks 260 on the time indicator. Thus, visual recognizability of the marks 260 increases.

When creating a link, the instruction information display unit 23 regards stroke data and graphics having time intervals in drawing are equal to or less than a certain period of time as one object, and associates the mark 260 only with the pen engagement time of the initial piece of the stroke data of the object.

Figure 52:
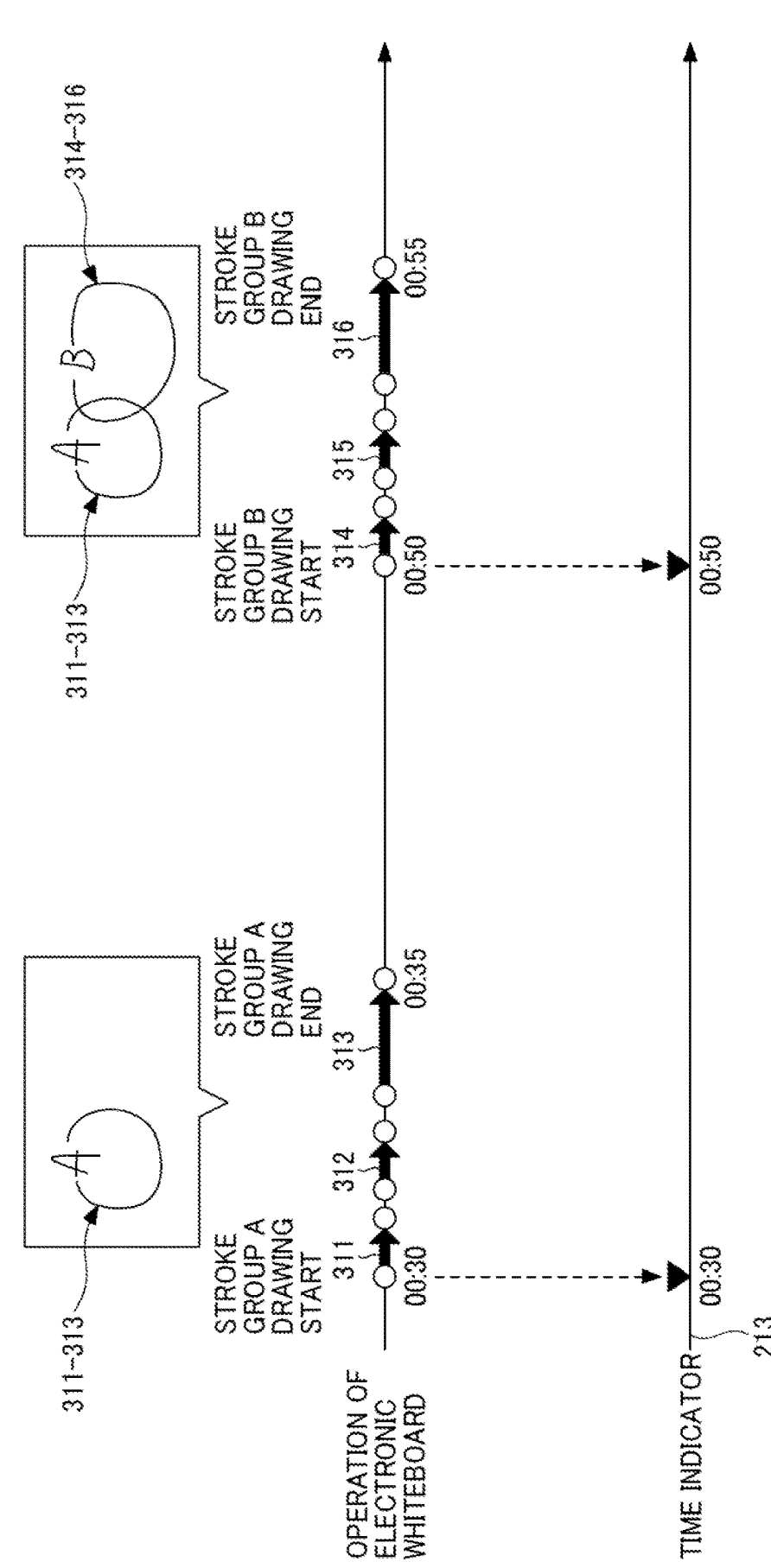
FIG. 52 is a diagram illustrating a plurality of pieces of stroke data regarded as one object according to embodiments of the present disclosure.

FIG. 52 is a diagram illustrating a plurality of pieces of stroke data regarded as one object. The time interval between a stroke 311 and a stroke 312 and the time interval between the stroke 312 and a stroke 313 are less than the certain period of time. The time interval between a stroke 314 and a stroke 315 and the time interval between the stroke 315 and a stroke 316 are less than the certain period of time. On the other hand, the time interval between the stroke 313 and the stroke 314 is longer than the certain period of time. Accordingly, the instruction information display unit 23 determines that the strokes 311 to 313 are one object and the strokes 314 to 316 are another one object. The instruction information display unit 23 associates one of the marks 260 with the strokes 311 to 313, and associates another one of the marks 260 with the strokes 314 to 316. As described above, by associating a single mark 260 with a plurality of pieces of stroke data, the number of marks 260 is reduced and visual recognizability of the marks 260 increases.

It is preferable that the instruction information display unit 23 thins out the marks 260 for the same type of object in accordance with the time interval of input.

Further, the certain period of time serving as a criterion for regarding stroke data and graphics as one object may be a value that varies according to the whole time of the conference. As the whole time of the conference is shortened, the certain period of time is shortened and the number of pieces of stroke data regarded as one object decreases. On the contrary, as the whole time of the conference is lengthened, the certain period of time is lengthened and the number of pieces of stroke data regarded as one object increases.

As described above, the instruction information display unit 23 regards stroke data and graphics as one object according to the time intervals of input. Alternatively, in a case that the density of inputting handwritten data that makes up an object is equal to or greater than a threshold value, the instruction information display unit 23 may display one of the marks 260 at a position corresponding to the pen engagement time of the initial piece of the stroke data of the object on the time indicator. The density of inputting handwritten data is represented by, for example, the number of strokes or the number of coordinate points input for each set time. The instruction information display unit 23 counts the number of strokes or the number of coordinate points for each set time. In a case that the counted number is determined to be equal to or greater than the threshold value, the instruction information display unit 23 displays one of the marks 260 at the beginning point of the set time.

According to the present embodiment, in the case that the viewer presses the mark 260 on the time indicator, the object or the composite image video having the operation time associated with the mark 260 is played back. The viewer can operate the terminal apparatus 10 to display the state of the electronic whiteboard 2 at the time at which the object is input. The viewer can also operate the terminal apparatus 10 to play back the discussion at the time the object is input.

Variations

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure. Any one of the above-described operations may be performed in various other ways, for example, in an order different from the one described above.

For example, although the video playback screen 220 is displayed by the information recording application 41 in the present embodiments, the terminal apparatus 10 may display the video playback screen 220 using the web browser. In this case, the information processing system 50 provides the terminal apparatus 10 with a web application including a function of displaying the video playback screen 220 described in the present embodiments. The viewer can operate the terminal apparatus 10 to display the post-conversion operation time 211 and play back the composite image video from the post-conversion operation time 211 on the video playback screen 220 displayed by the web application in the same manner on the video playback screen 220 displayed by the information recording application 41.

The terminal apparatus 10 and the meeting device 60 may be configured as a single entity. Alternatively, the meeting device 60 may be externally attached to the terminal apparatus 10. The meeting device 60 may be implemented by a spherical camera, a microphone, and a speaker connected to one another by cables.

Another meeting device 60 may be provided also at the remote site 101. The other meeting device 60 at the remote site 101 separately generates a composite image video and text data. A plurality of meeting devices 60 may be provided at a single site. In such a case, multiple records are created for each meeting devices 60.

The arrangement of the panoramic image 203, the talker images 204, and the application screen in the composite image video used in the present embodiments is merely an example. The panoramic image 203 may be displayed below the talker images 204. The user may be allowed to change the arrangement, or the user may be allowed to switch between display and non-display individually for the panoramic image 203 and the talker images 204 during playback.

The functional configurations illustrated in, for example, FIG. 9 are divided according to main functions in order to facilitate understanding of the processing executed by the terminal apparatus 10, the meeting device 60, and the information processing system 50. No limitation to a scope of the present disclosure is intended by how the processing units are divided or by the name of the processing units. The processing executed by the terminal apparatus 10, the meeting device 60, and the information processing system 50 may be divided into a greater number of processing units in accordance with the content of the processing. In addition, a single processing unit can be divided to include a greater number of processing units.

The apparatuses or devices described in the above-described embodiments are merely one example of plural computing environments that implement the embodiments disclosed herein. In some embodiments, the information processing system 50 includes a plurality of computing devices, such as a server cluster. The plurality of computing devices communicates with one another through any type of communication link including, for example, a network or a shared memory, and performs the operations disclosed herein.

Further, the information processing system 50 may be configured to share the disclosed processing steps, for example, the processing illustrated in FIGS. 21 and 35 to 37, in various combinations. For example, processing executed by a predetermined unit may be executed by a plurality of information processing apparatuses included in the information processing system 50. Further, the components of the information processing system 50 may be integrated into one server apparatus or may be divided into a plurality of apparatuses.

Each function of the embodiments described above may be implemented by one processing circuit or a plurality of processing circuits. The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality.

Aspects of the present disclosure are, for example, as follows.

A program causes a terminal apparatus that receives, from an information processing system, a record including audio and video recorded as a moving image by a device and object information including time information indicating a time at which an object was displayed by a display apparatus to function as a communication unit that receives the record and the object information, to function as a video playback unit that plays back the record, to function as a display control unit that displays the object, and to function as an instruction information display unit that displays, based on the time information, instruction information for playing back the object at the time indicated by the time information or the record including the audio or the video related to the object.

According to Aspect 2, in the program of Aspect 1, the instruction information includes the time information.

According to Aspect 3, the program of Aspect 2 further causes the terminal apparatus to function as an operation reception unit that receives selection of the object displayed by the display control unit and causes the instruction information display unit to display the time information of the object of which selection is received by the operation reception unit.

According to Aspect 4, the program of Aspect 3 further causes, in a case that the operation reception unit receives selection of the time information, the video playback unit to play back the record from the time indicated by the time information.

According to Aspect 5, the program of Aspect 2 further causes the terminal apparatus to function as the operation reception unit that receives selection of the object displayed by the display control unit and causes the video playback unit to play back the record from the time indicated by the time information of the object of which selection is received by the operation reception unit.

According to Aspect 6, the program of Aspect 2 further causes the terminal apparatus to function as the operation reception unit that receives selection of the object displayed by the display control unit, in a case that the operation reception unit receives selection of the object, causes the display control unit to display a display component that causes the record to be played back from the time indicated by the time information of the object of which selection is received by the operation reception unit, and, in a case that the operation reception unit receives selection of the display component, causes the video playback unit to play back the record from the time indicated by the time information of the object.

According to Aspect 7, the program of Aspect 2 further causes, in a case that the display control unit displays the object, the instruction information display unit to continuously display the time information of the object displayed by the display control unit.

According to Aspect 8, in the program of Aspect 3, the time information includes an input start time and a last update time of the object, and the program further causes the instruction information display unit to display the input start time and the last update time of the object of which selection is received by the operation reception unit.

According to Aspect 9, the program of Aspect 8 further causes, in a case that the operation reception unit receives selection of a plurality of objects including the object, the instruction information display unit to display an earliest one of input start times of the plurality of objects and a latest one of last update times of the plurality of objects.

According to Aspect 10, the program of Aspect 2 further causes the terminal apparatus to function as the operation reception unit that receives selection of the object displayed by the display control unit, in the program, the record includes information on an utterance segment in which the audio is uttered, and, in a case that the utterance segment that includes the time indicated by the time information of the object of which selection is received by the operation reception unit exists, causes the video playback unit to play back the record from the start of the utterance segment.

According to Aspect 11, the program of Aspect 2 further causes the terminal apparatus to function as the operation reception unit that receives selection of the object displayed by the display control unit, in the program, the object information is divided into pages, causes the display control unit to display another display component that receives selection of a desired page when displaying a plurality of objects, and causes the video playback unit to play back the record from a latest last update time among last update times of the plurality of objects included in the desired page of which selection is received by the operation reception unit.

According to Aspect 12, the program of Aspect 2 further causes the video playback unit to display a time indicator of the record in different colors according to a time zone and the display control unit to display the object in a same color as a color of a time zone to which the time indicated by the time information of the object belongs.

According to Aspect 13, the program of Aspect 2 further causes the display control unit to display the object in gradation according to a difference between the time indicated by the time information of the object and a playback time at which the record is played back.

According to Aspect 14, the program of Aspect 3 further causes, in the case that the operation reception unit receives the selection of the time information, the display control unit to display the object at the time indicated by the time information of which selection is received by the operation reception unit.

According to Aspect 15, the program of Aspect 1 further causes the video playback unit to display a time indicator of the record together with the record and, in the program, the instruction information is a mark indicating, on the time indicator, a time at which the object is input.

According to Aspect 16, in the program of Aspect 15, the object is stroke data and the mark indicates, on the time indicator, a time at which the stroke data is input.

According to Aspect 17, in the program of Aspect 15, the object information is divided into the pages, the object information includes a time at which an operation of page switching is performed, and the mark indicates the time at which the operation of page switching is performed on the time indicator.

According to Aspect 18, the program of Aspect 15 further causes a handwriting area to be expanded on the display by an operation of expanding the handwriting area, and in the program, the object information includes a time at which the operation of expanding the handwriting area is performed and the mark indicates the time at which the operation of expanding the handwriting area is performed on the time indicator.

According to Aspect 19, the program of Aspect 15 further causes a video input from an external device to be displayed on the display, and in the program, the object information includes a time at which the video is input from the external device and the mark indicates the time at which the video is input from the external device on the time indicator.

According to Aspect 20, in the program of Aspect 15, the object information includes the time at which the stroke data is input, the time at which the operation of page switching is performed, a time at which a graphic is input, the time at which the operation of expanding the handwriting area is performed, and the time at which the video is input from the external device, and the program causes the display control unit to display the mark in different shapes according to a type of operation.

According to Aspect 21, the program of Aspect 15 further causes, in a case that a cursor of a pointing device overlaps with the mark displayed by the display control unit, the display control unit to display a thumbnail including the object based on an end time of inputting the object associated with the mark.

According to Aspect 22, the program of Aspect 16 further causes the display control unit to display a mark indicating, on the time indicator, a time at which the stroke data is input only in a case that an interval between times at which pieces of the stroke data are input is equal to or greater than a threshold value.

According to Aspect 23, the program of any one of Aspects 15 to 22 further causes the terminal apparatus to function as the operation reception unit that receives selection of the object displayed by the display control unit, in a case that the operation reception unit receives selection of the mark, causes the video playback unit to play back the record from the time at which the object is input.

According to Aspect 24, the program of any one of Aspects 15 to 22 further causes the terminal apparatus to function as the operation reception unit that receives selection of the object displayed by the display control unit, in the case that the operation reception unit receives the selection of the mark, causes the display control unit to display the object at the time at which the object is input.

According to Aspect 25, the program of any one of Aspects 1 to 24 further causes the display control unit to display the object in synchronization with the record based on the time information.

Processors are considered processing circuitry or circuitry as they include transistors and other circuitry therein. In the disclosure, the circuitry, units, or means are hardware that carries out or is programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An information processing server communicably connected with a display apparatus and a terminal apparatus via a network, the server comprising circuitry configured to:

cause the terminal apparatus to display an object based on object information including time information indicating a time at which the object was displayed by the display apparatus and a record including audio or video recorded by a device communicably connected with the terminal apparatus;

generate screen information of a screen that presents, based on the time information, instruction information for playing back the object at the time indicated by the time information or the record including the audio or the video related to the object; and transmit the record, the object information, and the screen information representing the screen to the terminal apparatus, wherein the instruction information includes the time information and wherein the terminal apparatus comprises second circuitry configured to:

receive selection of the object displayed on the terminal apparatus, said record including information on an utterance segment in which the audio is uttered; and in a case that the time indicated by the time information of the object of which selection is received overlaps with the utterance segment, play back the record from a start of the utterance segment.

2. A record creation system comprising:

a terminal apparatus communicably connected with a device; and an information processing server including first circuitry configured to transmit, to the terminal apparatus, a record including audio or video recorded by the device and object information including time information indicating a time at which an object was displayed by a display apparatus, the terminal apparatus including second circuitry configured to:

receive the record and the object information;

play back the record;

display the object; and display, based on the time information, instruction information for playing back the object at the time indicated by the time information or the record including the audio or the video related to the object, wherein the instruction information includes the time information and wherein the second circuitry is further configured to:

receive selection of the object displayed on the terminal apparatus, said record including information on an utterance segment in which the audio is uttered; and in a case that the time indicated by the time information of the object of which selection is received overlaps with the utterance segment, play back the record from a start of the utterance segment.

3. A display control method performed by an information processing server, the method comprising:

transmitting, to a terminal apparatus, a record including audio or video recorded by a device communicably connected with the terminal apparatus, and object information including time information indicating a time at which an object was displayed by a display apparatus;

generating screen information of a screen that presents, based on the time information, instruction information for playing back the object at the time indicated by the time information or the record including the audio or the video related to the object; and transmitting the record, the object information, and the screen information representing the screen to the terminal apparatus to cause the terminal apparatus, wherein the instruction information includes the time information and wherein the method further comprises:

receiving selection of the object displayed on the terminal apparatus, the record including information on an utterance segment in which the audio is uttered; and in a case that the time indicated by the time information of the object of which selection is received overlaps with the utterance segment, playing back the record from a start of the utterance segment.

4. A non-transitory recording medium storing a plurality of program codes which, when executed by one or more processors on a terminal apparatus, causes the processors to perform a display method, the method comprising:

receiving, from an information processing server, a record including audio or video recorded by a device communicably connected with the terminal apparatus, and object information including time information indicating a time at which an object was displayed by a display apparatus;

playing back the record;

displaying the object; and displaying, based on the time information, instruction information for playing back the object at the time indicated by the time information or the record including the audio or the video related to the object, wherein the instruction information includes the time information and wherein the method further comprises:

receiving selection of the object displayed on the terminal apparatus, the record including information on an utterance segment in which the audio is uttered; and in a case that the time indicated by the time information of the object of which selection is received overlaps with the utterance segment, playing back the record from a start of the utterance segment.

5. The non-transitory recording medium according to claim 4, wherein the method further comprises:

receiving selection of the object displayed on the terminal apparatus; and displaying the time information of the object of which selection is received by the terminal apparatus.

6. The non-transitory recording medium according to claim 5, wherein the method further comprises, in a case of receiving the selection of the time information, playing back the record from the time indicated by the time information.

7. The non-transitory recording medium according to claim 4, wherein the method further comprises:

receiving selection of the object displayed on the terminal apparatus; and playing back the record from the time indicated by the time information of the object of which selection is received.

8. The non-transitory recording medium according to claim 4, wherein the method further comprises:

receiving selection of the object displayed on the terminal apparatus;

in a case of receiving selection of the object, displaying a display component that causes the record to be played back from the time indicated by the time information of the object of which selection is received; and in a case of receiving selection of the display component, playing back the record from the time indicated by the time information.

9. The non-transitory recording medium according to claim 4, wherein the method further comprises, in a case of displaying the object, continuously displaying the time information of the object displayed on the terminal apparatus.

10. The non-transitory recording medium according to claim 5, wherein:

the time information includes an input start time and a last update time of the object; and the method further comprises displaying the input start time and the last update time of the object of which selection is received.

11. The non-transitory recording medium according to claim 10, wherein the method further comprises, in a case of receiving selection of a plurality of objects including the object, displaying an earliest input start time among input start times of the plurality of objects and a latest last update time among last update times of the plurality of objects.

12. The non-transitory recording medium according to claim 4, wherein the method further comprises:

receiving selection of the object displayed on the terminal apparatus, the object information being divided into pages;

displaying another display component that receives selection of a desired page when displaying a plurality of objects; and playing back the record from a latest last update time among last update times of the plurality of objects included in the desired page of which selection is received.

13. The non-transitory recording medium according to claim 4, wherein the method further comprises:

displaying a time indicator of the record in different colors according to a time zone; and displaying the object in a same color as a color of a time zone to which the time information of the object belongs.

14. The non-transitory recording medium according to claim 4, wherein the method further comprises displaying the object in gradation according to a difference between the time indicated by the time information of the object and a playback time at which the record is played back.

15. The non-transitory recording medium according to claim 5, wherein the method further comprises, in a case of receiving selection of the time information, displaying the object at the time indicated by the time information.

16. The non-transitory recording medium according to claim 4, wherein:

the method further comprises displaying a time indicator of the record together with the record, the instruction information being a mark indicating, on the time indicator, a time at which the object is input.

17. The non-transitory recording medium according to claim 4, wherein the method further comprises displaying the object in synchronization with the record based on the time information.

* * * * *